US008295478B2

(12) United States Patent
Shirai et al.

(10) Patent No.: US 8,295,478 B2
(45) Date of Patent: Oct. 23, 2012

(54) CRYPTOGRAPHIC PROCESSING APPARATUS, ALGORITHM CONSTRUCTING METHOD, PROCESSING METHOD, AND COMPUTER PROGRAM APPLYING AN EXTENDED FEISTEL STRUCTURE

(75) Inventors: Taizo Shirai, Kanagawa (JP); Kyoji Shibutani, Kanagawa (JP)

(73) Assignee: Sony Corporation, Tokyo (JP)

( * ) Notice: Subject to any disclaimer, the term of this patent is extended or adjusted under 35 U.S.C. 154(b) by 556 days.

(21) Appl. No.: 12/375,410

(22) PCT Filed: Jul. 17, 2007

(86) PCT No.: PCT/JP2007/064089
§ 371 (c)(1),
(2), (4) Date: Sep. 9, 2009

(87) PCT Pub. No.: WO2008/013076
PCT Pub. Date: Jan. 31, 2008

(65) Prior Publication Data
US 2010/0061548 A1     Mar. 11, 2010

(30) Foreign Application Priority Data

Jul. 28, 2006  (JP) .................................. 2006-206376
Aug. 21, 2006  (JP) .................................. 2006-224674

(51) Int. Cl.
| H04K 1/00 | (2006.01) |
| H04K 1/04 | (2006.01) |
| H04K 1/06 | (2006.01) |
| H04L 9/00 | (2006.01) |
| H04L 9/28 | (2006.01) |
| H04L 9/30 | (2006.01) |
| H04L 9/08 | (2006.01) |
| H04L 9/32 | (2006.01) |

(52) U.S. Cl. ................ 380/28; 380/29; 380/30; 380/37; 380/45; 380/46; 380/278; 713/171
(58) Field of Classification Search ..................... 380/28
See application file for complete search history.

(56) References Cited

U.S. PATENT DOCUMENTS
4,195,200 A * 3/1980 Feistel ............................. 380/37
(Continued)

FOREIGN PATENT DOCUMENTS
EP    1788542 A1 *  5/2007
(Continued)

OTHER PUBLICATIONS

Taizo Shirai et al."On Feistel Structures Using Diffusion Switching Mechanism," Lecture Notes in Computer Science, vol. 4047, pp. 41-56 (2006).

(Continued)

*Primary Examiner* — Carolyn B Kosowski
(74) *Attorney, Agent, or Firm* — Finnegan, Henderson, Farabow, Garrett & Dunner, LLP

(57) ABSTRACT

To realize an extended-Feistel-type common-key block-cipher process configuration for realizing a diffusion-matrix switching mechanism (DSM). In a cryptographic process configuration in which an extended Feistel structure having a number of data lines: d that is set to an integer satisfying d≧3 is applied, a plurality of multiple different matrices are selectively applied to linear transformation processes performed in F-function sections. A plurality of different matrices satisfying a condition in which a minimum number of branches for all of the data lines is equal to or more than a predetermined value are selected as the matrices, each of the minimum numbers of branches corresponding to the data lines being based on linear transformation matrices included in F-functions that are input to a corresponding data line in the extended Feistel structure.

25 Claims, 20 Drawing Sheets

U.S. PATENT DOCUMENTS

| | | | | |
|---|---|---|---|---|
| 4,316,055 | A * | 2/1982 | Feistel | 380/37 |
| 5,740,249 | A * | 4/1998 | Shimizu et al. | 380/28 |
| 6,182,216 | B1 * | 1/2001 | Luyster | 713/168 |
| 6,185,679 | B1 * | 2/2001 | Coppersmith et al. | 713/150 |
| 6,189,095 | B1 * | 2/2001 | Coppersmith et al. | 713/150 |
| 6,199,162 | B1 * | 3/2001 | Luyster | 713/168 |
| 6,269,163 | B1 * | 7/2001 | Rivest et al. | 380/28 |
| 6,769,063 | B1 * | 7/2004 | Kanda et al. | 713/193 |
| 7,096,369 | B2 * | 8/2006 | Matsui et al. | 713/189 |
| 7,159,115 | B2 * | 1/2007 | Fujisaki et al. | 713/171 |
| 7,187,769 | B1 * | 3/2007 | Moriai et al. | 380/1 |
| 7,209,556 | B2 * | 4/2007 | Ohkuma et al. | 380/37 |
| 7,227,948 | B2 * | 6/2007 | Ohkuma et al. | 380/37 |
| 7,236,592 | B2 * | 6/2007 | Coppersmith et al. | 380/37 |
| 7,289,629 | B2 * | 10/2007 | Venkatesan et al. | 380/37 |
| 7,305,085 | B2 * | 12/2007 | Ohkuma et al. | 380/42 |
| 7,346,161 | B2 * | 3/2008 | Shimoyama | 380/29 |
| 7,415,616 | B2 * | 8/2008 | Tanaka et al. | 713/189 |
| 7,433,470 | B2 * | 10/2008 | Shirai et al. | 380/37 |
| 7,450,720 | B2 * | 11/2008 | Roelse | 380/259 |
| 7,460,665 | B2 * | 12/2008 | Tanaka et al. | 380/1 |
| 7,697,684 | B2 * | 4/2010 | Matsui et al. | 380/37 |
| 7,747,011 | B2 * | 6/2010 | Shirai et al. | 380/28 |
| 7,760,870 | B2 * | 7/2010 | Matsui et al. | 380/28 |
| 7,760,871 | B2 * | 7/2010 | Matsui et al. | 380/28 |
| 7,778,413 | B2 * | 8/2010 | Hwang | 380/29 |
| 7,822,196 | B2 * | 10/2010 | Matsui et al. | 380/28 |
| 7,933,404 | B2 * | 4/2011 | Venkatesan et al. | 380/28 |
| 8,000,471 | B2 * | 8/2011 | Mantin et al. | 380/44 |
| 8,000,473 | B2 * | 8/2011 | Goubin et al. | 380/46 |
| 8,031,866 | B2 * | 10/2011 | Shirai et al. | 380/28 |
| 8,073,140 | B2 * | 12/2011 | Shirai et al. | 380/29 |
| 8,165,288 | B2 * | 4/2012 | Shibutani et al. | 380/28 |
| 2001/0024502 | A1 * | 9/2001 | Ohkuma et al. | 380/46 |
| 2003/0048903 | A1 * | 3/2003 | Ito et al. | 380/263 |
| 2003/0059044 | A1 * | 3/2003 | Shimizu et al. | 380/37 |
| 2004/0091114 | A1 * | 5/2004 | Carter et al. | 380/259 |
| 2004/0208321 | A1 * | 10/2004 | Wary | 380/268 |
| 2005/0111659 | A1 * | 5/2005 | Shirai et al. | 380/37 |
| 2008/0056490 | A1 * | 3/2008 | Akishita et al. | 380/44 |
| 2009/0010425 | A1 * | 1/2009 | Shibutani et al. | 380/28 |
| 2009/0103714 | A1 * | 4/2009 | Shirai et al. | 380/28 |
| 2009/0103716 | A1 * | 4/2009 | Shirai | 380/28 |
| 2009/0103719 | A1 * | 4/2009 | Shirai et al. | 380/29 |
| 2010/0002872 | A1 * | 1/2010 | Shibutani et al. | 380/28 |
| 2010/0008498 | A1 * | 1/2010 | Shirai et al. | 380/44 |
| 2010/0014659 | A1 * | 1/2010 | Shibutani et al. | 380/28 |
| 2010/0014664 | A1 * | 1/2010 | Shirai et al. | 380/44 |
| 2010/0061548 | A1 * | 3/2010 | Shirai et al. | 380/28 |
| 2010/0091991 | A1 * | 4/2010 | Shibutani et al. | 380/259 |
| 2010/0104093 | A1 * | 4/2010 | Shirai et al. | 380/28 |
| 2010/0226493 | A1 * | 9/2010 | Shirai et al. | 380/28 |
| 2010/0266122 | A1 * | 10/2010 | Suzaki et al. | 380/28 |
| 2011/0026706 | A1 * | 2/2011 | Shirai et al. | 380/28 |
| 2011/0110519 | A1 * | 5/2011 | Suzaki et al. | 380/255 |
| 2011/0211688 | A1 * | 9/2011 | Shirai et al. | 380/28 |
| 2011/0293089 | A1 * | 12/2011 | Shirai et al. | 380/46 |

FOREIGN PATENT DOCUMENTS

| | | | |
|---|---|---|---|
| EP | 1975908 A1 * | 10/2008 | |
| EP | 2048641 A1 * | 4/2009 | |
| EP | 2058780 A1 * | 5/2009 | |
| JP | 5-95350 | 4/1993 | |
| WO | WO 2006046187 A1 * | 5/2006 | |

OTHER PUBLICATIONS

Masayuki Kanda et al., "A Strategy for Constructing Fast Round Functions with Practical Security Against Differential and Linear Cryptanalysis," Lecture Notes in Computer Science, vol. 1556, pp. 264-279 (1999).

Masayuki Kanda et al., "On the Design of Linear Transformation Layers for SPN Structures," SPN, vol. 42, No. 8, pp. 2087-2097 (Aug. 2001).

Taizo Shirai et al., "Improving Immunity of Feistel Ciphers Against Differential Cryptanalysis by Using Multiple MDS Matrices", Lecture Notes in Computer Science, vol. 3017, pp. 260-278 (2004).

Taizo Shirai et al., "On Feistel Structures Using Optimal Diffusion Mappings Across Multiple Rounds," Lecture Notes in Computer Science, vol. 3329, pp. 1-15 (2004).

Jaechul Sung et al., "Provable Security for the Skipjack-like Structure Against Differential Cryptanalysis and Linear Cryptanalysis," Lecture Notes in Computer Science, vol. 1976, pp. 274-288 (2000).

Haruki Seki et al., Differential Cryptanalysis of CAST-256 Reduced to Nine Quad-Rounds, IEICE Transactions on Fundamentals of Electronics, Communications and Computer Sciences, vol. E84-A No. 4 (Apr. 2001).

The 128 bit Blockciper CLEFIA Design Rationale, Revision 1.0 [online] Jun. 1, 2007 [retrieved on Aug. 3, 2007]. Retrieved from the Internet: <URL: http://www.sony.net/Products/clefia/technical/index.html>.

Nyberg, Kaisa, *"Generalized Feistel Networks,"* Finish Defence Forces, CIS Division, Helsinki, Finland, ASIACRYPT '96, pp. 91-104, Springer-Verlag 1996.

Zheng, Yuliang, et al. *On the Construction of Block Ciphers Provably Secure and Not Relying on any Unproved Hypotheses*, Division of Electrical and Computer Engineering, Yokohama National University, Yokohama, Japan, CRYPTO 1989, pp. 461-480.

* cited by examiner

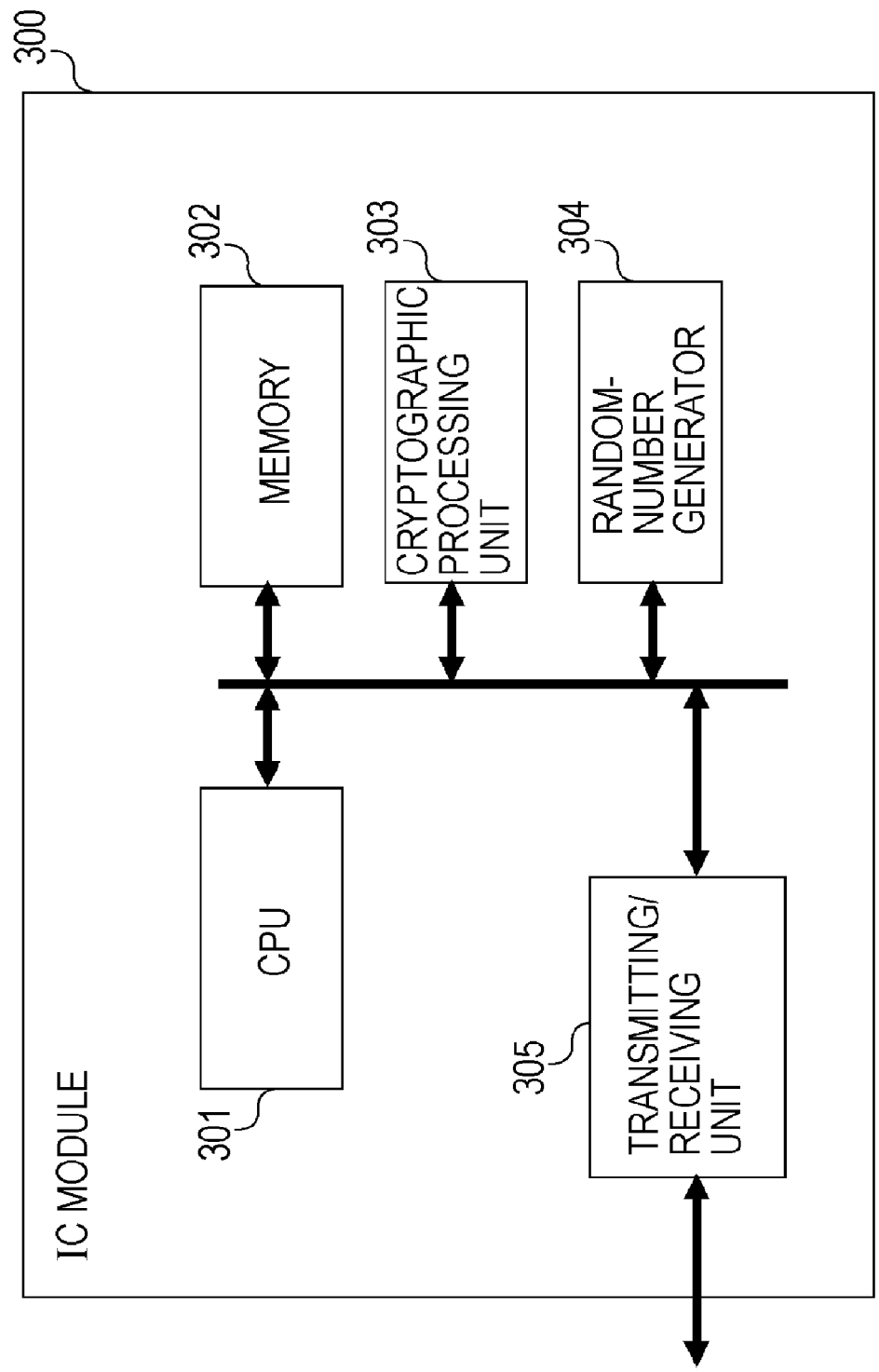

CRYPTOGRAPHIC PROCESSING APPARATUS, ALGORITHM CONSTRUCTING METHOD, PROCESSING METHOD, AND COMPUTER PROGRAM APPLYING AN EXTENDED FEISTEL STRUCTURE

TECHNICAL FIELD

The present invention relates to a cryptographic processing apparatus, a cryptographic-processing-algorithm constructing method, and a cryptographic processing method, and a computer program. More specifically, the present invention relates to a cryptographic processing apparatus, a cryptographic-processing-algorithm constructing method, and a cryptographic processing method which perform Feistel-type common-key block-cipher processes, and a computer program.

BACKGROUND ART

Nowadays, with the development of network communication and electronic commerce, security ensuring in communication has become an important issue. One method for ensuring security is cryptographic technology, and communication using various encryption techniques is currently done in actuality.

For example, a system has been put into practical use, in which a cryptographic processing module is embedded in a compact device such as an IC card, and in which data transmission and reception is performed between the IC card and a reader/writer serving as a data reading and writing apparatus, thereby performing an authentication process or encryption and decryption of transmitted and received data.

There are various cryptographic processing algorithms, which are broadly classified into a public-key cryptographic scheme in which an encryption key and a decryption key are set as different keys, for example, a public key and a secret key, and a common-key cryptographic scheme in which an encryption key and a decryption key are set as a common key.

The common key cryptographic scheme has various algorithms. One of them is a scheme in which a plurality of keys are generated on the basis of a common key, and in which a data transformation process in units of blocks (such as 64-bit or 128-bit) is repeatedly performed using the plurality of generated keys. A typical algorithm to which such a key generation scheme and a data transformation process are applied is a common-key block-cipher scheme.

As a typical common-key block-cipher algorithm, for example, a DES (Data Encryption Standard) algorithm, which is a U.S. standard cryptography, is broadly used in various fields.

The common-key block-cipher algorithm, typified by the DES, can be mainly divided into round-function sections that perform transformation of input data, and a key scheduling section that generates round keys applied in respective rounds of the round-function (F-function) sections. Round keys (sub-keys) that are to be applied in the respective rounds of the round-function sections are generated on the basis of one master key (a main key) that is input to the key scheduling section, and are applied in the respective round-function sections.

A Feistel structure has been known as a specific structure for executing an algorithm to which such round functions are applied. The Feistel structure has a structure that transforms plaintext into ciphertext by simply repeating transformation functions which are called round functions. Examples of documents describing cryptographic processes to which Feistel structures are applied include Non-Patent Document 1 and Non-Patent Document 2.

However, for example, a common-key cryptographic process to which a Feistel structure is applied has a problem of leakage of keys due to cryptanalysis. Differential analysis (also called differential cryptanalysis or differential attack), in which keys applied in respective round functions are analyzed by analyzing multiple pieces of input data (plaintext) having a certain difference and pieces of output data (ciphertext) for the input data, and linear analysis (also called linear cryptanalysis or linear attack), in which analysis based on plaintext and corresponding ciphertext is performed, have been known as typical techniques of cryptanalysis or attack techniques.

Easy analysis of keys due to cryptanalysis implies low security of a cryptographic process using the keys. In cryptographic algorithms of the prior art, because processes (transformation matrices) that are applied in linear transformation sections of round-function (F-function) sections are equal to one another in rounds of respective stages, analysis is feasible, resulting in easy analysis of keys.

As a configuration for dealing with such a problem, a configuration has been proposed, in which two or more different matrices are arranged in linear transformation sections of round-function (F-function) sections in a Feistel structure. This technique is called a diffusion-matrix switching mechanism (DSM: Diffusion Switching Mechanism, hereinafter, referred to as "DSM"). Resistance to differential attacks or linear attacks can be enhanced using this DSM.

The diffusion-matrix switching mechanism (DSM) is provided as a configuration that can be applied to a typical Feistel structure having two data lines. In contrast, there is an extended-type Feistel structure having three or more data lines, which is different from the typical Feistel structure having two data lines. However, no configuration has been disclosed, in which the above-mentioned diffusion-matrix switching mechanism (DSM) is applied in such an extended-type Feistel structure having three or more data lines so that resistance to differential attacks or linear attacks is enhanced.
Non-Patent Document 1: K. Nyberg, "Extended Feistel structures", ASIACRYPT'96, SpringerVerlag, 1996, pp. 91-104.
Non-Patent Document 2: Yuliang Zheng, Tsutomu Matsumoto, Hideki Imai: On the Construction of Block Ciphers Provably Secure and Not Relying on Any Unproved Hypotheses. CRYPTO 1989: 461-480

DISCLOSURE OF INVENTION

Technical Problem

The present invention has been made in view of the foregoing problems, and aims to provide a cryptographic processing apparatus, a cryptographic-processing-algorithm constructing method, and a cryptographic processing method which realize common-key block-cipher algorithms with a high resistance to linear analysis and differential analysis, and a computer program.

More specifically, round-function sections to which a plurality of different linear transformation matrices are applied are set in a Feistel structure obtained by expanding a Feistel structure having two data lines, i.e., in an extended-type Feistel structure having any number of data lines that is equal to or more than two, such as three or four, thereby aiming to provide a cryptographic processing apparatus, a cryptographic-processing-algorithm constructing method, and a cryptographic processing method which realize common-key block-cipher algorithms with a high resistance to linear analysis and differential analysis, and a computer program.

Technical Solution

A first aspect of the present invention resides in:

a cryptographic processing apparatus characterized by including a cryptographic processing section that performs a Feistel-type common-key block-cipher process of repeating an SP-type F-function in a plurality of rounds, the SP-type F-function performing a data transformation process including a non-linear transformation process and a linear transformation process, wherein the cryptographic processing section is configured to perform a cryptographic process to which an extended Feistel structure having a number of data lines: d that is set to an integer satisfying $d \geq 2$ is applied, is configured to selectively apply a plurality of at least two or more different matrices to linear transformation processes that are performed in F-functions in respective rounds, the plurality of two or more different matrices being a plurality of different matrices satisfying a condition in which a minimum number of branches for all of the data lines is equal to or more than a predetermined value, the minimum number of branches for all of the data lines being selected from among minimum numbers of branches corresponding to the data lines, each of the minimum numbers of branches corresponding to the data lines being based on linear transformation matrices included in F-functions that are input to a corresponding data line in the extended Feistel structure, and is configured so that the plurality of different matrices are repeatedly arranged in the F-functions that are input to the respective data lines in the extended Feistel structure.

Furthermore, in an embodiment of the cryptographic processing apparatus of the present invention, it is characterized in that the plurality of different matrices, which are utilized in the cryptographic processing section, are a plurality of different matrices satisfying a condition in which a minimum number of branches $[B_k^D]$ for all of the data lines is equal to or more than three, the minimum number of branches $[B_k^D]$ for all of the data lines being selected from among minimum numbers of branches $[B_k^D(s(i))]$ corresponding to the data lines, each of the minimum numbers of branches $[B_k^D(s(i))]$ corresponding to the data lines being calculated on the basis of linear transformation matrices included in k (where k is an integer equal to or more than two) continuous F-functions that are input to a corresponding data line s(i) in the extended Feistel structure.

Furthermore, in an embodiment of the cryptographic processing apparatus of the present invention, it is characterized in that the plurality of different matrices, which are utilized in the cryptographic processing section, are a plurality of different matrices satisfying a condition in which a minimum number of branches $[B_2^D]$ for all of the data lines is equal to or more than three, the minimum number of branches $[B_2^D]$ for all of the data lines being selected from among minimum numbers of branches $[B_2^D(s(i))]$ corresponding to the data lines, each of the minimum numbers of branches $[B_2^D(s(i))]$ corresponding to the data lines being calculated on the basis of linear transformation matrices included in two continuous F-functions that are input to a corresponding data line s(i) in the extended Feistel structure.

Furthermore, in an embodiment of the cryptographic processing apparatus of the present invention, it is characterized in that the plurality of different matrices, which are utilized in the cryptographic processing section, are a plurality of different matrices satisfying a condition in which a minimum number of branches $[B_2^L]$ for all of the data lines is equal to or more than three, the minimum number of branches $[B_2^L]$ for all of the data lines being selected from among minimum numbers of branches $[B_2^L(s(i))]$ corresponding to the data lines, each of the minimum numbers of branches $[B_2^L(s(i))]$ corresponding to the data lines being calculated on the basis of linear transformation matrices included in two continuous F-functions that are input to a corresponding data line s(i) in the extended Feistel structure.

Furthermore, in an embodiment of the cryptographic processing apparatus of the present invention, it is characterized in that, when the plurality of different matrices are denoted by n (where n is an integer equal to or more than two) different matrices, i.e., $M_0, M_1, \ldots M_{n-1}$, the cryptographic processing section is configured so that the different matrices $M_0, M_1, \ldots M_{n-1}$ are repeatedly arranged in an order in the F-functions that are input to the respective data lines in the extended Feistel structure.

Furthermore, in an embodiment of the cryptographic processing apparatus of the present invention, it is characterized in that the cryptographic processing section is configured to perform a cryptographic process to which an extended Feistel structure that performs only one F-function in one round is applied.

Furthermore, in an embodiment of the cryptographic processing apparatus of the present invention, it is characterized in that the cryptographic processing section is configured to perform a cryptographic process to which an extended Feistel structure that performs a plurality of F-functions in parallel in one round is applied.

Furthermore, in an embodiment of the cryptographic processing apparatus of the present invention, it is characterized in that the cryptographic processing section is configured to perform, when a is any integer satisfying $a \geq 2$ and x is any integer satisfying $x \geq 1$, a cryptographic process to which an extended Feistel structure that utilizes a types of F-functions and that has the number of data lines: d which is set as d=2ax is applied, the a types of F-functions performing different linear transformation processes using the plurality of different matrices, and configured to perform equally x pieces of each of the types (the a types) of F-functions in one round.

Furthermore, in an embodiment of the cryptographic processing apparatus of the present invention, it is characterized in that the cryptographic processing section is configured by including: an F-function performing unit that performs ax F-functions which are performed in parallel in one round; and a control unit that performs data input/output control for the F-function performing unit.

Furthermore, in an embodiment of the cryptographic processing apparatus of the present invention, it is characterized in that the cryptographic processing section includes: a plurality of F-function performing units that perform different linear transformation processes using the plurality of different matrices; and a control unit that changes a sequence of utilizing the plurality of F-function performing units in accordance with a setting, wherein the control unit is configured to selectively perform any of cryptographic processes (a), (b1), and (b2), i.e., (a) a cryptographic process using a Feistel structure having the number of data lines d that is set as d=2, (b1) a cryptographic process which uses an extended Feistel structure having the number of data lines d that is set to any number satisfying $d \geq 2$, and in which only one F-function is allowed to be performed in each round, or (b2) a cryptographic process which uses an extended Feistel structure having the number of data lines d that is set to any number satisfying d≧2, and in which a plurality of F-functions are allowed to be performed in parallel in each round.

Furthermore, in an embodiment of the cryptographic processing apparatus of the present invention, it is characterized in that the control unit is configured to select a processing mode to be performed in accordance with a bit length of data that is to be subjected to an encryption or decryption process.

A second aspect of the present invention resides in:

a cryptographic processing method for performing a cryptographic process in a cryptographic processing apparatus, the method characterized by including a cryptographic processing step of performing a Feistel-type common-key block-cipher process of repeating an SP-type F-function in a plurality of rounds in a cryptographic processing section, the SP-type F-function performing a data transformation process including a non-linear transformation process and a linear transformation process, wherein the cryptographic processing step is a step of performing a cryptographic process to which an extended Feistel structure having a number of data lines: d that is set to an integer satisfying d≧2 is applied, and includes an operation step of performing operations in which a plurality of at least two or more different matrices are selectively applied to linear transformation processes that are performed in F-functions in respective rounds, wherein the plurality of different matrices, which are applied in the operation step, are a plurality of different matrices satisfying a condition in which a minimum number of branches for all of the data lines is equal to or more than a predetermined value, the minimum number of branches for all of the data lines being selected from among minimum numbers of branches corresponding to the data lines, each of the minimum numbers of branches corresponding to the data lines being based on linear transformation matrices included in F-functions that are input to a corresponding data line in the extended Feistel structure, and wherein the operation step is a step of performing linear transformation operations based on the plurality of different matrices in the F-functions that are input to the respective data lines in the extended Feistel structure.

Furthermore, in an embodiment of the cryptographic processing method of the present invention, it is characterized in that the plurality of different matrices are a plurality of different matrices satisfying a condition in which a minimum number of branches $[B_k^D]$ for all of the data lines is equal to or more than three, the minimum number of branches $[B_k^D]$ for all of the data lines being selected from among minimum numbers of branches $[B_k^D(s(i))]$ corresponding to the data lines, each of the minimum numbers of branches $[B_k^D(s(i))]$ corresponding to the data lines being calculated on the basis of linear transformation matrices included in k (where k is an integer equal to or more than two) continuous F-functions that are input to a corresponding data line s(i) in the extended Feistel structure.

Furthermore, in an embodiment of the cryptographic processing method of the present invention, it is characterized in that the plurality of different matrices are a plurality of different matrices satisfying a condition in which a minimum number of branches $[B_2^D]$ for all of the data lines is equal to or more than three, the minimum number of branches $[B_2^D]$ for all of the data lines being selected from among minimum numbers of branches $[B_2^D(s(i))]$ corresponding to the data lines, each of the minimum numbers of branches $[B_2^D(s(i))]$ corresponding to the data lines being calculated on the basis of linear transformation matrices included in two continuous F-functions that are input to a corresponding data line s(i) in the extended Feistel structure.

Furthermore, in an embodiment of the cryptographic processing method of the present invention, it is characterized in that the plurality of different matrices are a plurality of different matrices satisfying a condition in which a minimum number of branches $[B_2^L]$ for all of the data lines is equal to or more than three, the minimum number of branches $[B_2^L]$ for all of the data lines being selected from among minimum numbers of branches $[B_2^L(s(i))]$ corresponding to the data lines, each of the minimum numbers of branches $[B_2^L(s(i))]$ corresponding to the data lines being calculated on the basis of linear transformation matrices included in two continuous F-functions that are input to a corresponding data line s(i) in the extended Feistel structure.

Furthermore, in an embodiment of the cryptographic processing method of the present invention, it is characterized in that, when the plurality of different matrices are denoted by n (where n is an integer equal to or more than two) different matrices, i.e., $M_0, M_1, \ldots M_{n-1}$, the operation step is a step of repeatedly performing the different matrices $M_0, M_1, \ldots M_{n-1}$ in an order in the F-functions that are input to the respective data lines in the extended Feistel structure.

Furthermore, in an embodiment of the cryptographic processing method of the present invention, it is characterized in that the cryptographic processing step is a step of performing a cryptographic process to which an extended Feistel structure that performs only one F-function in one round is applied.

Furthermore, in an embodiment of the cryptographic processing method of the present invention, it is characterized in that the cryptographic processing step is a step of performing a cryptographic process to which an extended Feistel structure that performs a plurality of F-functions in parallel in one round is applied.

Furthermore, in an embodiment of the cryptographic processing method of the present invention, it is characterized in that the cryptographic processing step is a step of performing, when a is any integer satisfying a≧2 and x is any integer satisfying x≧1, a cryptographic process to which an extended Feistel structure that utilizes a types of F-functions and that has the number of data lines: d which is set as d=2ax is applied, the a types of F-functions performing different linear transformation processes using the plurality of different matrices, and a step of performing equally x pieces of each of the types (the a types) of F-functions in one round.

Furthermore, in an embodiment of the cryptographic processing method of the present invention, it is characterized in that the cryptographic processing step is a step of performing a cryptographic process, in which an F-function performing unit that performs ax F-functions performed in parallel in one round is applied, in accordance with control performed by a control unit that performs data input/output control for the F-function performing unit.

Furthermore, in an embodiment of the cryptographic processing method of the present invention, it is characterized in that the cryptographic processing step is a step of performing a cryptographic process by using a plurality of F-function performing units that perform different linear transformation processes using the plurality of different matrices, and by using a control unit that changes a sequence of utilizing the plurality of F-function performing units in accordance with a setting, wherein the cryptographic processing step is a step of, in accordance with control performed by the control unit, selectively performing any of cryptographic processes (a), (b1), and (b2), i.e., (a) a cryptographic process using a Feistel structure having the number of data lines d that is set as d=2, (b1) a cryptographic process which uses an extended Feistel structure having the number of data lines d that is set to any number satisfying d≧2, and in which only one F-function is allowed to be performed in each round, or (b2) a cryptographic process which uses an extended Feistel structure having the number of data lines d that is set to any number satisfying d≧2, and in which a plurality of F-functions are allowed to be performed in parallel in each round.

Furthermore, in an embodiment of the cryptographic processing method of the present invention, it is characterized in that the control unit selects a processing mode to be performed in accordance with a bit length of data that is to be subjected to an encryption or decryption process.

A third aspect of the present invention resides in:

a cryptographic-processing-algorithm constructing method for constructing a cryptographic processing algorithm in an information processing apparatus, the method characterized by including:

a matrix-determining step in which, in a cryptographic-processing-algorithm configuration to which an extended Feistel structure having a number of data lines: d that is set to an integer satisfying d≧2 is applied, a control unit provided in the information processing apparatus determines a plurality of at least two or more different matrices that are to be applied to linear transformation processes performed in F-functions in respective rounds; and a matrix-setting step in which the control unit repeatedly arranges the plurality of different matrices, which are determined in the matrix-determining step, in the F-functions that are input to the respective data lines in the extended Feistel structure, wherein the matrix-determining step is a step of performing a process of determining, as the plurality of two or more different matrices, as matrices to be applied, a plurality of different matrices satisfying a condition in which a minimum number of branches for all of the data lines is equal to or more than a predetermined value, the minimum number of branches for all of the data lines being selected from among minimum numbers of branches corresponding to the data lines, each of the minimum numbers of branches corresponding to the data lines being based on linear transformation matrices included in F-functions that are input to a corresponding data line in the extended Feistel structure.

A fourth aspect of the present invention resides in:

a computer program that causes a cryptographic processing apparatus to perform a cryptographic process, the program characterized by including a cryptographic processing step of causing a cryptographic processing section to perform a Feistel-type common-key block-cipher process of repeating an SP-type F-function in a plurality of rounds, the SP-type F-function performing a data transformation process including a non-linear transformation process and a linear transformation process, wherein the cryptographic processing step is a step of causing the cryptographic processing section to perform a cryptographic process to which an extended Feistel structure having a number of data lines: d that is set to an integer satisfying d≧2 is applied, and includes an operation step of performing operations in which a plurality of at least two or more different matrices are selectively applied to linear transformation processes that are performed in F-functions in respective rounds, wherein the plurality of different matrices, which are applied in the operation step, are a plurality of different matrices satisfying a condition in which a minimum number of branches for all of the data lines is equal to or more than a predetermined value, the minimum number of branches for all of the data lines being selected from among minimum numbers of branches corresponding to the data lines, each of the minimum numbers of branches corresponding to the data lines being based on linear transformation matrices included in F-functions that are input to a corresponding data line in the extended Feistel structure, and wherein the operation step is a step of performing linear transformation operations based on the plurality of different matrices in the F-functions that are input to the respective data lines in the extended Feistel structure.

A fifth aspect of the present invention resides in:

a computer program that causes an information processing apparatus to construct a cryptographic processing algorithm, the program characterized by including:

a matrix-determining step of causing, in a cryptographic-processing-algorithm configuration to which an extended Feistel structure having a number of data lines: d that is set to an integer satisfying d≧2 is applied, a control unit provided in the information processing apparatus to determine a plurality of at least two or more different matrices that are to be applied to linear transformation processes performed in F-functions in respective rounds; and a matrix-setting step of causing the control unit to repeatedly arrange the plurality of different matrices, which are determined in the matrix-determining step, in the F-functions that are input to the respective data lines in the extended Feistel structure, wherein the matrix-determining step is a step of performing a process of determining, as the plurality of two or more different matrices, as matrices to be applied, a plurality of different matrices satisfying a condition in which a minimum number of branches for all of the data lines is equal to or more than a predetermined value, the minimum number of branches for all of the data lines being selected from among minimum numbers of branches corresponding to the data lines, each of the minimum numbers of branches corresponding to the data lines being based on linear transformation matrices included in F-functions that are input to a corresponding data line in the extended Feistel structure.

Note that the computer program of the present invention is a computer program that can be provided using a storage medium or a communication medium, for example, a recording medium such as a CD, a FD, or an MO, or a communication medium such as a network, that provides a program in a computer-readable format for a computer system capable of executing various program codes. Such a program is provided in a computer-readable format, whereby a process according to the program is realized in the computer system.

Further other objects, features, and advantages of the present invention will become apparent from more detailed descriptions based on embodiments of the present invention, which will be described below, or the attached drawings. Note that a "system" mentioned in the specification is configured as a logical set of a plurality of apparatuses, and is not limited to a system in which the apparatuses having respective configurations are contained in the same casing.

Advantageous Effects

According to a configuration in an embodiment of the present invention, in a Feistel-type common-key block-cipher process in which SPN-type F-functions including nonlinear transformation sections and linear transformation sections are repeatedly performed in a plurality of rounds, round-function sections to which a plurality of different linear transformation matrices are applied are set in a Feistel structure obtained by expanding a Feistel structure having two data lines, i.e., in a Feistel structure having any number of data lines that is equal to or more than two, such as three or four, thereby realizing the diffusion-matrix switching mechanism (DSM), so that a common-key block-cipher algorithm can be constructed and a cryptographic process can be performed with a high resistance to linear analysis and differential analysis.

According to a configuration in an embodiment of the present invention, a configuration is provided, in which a cryptographic process to which an extended Feistel structure having a number of data lines: d that is set to an integer satisfying $d \geqq 2$ is applied is performed, and the configuration is provided as a configuration in which a plurality of at least two or more different matrices are selectively applied to linear transformation processes performed in F-functions in respective rounds. A plurality of different matrices satisfying a condition in which a minimum number of branches for all of the data lines is equal to or more than a predetermined value are set as the plurality of two or more different matrices, the minimum number of branches for all of the data lines being selected from among minimum numbers of branches corresponding to the data lines, each of the minimum numbers of branches corresponding to the data lines being based on linear transformation matrices included in F-functions that are input to a corresponding data line in the extended Feistel structure, thereby realizing the diffusion-matrix switching mechanism (DSM), so that a common-key block-cipher algorithm can be constructed and a cryptographic process can be performed with a high resistance to linear analysis and differential analysis.

Furthermore, according to a configuration in an embodiment of the present invention, a configuration is provided, in which a ($a \geqq 2$) types of F-functions perform different linear transformation processes using a plurality of different matrices, in which an extended Feistel structure ($x \geqq 1$) that utilizes the F-functions and that has the number of data lines: d that is set as d=2ax, and in which a cryptographic process to which the extended Feistel structure is applied is performed. The configuration is provided a configuration in which equally x pieces of each of the types (the a types) of F-functions are performed in one round, whereby a compact cryptographic processing apparatus in which no useless circuit is provided is realized.

Furthermore, according to a configuration in an embodiment of the present invention, a plurality of F-function performing units are configured to perform different linear transformation processes using a plurality of different matrices, and a configuration is provided, in which a sequence of utilizing the plurality of F-function performing units is changed in accordance with a setting, whereby a cryptographic processing apparatus is realized, which can selectively perform any of cryptographic processes (a), (b1), and (b2), i.e., (a) a cryptographic process using a Feistel structure having the number of data lines d that is set as d=2, (b1) a cryptographic process which uses an extended Feistel structure having the number of data lines d that is set to any number satisfying $d \geqq 2$, and in which only one F-function is allowed to be performed in each round, or (b2) a cryptographic process which uses an extended Feistel structure having the number of data lines d that is set to any number satisfying $d \geqq 2$, and in which a plurality of F-functions are allowed to be performed in parallel in each round.

BRIEF DESCRIPTION OF DRAWINGS

FIG. 20 is a diagram showing an example of a configuration of an IC module serving as a cryptographic processing apparatus, which performs a cryptographic process, according to the present invention.

BEST MODES FOR CARRYING OUT THE INVENTION

Figure 1:
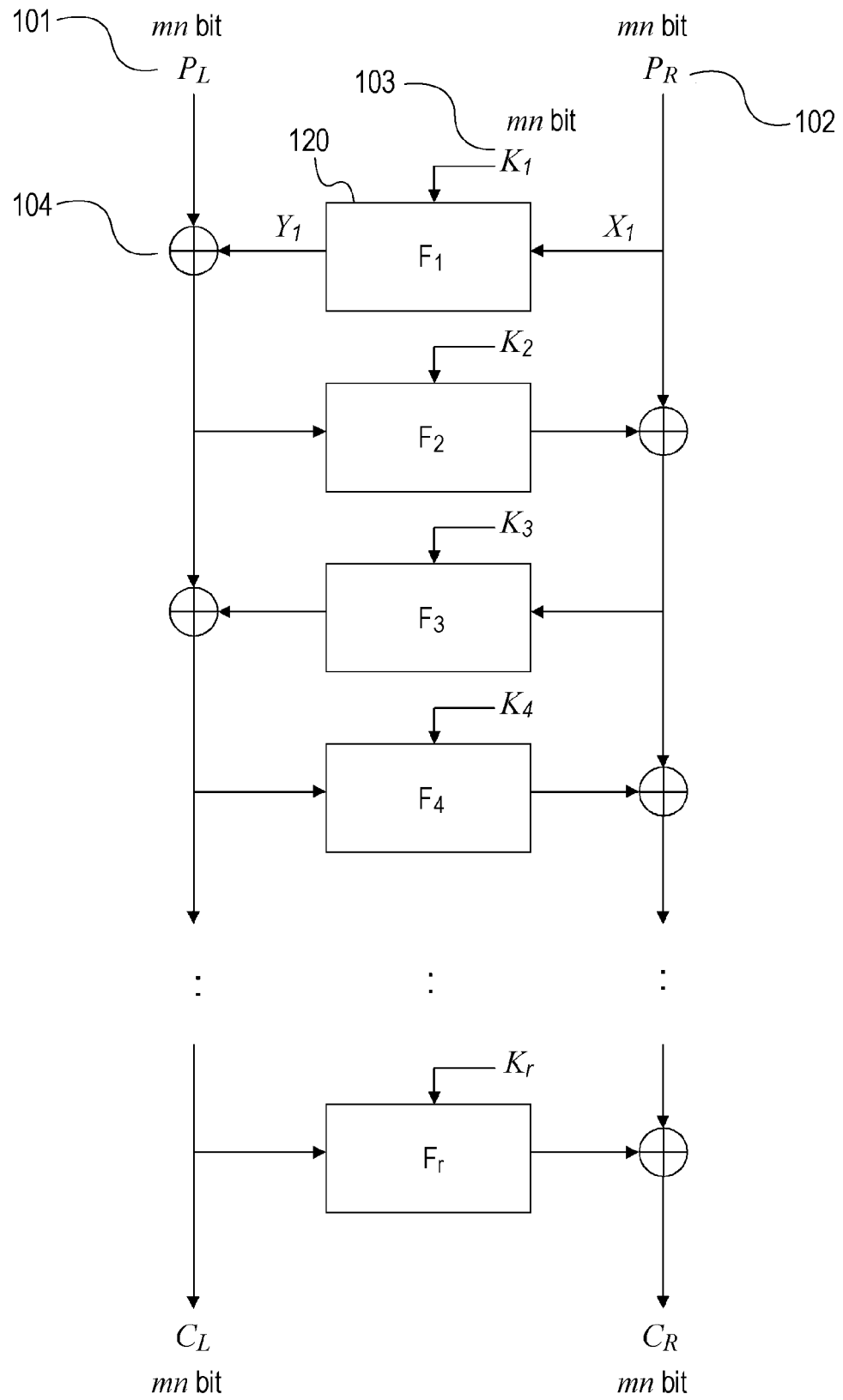
FIG. 1 is a diagram showing a typical common-key block-cipher configuration having a Feistel structure.

A cryptographic processing apparatus and a cryptographic processing method, and a computer program will be described below in details. The description is made in the order of section headings as follows:

1. Feistel Structure Having SP-Type F-Functions
2. Operation Function of Number of Branches and Evaluation Function of Resistance
   2-1. Operation Function of Number of Branches: Branch( )
   2-2. Evaluation Index of Resistance to Differential Attacks
   2-3. Evaluation Index of Resistance to Linear Attacks
3. Method for Setting DSM for Feistel Structure Having Two Data Lines
4. Setting of DSM in Extended Feistel Structure
   4-1. Regarding Extended Feistel Structure
   4-2. Configuration for Enhancing Resistance to Differential Attacks in Extended Feistel Structure
      4-2-1. Configuration for Selecting Matrices, Which Is to Be Set in F-Functions, That Make Value of Minimum Number of Branches $B_2^D$ Equal To or More Than Three
      4-2-2. Configuration for Selecting Matrices, Which Is to Be Set in F-Functions, That Make Value of Minimum Number of Branches $B_k^D$ Equal To or More Than Three
   4-3. Configuration for Enhancing Resistance to Linear Attacks in Extended Feistel Structure
      4-3-1. Configuration for Selecting Matrices, Which Is to Be Set in F-Functions, That Make Value of Minimum Number $B_2^L$ of Branches Equal To or More Than Three
5. Configuration in Which DSM Is Utilized for Extended Feistel Structure Having Specific Form
   5-1. Application of DSM to Extended Feistel Structure of Type 1
   5-2. Application of DSM to Extended Feistel Structure of Type 2
6. Proof of Relationships Between Numbers of Active S-Boxes in Extended Feistel Structure of Each Type and Minimum Numbers of Branches Based on Linear Transformation Matrices in F-Functions
   6-1. Proof of Relationships between Numbers of Active S-Boxes in Extended Feistel Structure of Type 1 and Minimum Numbers of Branches Based on Linear Transformation Matrices in F-Functions
   6-2. Proof of Relationships between Numbers of Active S-Boxes in Extended Feistel Structure of Type 2 and Minimum Numbers of Branches Based on Linear Transformation Matrices in F-Functions
7. Improved Configuration for Implementation Based on Contrivance of Setting of F-Functions and Process of Utilizing F-Functions
   7-1. Method for Efficiently Arranging F-Functions in Extended Feistel Structure of Type 2
   7-2. Commonality of Components in Feistel Structure and Extended Feistel Structure
8. Summary of Cryptographic Processes and Cryptographic Algorithm Constructing Processes of Present Invention
9. Example of Configuration of Cryptographic Processing Apparatus

[1. Feistel Structure Having SP-Type F-Functions]

First, a Feistel structure having SP-type F-functions will be described. A Feistel structure is known as a common-key block-cipher design. The Feistel structure has a structure which transforms plaintext into ciphertext by repeating a basic unit of processing that is referred to as a round function.

A basic configuration of the Feistel structure will be described with reference to FIG. 1. FIG. 1 shows an example of a Feistel structure having two data lines having a number of rounds=r that indicates r rounds. Note that the number of rounds r is a parameter that is determined at a design stage, and that it is a value which can be changed in accordance with, for example, the length of an input key.

In the Feistel structure shown in FIG. 1, it is supposed that the length of plaintext which is input as a target to be encrypted is 2 mn bits, where m and n are both integers. First, the 2 mn-bit plaintext is divided into two pieces of mn-bit input data $P_L$ (Plain-Left) 101 and $P_R$ (Plain-Right) 102, and the input data $P_L$ (Plain-Left) 101 and $P_R$ (Plain-Right) 102 are provided as input values.

The Feistel structure is represented using repetition of the basic unit of processing, which is referred to as a round function, and a data transformation function included in each round is referred to as an F-function 120. In the configuration shown in FIG. 1, an example of a configuration in which the F-function (round function) 120 is repeated in r stages is shown.

For example, in the first round, mn-bit input data X and an mn-bit round key $K_1$ 103, which is input from a key generating section (not illustrated), are input to the F-function 120, and, after a data transformation process is performed in the F-function 120, mn-bit data Y is output. An exclusive OR operation is performed in an exclusive-OR section 104 using the output data Y and the other input data that is input from the previous stage (in a case of the first stage, input data $P_L$), and an mn-bit operation result is output to the next round function. This process, i.e., an encryption process in which the F-function is applied so as to be repeated only times corresponding to a determined number of rounds (r), is completed, and pieces of divided data $C_L$ (Cipher-Left) and $C_R$ (Cipher-Right), which are ciphertext, are output. With the above-described configuration, as a decryption process in the Feistel structure, it is only necessary to reverse the order of inserting round keys, and it is concluded that it is not necessary to configure inverse functions.

Figure 2:
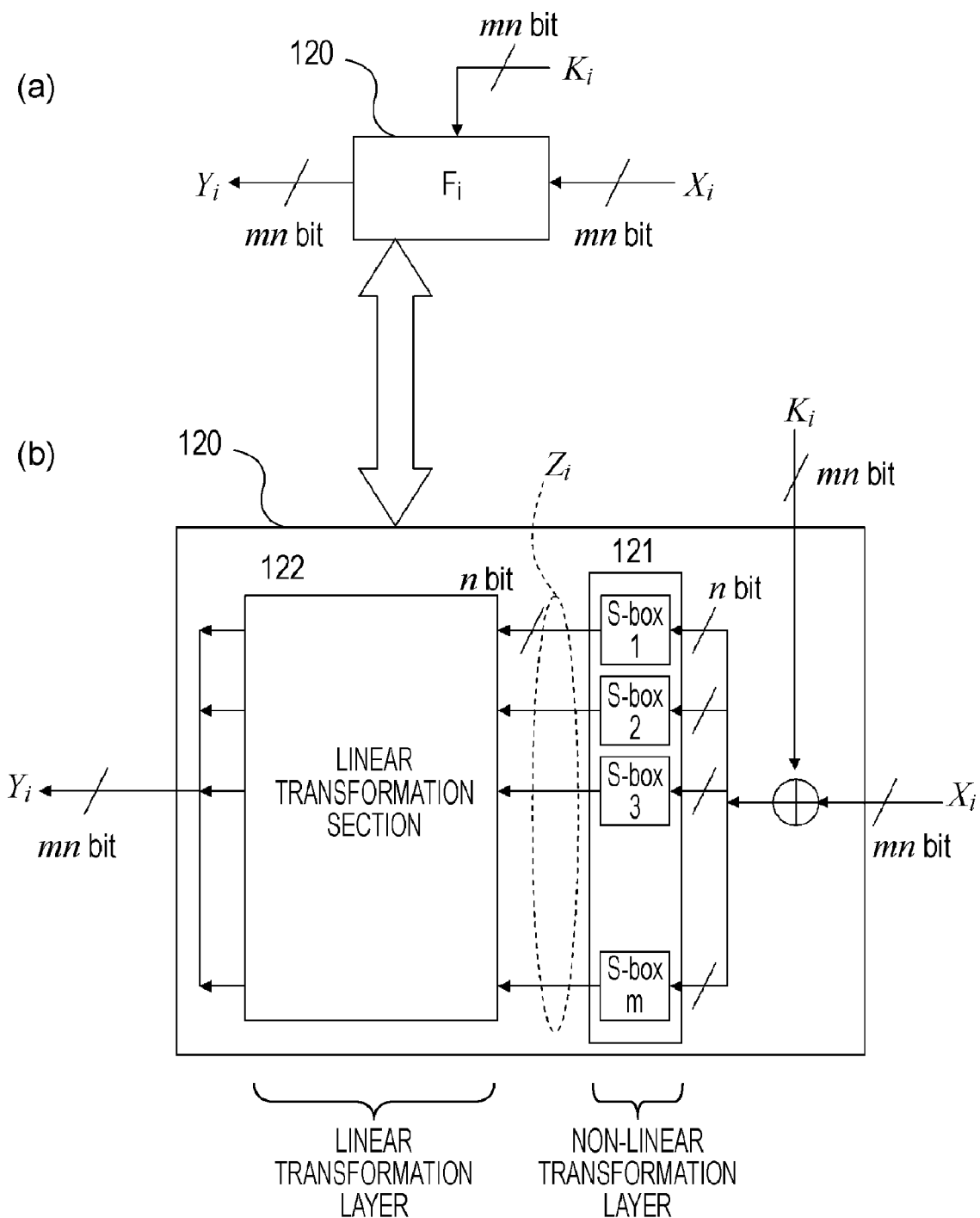
FIG. 2 is a diagram describing a configuration of an F-function that is set as a round-function section.

A configuration of the F-function 120 that is set as a function in each round is described with reference to FIG. 2. Part (a) of FIG. 2 is a diagram showing inputs and an output of the F-function 120 in one round, and part (b) of FIG. 2 is a diagram showing the detailed configuration of the F-function 120. As shown in part (b) of FIG. 2, the F-function 120 has a so-called SP-type configuration in which a non-linear transformation layer (an S layer) and a linear transformation layer (a P layer) are connected to each other.

The F-function 120 shown in FIG. 2 is a function having a setting in which the length of input/output bits is m×n bits (m, n: integers). In the SP-type F-function, first, exclusive OR is performed using key data $K_i$ and data $X_i$. Next, the non-linear transformation layer (the S layer) is applied, and then the linear transformation layer (the P layer) is applied.

Specifically, the non-linear transformation layer (the S layer) is a layer in which m non-linear transformation tables with n-bit inputs and n-bit outputs, which are referred to as S-boxes 121, are arranged, and mn-bit data is divided into n-bit pieces. The n-bit pieces are input to the corresponding S-boxes 121, and data is transformed. In each of the S-boxes 121, a non-linear transformation process, for example, in which a transformation table is applied is performed.

The linear transformation layer (the P layer) is configured using a linear transformation section 122. The linear transformation section 122 takes an mn-bit output value Z, which is data output from the S-boxes 121, as an input, and performs linear transformation for the input to output an mn-bit result. The linear transformation section 122 performs a linear transformation process such as a process of permutating positions of input bits, and outputs an mn-bit output value Y. Exclusive OR is performed using this output value Y and input data that is provided from the previous stage, and the result of exclusive OR is provided as an input value for an F-function of the next round.

Note that, in a configuration of an embodiment described below, linear transformation performed in the linear transformation section 122 serving as the linear transformation layer (the P layer) is defined as linear transformation which is performed so that an mn×mn matrix defined over GF(2) is applied, and that, in addition, a matrix included in the i-th round is referred to as $M_i$. Note that it is supposed that both the S-boxes, which serve as non-linear transformation sections, and linear transformation in the configuration described in the present invention are bijective.

[2. Operation Function of Number of Branches and Evaluation Function of Resistance]

Next, an operation function of the number of branches and an evaluation function of resistance, which are necessary to understand the present invention, will be described.

(2-1. Operation Function of Number of Branches: Branch( ))

An operation function of the number of branches: Branch( ) for optimal diffusion transform (Optimal Diffusion Mappings), which is provided as an example of linear transformation that is performed in the linear transformation section 122 serving as the linear transformation layer (the P layer) included in the above-described F-function, is defined as follows.

A mapping describing linear transformation from n×a-bit data to n×b-bit data is represented as follows:

$$\theta:\{0,1\}^{na} \to \{0,1\}^{nb}$$

The number of branches: $\text{Branch}_n(\theta)$ is defined for the mapping as follows:

$$\text{Branch}_n(\theta) = \min_{\alpha \neq 0}\{hw_n(\alpha) + hw_n(\theta(\alpha))\}$$

Note that $\min_{\alpha \neq 0}\{X_\alpha\}$ represents the minimum value among all $X_\alpha$ satisfying $\alpha \neq 0$, and that $hw_n(Y)$ represents a function of returning the number of (non-zero) elements in which all of n bit pieces of data are not zero when a bit column Y is delimited and represented in units of n bits.

Note that, in this case, a mapping θ that is provided so that $\text{Branch}_n(\theta)$ is b+1 is defined as an optimal diffusion transform.

(2-2. Evaluation Index of Resistance to Differential Attacks)

A common-key cryptographic process in which a Feistel structure is applied has a problem of leakage of keys due to cryptanalysis. Differential analysis (also called differential cryptanalysis or differential attack), in which keys applied in respective round functions are analyzed by analyzing multiple pieces of input data (plaintext) having a certain difference (ΔX) and pieces of output data (ciphertext) for the input data, and linear analysis (also called linear cryptanalysis or linear attack), in which analysis based on plaintext and corresponding ciphertext is performed, have been known as typical techniques of cryptanalysis or attack techniques.

The minimum number of differential active S-boxes included in a differential path that represents connection relationships of differences can be applied as an index for evaluating resistance to differential attacks.

A differential path is a path in which specific differential values are designated for all pieces of data excluding pieces of key data in encryption functions. The differential values are not arbitrarily determined, and the differential values obtained before/after transformation processes are related to one another. Before/after linear transformation processes, the relationships between input differences and output differences are determined as one-to-one relationships. Although, before/after non-linear transformation, the relationships between input differences and output differences are not determined as one-to-one relationships, a concept of probabilities is introduced. It is supposed that probabilities for an input difference and output differences can be calculated in advance. The sum of all probabilities for all outputs is one.

In a Feistel structure having SP-type F-functions, non-linear transformation is performed only in a portion of processes using S-boxes. Accordingly, in this case, a differential path having a probability other than zero represents a set of pieces of differential data that are provided as differential values starting with a differential value for plaintext (input) and ending with a differential value for ciphertext (output), and differential values that are provided before/after all S-boxes are differential values having probabilities other than zero. An S-box which is included in a differential path having a probability other than zero, and to which a differential value that is not zero is input is referred to as a "differential active S-box". The minimum number among the numbers of active S-boxes in all differential paths having probabilities other than zero is referred to as a "minimum number of differential active S-boxes", and the value of this number is known as a safety index for differential attacks. Note that there is no point in attacking a differential path in which all differential values are zero because the probability of the path becomes one. Thus, the path will not be considered below.

In an embodiment of the present invention, a configuration is provided, in which the minimum number of differential active S-boxes is ensured to be large, thereby enhancing safety for differential attacks.

(2-3. Evaluation Index of Resistance to Linear Attacks)

Furthermore, the minimum number of linear active S-boxes included in a linear path that represents connection relationships of linear masks (although it is referred to as a "linear approximation" in most cases, herein, a word "path" is used in order to correspond to difference) can be applied as an index for evaluating resistance to linear attacks.

A linear path is a path in which specific linear mask values are designated for all pieces of data excluding pieces of key data in encryption functions. The linear mask values are not arbitrarily determined, and the linear values obtained before/after transformation processes are related to one another. Before/after linear transformation processes, the relationships between input linear mask values and output linear mask values are determined as one-to-one relationships. Although, before/after non-linear transformation, the relationships between input linear mask values and output linear mask values are not determined as one-to-one relationships, a concept of probabilities is introduced. A set of one or more linear mask values that can be output exists for an input linear mask value, and probabilities that the respective linear mask values are output can be calculated in advance. The sum of all probabilities for all outputs is one.

In a Feistel structure having SP-type F-functions, non-linear transformation is performed only in a portion of processes using S-boxes. Accordingly, in this case, a linear path having a probability other than zero represents a set of pieces of linear-mask-value data that are provided as linear values starting with a linear value for plaintext (input) and ending with a linear value for ciphertext (output), and linear values that are provided before/after all S-boxes are linear values having probabilities other than zero. An S-box which is included in a linear path having a probability other than zero, and to which a linear value that is not zero is input is referred to as a "linear active S-box". The minimum number among the numbers of active S-boxes in all linear paths having probabilities other than zero is referred to as a "minimum number of linear active S-boxes", and the value of this number is known as a safety index for linear attacks. Note that there is no point in attacking a linear path in which all linear mask values are zero because the probability of the path becomes one. Thus, the path will not be considered below.

In an embodiment of the present invention, a configuration is provided, in which the minimum number of linear active S-boxes is ensured to be large, thereby enhancing safety for linear attacks.

[3. Method for Setting DSM for Feistel Structure Having Two Data Lines]

As described previously, a configuration in which the diffusion-matrix switching mechanism (DSM: Diffusion Switching Mechanism, hereinafter, referred to as "DSM") is applied has been proposed as a configuration for enhancing resistance to the above-described differential attacks or linear attacks in a cryptographic process in which a Feistel structure is applied. The DSM has a configuration in which two or more different matrices are arranged in linear transformation sections of round-function (F-function) sections in a Feistel structure. With the DSM, the minimum number of linear active S-boxes can be ensured to be large, whereby resistance to the differential attacks or linear attacks can be enhanced.

An outline of the DSM will be described. When the diffusion-matrix switching mechanism (DSM) is applied in a Feistel structure, a plurality of different matrices are provided as matrices that are applied in linear transformation sections (P layers) of round-function (F-function) sections constituting the Feistel structure. For example, all of the matrices applied in the respective rounds in the Feistel structure having r rounds as shown in FIG. 1 are not set as the same linear transportation matrices, and at least two or more types of matrices are arranged in accordance with a specific rule.

Figure 3:
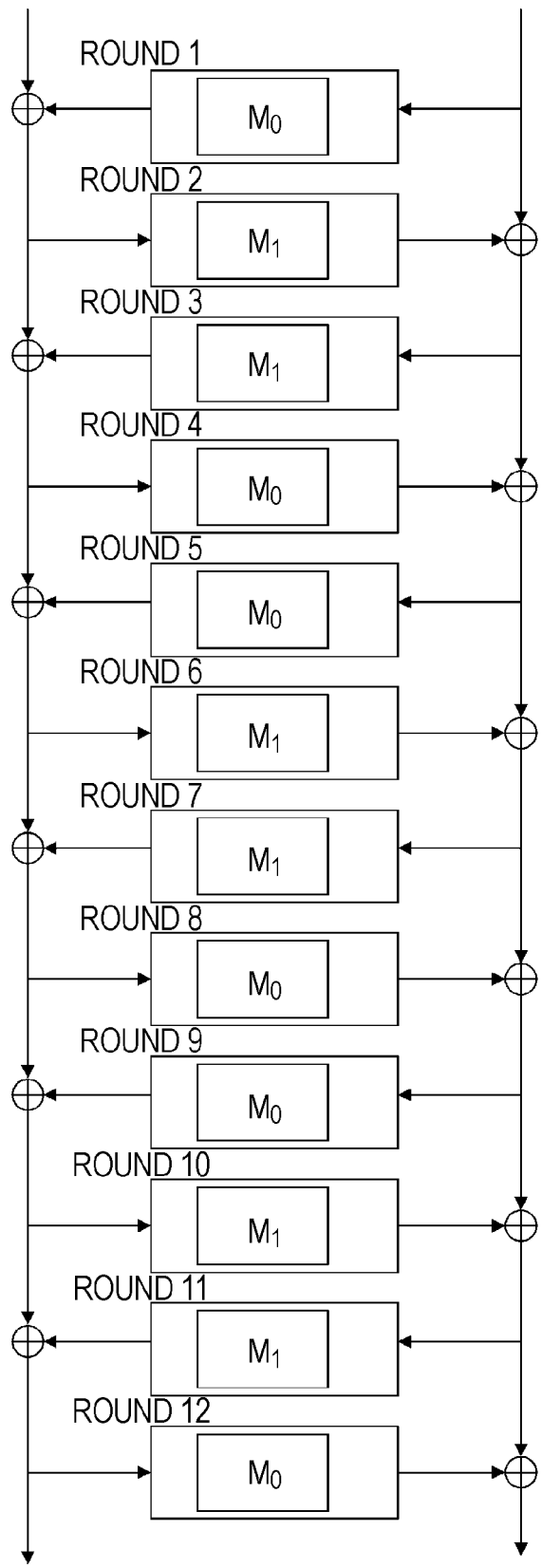
FIG. 3 is a diagram describing a Feistel-type cryptographic algorithm in which two different liner transformation matrices are utilized.
Figure 4:
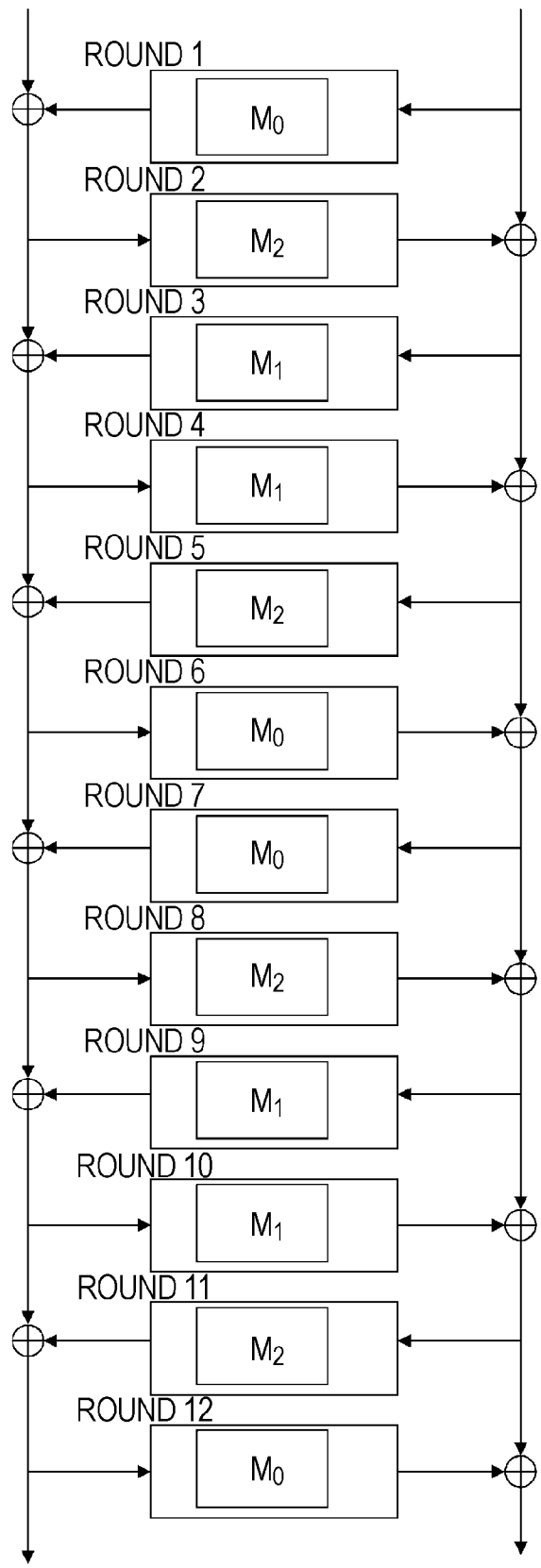
FIG. 4 is a diagram describing a Feistel-type cryptographic algorithm in which three different liner transformation matrices are utilized.

For example, FIG. 3 shows an example of a Feistel structure in which the diffusion-matrix switching mechanism (DSM) is realized using two linear transformation matrices $M_0$ and $M_1$, and FIG. 4 shows an example of a Feistel structure in which the diffusion-matrix switching mechanism (DSM) is realized using three linear transformation matrices $M_0$, $M_1$, and $M_2$.

In the example of the Feistel structure shown in FIG. 3, the two linear transformation matrices $M_0$ and $M_1$ are configured as different matrices. Additionally, in the example of the Feistel structure shown in FIG. 4, the three linear transformation matrices $M_0$, $M_1$, and $M_2$ are configured as different matrices.

In order to realize the diffusion-matrix switching mechanism (DSM), it is necessary that applied matrices satisfy predetermined conditions. One of the conditions is a constraint concerning the above-described number of branches (Branch). This constraint will be described below.

Regarding the number of branches in each of a plurality of different matrices $M_0$ to $M_n$ applied to linear transformation performed in round-function sections of a Feistel structure, the minimum number of branches in an applied matrix: $B_1^D$, and the minimum numbers of branches corresponding to incidence matrices of a plurality of applied matrices: $B_2^D$, $B_3^D$, and $B_2^L$ are defined as follows:

$$B_1^D = \min_i(Branch_n(M_i))$$ [Equation 1]

$$B_2^D = \min_i(Branch_n[(M_i \mid M_{i+2})])$$

$$B_3^D = \min_i(Branch_n[(M_i|M_{i+2}|M_{i+4})])$$

$$B_2^L = \min_i(Branch_n[({}^tM_i^{-1} \mid {}^tM_{i+2}^{-1})])$$

In the equations, $M_i$ denotes a linear transformation matrix applied to a linear transformation process in the i-th round in the Feistel structure, $[M_i|M_{i+2}| \ldots ]$ denotes an incidence matrix obtained by concatenating respective matrices $M_i|M_{i+2}| \ldots$, $t_M$ denotes a transposed matrix of a matrix M, and $M^{-1}$ denotes an inverse matrix of the matrix M.

In the above-described equations, specifically: $B_2^D$, $B_3^D$, and $B_2^L$ denote the minimum values of the numbers of branches in matrices obtained by connecting matrices included in F-functions in two or three rounds that are consecutively provided every other round in the Feistel structure to one another.

For example, it is known that the respective matrices are set so that the above-described respective numbers of branches satisfy the following conditions, i.e., $B_2^D \geq 3, B_3^D \geq 3$, and $B_2^L \geq 3$, whereby the resistance to differential attacks or linear attacks can be enhanced in the Feistel structure.

Note that the respective subscripts and superscripts of $B_1^D$, $B_2^D$, $B_3^D$, and $B_2^L$ have the following meanings.

That is, n of $B_n^D$ denotes the number of matrices that are connected to one another, D of $B_n^D$ denotes a condition for having resistance to differential attacks, and L of $B_n^L$ denotes a condition for having resistance to linear attacks.

[4. Setting of DSM in Extended Feistel Structure]

In the present invention, a configuration is proposed, in which the diffusion-matrix switching mechanism (DSM) is realized in a Feistel structure having any number of data lines that are two or more data lines, for example, three lines or four lines, instead of in the Feistel structure having two data lines. The configuration will be described below in detail.

A Feistel structure to be described in the present invention is an extended Feistel structure in which the number of divisions that is the number of data lines is denoted by d for generalization although it is the same as the above-described Feistel structure having two data lines in that SP-type F-functions are used, where d is an integer that is equal to or more than two.

Although the configuration in which the diffusion-matrix switching mechanism (DSM) is applied to the Feistel structure in the limited case in which the number of data lines=2 holds has been proposed as described above, a method has not been known, in which resistance is enhanced by applying the DSM to an extended Feistel structure having the number of data lines d that is set to any number d satisfying d≧2. In the present invention, a configuration is realized, in which resistance to differential attacks or linear attacks is enhanced by applying the diffusion-matrix switching mechanism (DSM) to an extended Feistel structure having the number of data lines d that is set to any number satisfying d≧2.

Specific configurations and process examples of the present invention will be described below.

(4-1. Regarding Extended Feistel Structure)

Definitions of an extended Feistel structure will be described with reference to FIG. 5. In the specification, an extended Feistel structure is defined as follows:

1. Has d (d is equal or more than two) data lines, and the size of each of the data lines is mn bits.

2. The input/output size of an F-function is mn bits.

3. Has rounds that are referred to as units of processing. One data line or a plurality of data lines are subjected to a transformation process using an F-function in a round. The result is subjected to exclusive-OR using another data line. However, when two or more F-functions are included in one round, duplicated data lines do not exist as data lines that serve as inputs/outputs of all of the F-functions.

An example of the extended Feistel structure that is constructed in accordance with the above-described definitions will be described with reference to FIG. 5.

The above-mentioned definition 1. Has d (d is equal to or more than two) data lines, and the size of each of the data lines is mn bits.

The definition is described with reference to FIG. 5. The definition means that, in FIG. 5, the input/output size of each data line that is each of data lines 1 to d is mn bits, and that the total number of bits for an input/output is dmn bits.

The above-described definition 2. The input/output size of an F-function is mn bits.

The definition is described with reference to FIG. 5. For example, mn bits that are output as an operation result from an exclusive-OR (XOR) operation section 201 serving as an upper stage are input to an F-function 202 via a data line 2. Furthermore, a round key K is input, and an operation process is performed. This operation process is the process that has been described with reference to part (b) of FIG. 2, and includes non-linear transformation performed in the S-boxes and a linear transformation process, in which the linear transformation matrix Mi is applied, that is performed in the linear transformation section. The output of the F-function 202 is mn bits, and is input to an exclusive-OR (XOR) operation section 203 of a data line 4.

The above-described definition 3. Has rounds that are referred to as units of processing. One data line or a plurality of data lines are subjected to a transformation process using an F-function in a round. The result is subjected to exclusive-OR using another data line. However, when two or more F-functions are included in one round, duplicated data lines do not exist as data lines that serve as inputs/outputs of all of the F-functions.

The definition is described with reference to FIG. 5.

Figure 5:
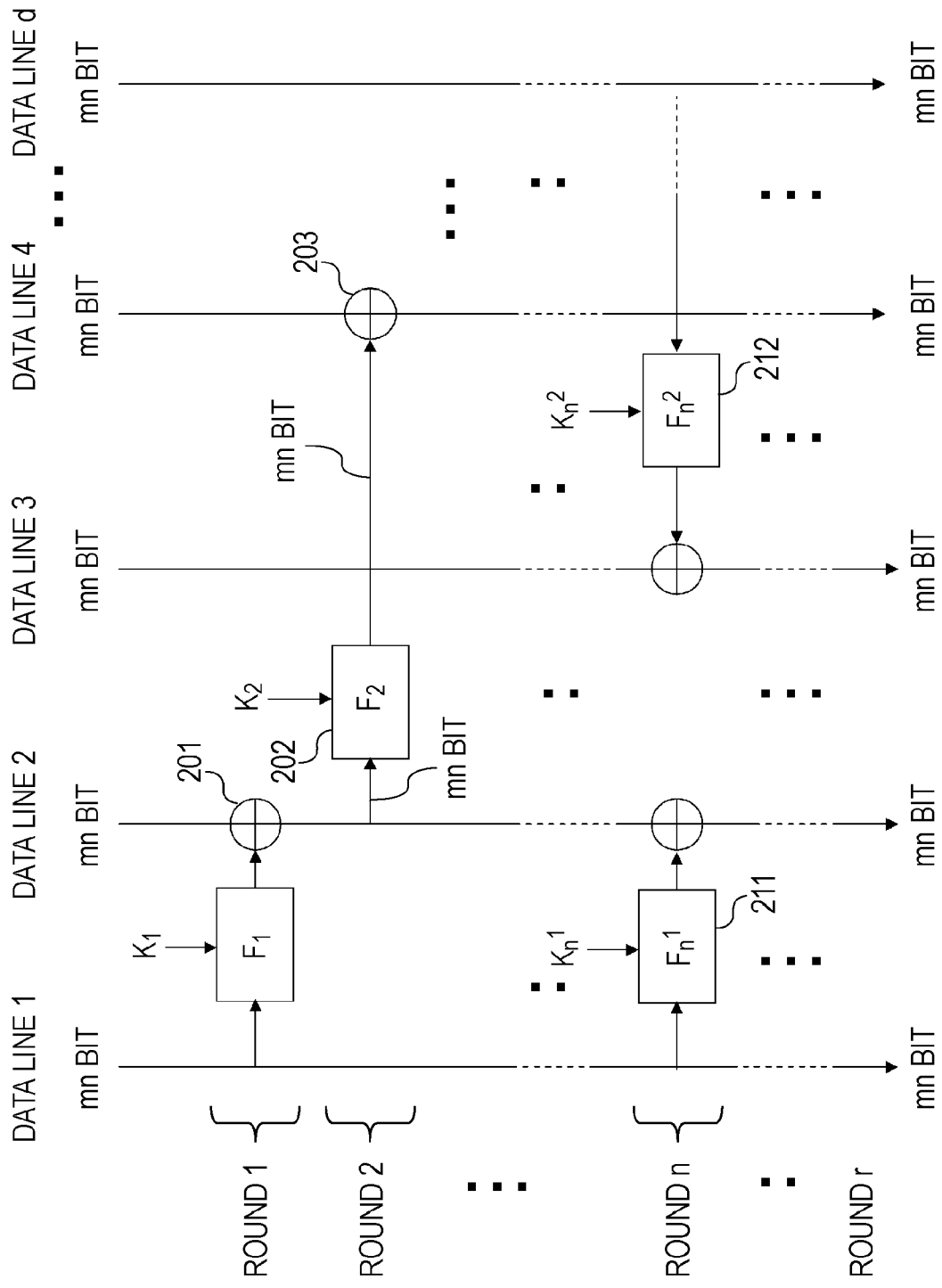
FIG. 5 is a diagram describing definitions of an extended Feistel structure.

FIG. 5 shows an extended Feistel structure having an r-round configuration. One or more F-functions are included in each rount, and the result is subjected to exclusive OR using another data line. Regarding a round n shown in FIG. 5, a plurality of F-functions are included in one round, and are an F-function 211 and an F-function 212 shown in FIG. 5.

As described above, when a plurality of F-functions are included in one round, input/output lines of the respective F-functions are data lines different from one another, and are set so that duplicated data lines are not applied as the input/output data lines.

An input data line of the F-function 211 shown in FIG. 5 is a data line 1, and an output data line of the F-function 211 is a data line 2.

An input data line of the F-function 212 is any one of data lines 5 or more, and an output data line of the F-function 212 is a data line 3.

The input/output data lines are set so as not to be duplicated.

Note that, as shown also in FIG. 5, in the specification, an F-function is denoted by [F], and a round key is denoted by [K]. Subscripts and superscripts that are set for the respective identifiers F and K have the following meanings:

That is, i of $F_i^n$ or $K_i^n$ denotes a round, and n denotes an identification number of an F-function or a round key in the same round.

Note that a linear transformation matrix that is applied in a linear transformation section of an F-function in each round is denoted by [M] in the description given below although it is not illustrated. As in the above-described case, a subscript and a superscript that are set for M have the following meanings.

That is, i of $M_i^n$ denotes a round, and n denotes an identification number of a linear transformation matrix for a corresponding one of a plurality of F-functions that are set in the same round.

Figure 6:
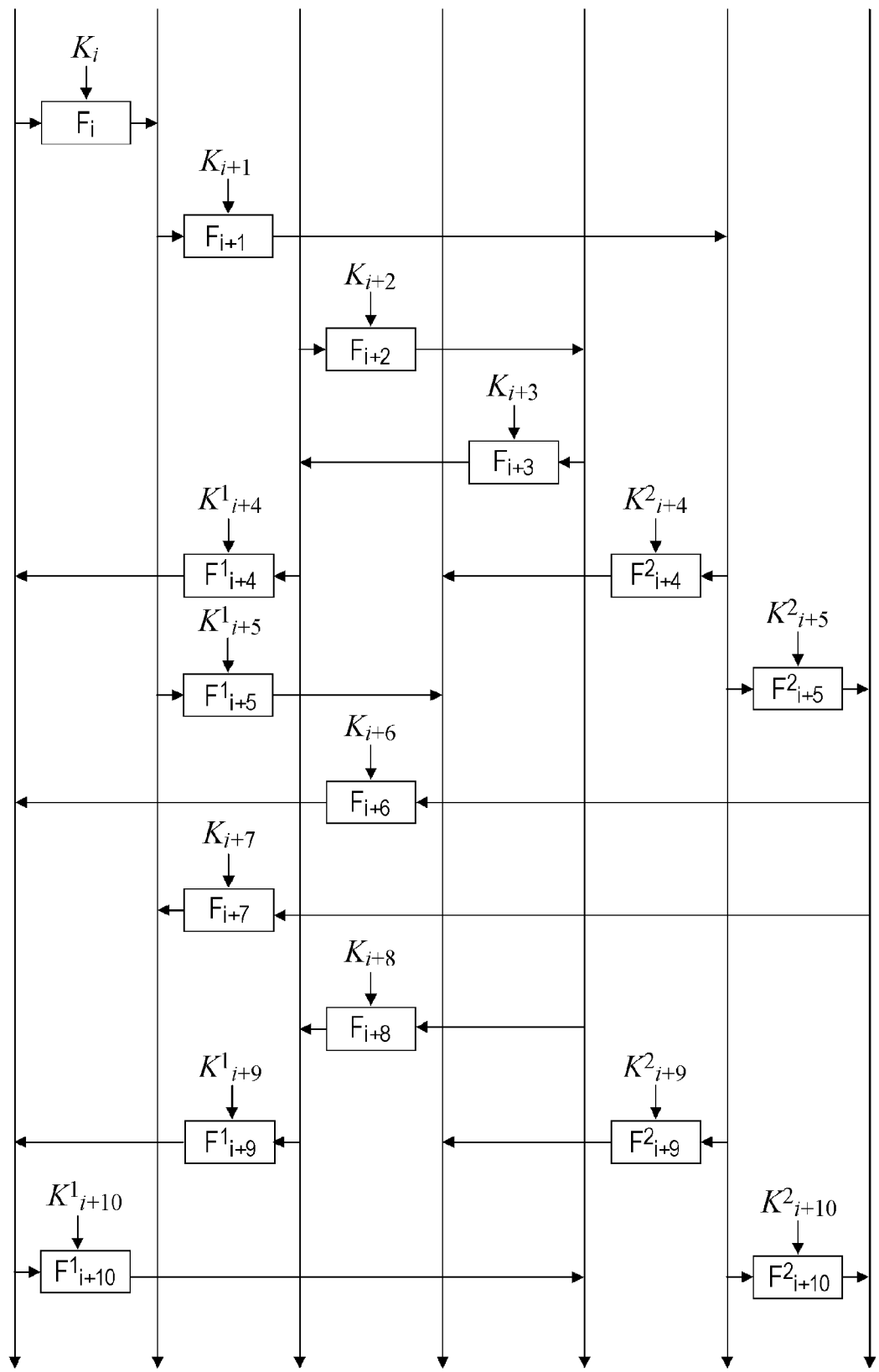
FIG. 6 is a diagram showing an example of an extended Feistel structure having seven data lines (d=7).

FIG. 6 shows an example of an extended Feistel structure that satisfies the above-described definitions and that has seven data lines (d=7). Note that, in FIG. 6, although symbols of exclusive-OR operation (XOR) sections for outputs of respective F-functions and respective data lines are omitted, the extended Feistel structure has a configuration in which exclusive-OR operations (XOR) using corresponding inputs are performed at respective intersection points of the outputs of the respective F-functions and the respective data lines, and in which the results of the exclusive-OR operations (XOR) are output in a downward direction of the same data lines. In the example shown in FIG. 6, a round i+4, a round i+5, a round i+9, and a round i+10 are rounds that are provided in such a manner that two or more F-functions are included in one round. Regarding F-functions [F] and round keys [K] provided in these rounds, numbers denoting identification numbers of the F-functions or the round keys in the same rounds are provided at the top right corners.

When a Feistel structure having the number of lines d that is set as d=2 is constructed in accordance with the above-described definitions 1 to 3, it is provided as a Feistel structure having two data lines, i.e., the Feistel structure that has been previously described with reference to FIG. 1. In other words, a connection structure in which F-functions are input alternately to two respective lines is provided. However, in a case of an extended Feistel structure having three or more data lines, a connection structure is not uniquely determined since a plurality of data lines that can be selected as inputs and outputs of F-functions exist. In other words, the larger the d in an extended Feistel structure, the higher the number of places at which F-functions can be set. The flexibly with which F-functions can be set is exponentially increased.

In the present invention, a configuration is proposed, in which the diffusion-matrix switching mechanism (DSM: Diffusion Switching Mechanism) that enhances resistance to differential attacks or linear attacks is realized in such an extended Feistel structure.

In a Feistel structure in which the number of lines d is set as d=2, for example, as shown in FIG. 3 or FIG. 4, two different linear transformation matrices $M_0$ and $M_1$, or three different linear transformation matrices $M_0$, $M_1$, and $M_2$ are provided as matrices applied in linear transformation sections (P layers) of round-function (F-function) sections constituting a Feistel structure, whereby the DSM is realized. However, in order to realize the DSM, it is necessary that applied matrices satisfy predetermined conditions. One of the conditions is a constraint concerning the above-described number of branches (Branch).

In an extended Feistel structure having the number of data lines d that is set as d: any integer satisfying d≧2, before a description of a configuration for realizing the DSM, definitions of respective constituent sections and input/output data of the respective constituent sections of an extended Feistel structure used in the description given below will be described with reference to FIG. 7.

Figure 7:
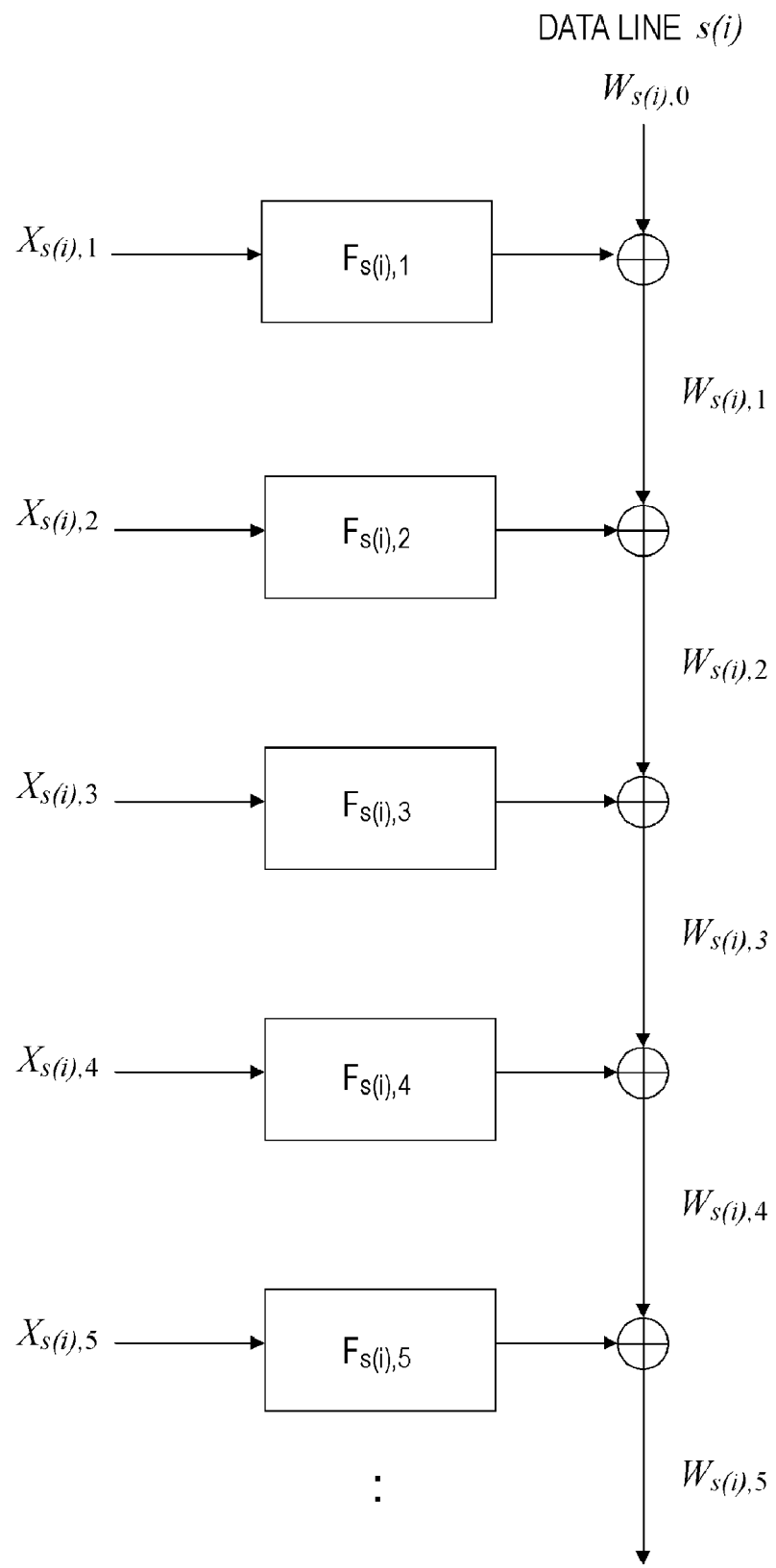
FIG. 7 is a diagram describing definitions of respective constituent sections and input/output data of the respective constituent sections of an extended Feistel structure.

FIG. 7 is a diagram in which only one data line is extracted and shown from among data lines constituting an extended Feistel structure, for example, as shown in FIG. 6. As shown in FIG. 7, it can be understood that data which is input to one data line is subjected to exclusive-OR (XOR) using one or more outputs of F-functions, and that, then, it is output. This is applied to any data line included in the extended Feistel structure.

In FIG. 7, a state is shown, in which outputs of a plurality of F-functions $[F_{s(i), 1}, F_{s(i), 2}, \ldots]$ are added using exclusive-OR operations (XOR) for one data line [s(i)].

Note that, each of d data lines included in the extended Feistel structure is referred to as S(i) ($1 \leq i \leq d$). The F-functions that are input to the data line S(i) are referred as $F_{s(i), 1}$, $F_{s(i), 2}, \ldots$ in the order in which they are input to the data line S(i) from earlier ones.

Additionally, input data that is input to the data line s(i) is denoted by $W_{s(i), 0}$.

Data obtained after an output of an F-function $F_{s(i), j}$ is subjected to exclusive OR is denoted by $W_{s(i), j}$, In addition, input data that is input to the F-function $F_{s(i), j}$ is denoted by $X_{s(i), j}$, Although each $X_{s(i), j}$ is data that belongs to another line other than the data line s(i), herein, it is supposed that which line each $X_{s(i), j}$ belongs to does not matter.

In this case, it can be considered that the extended Feistel structure has a configuration in which the d data lines are connected to one another.

A configuration for realizing the DSM in an extended Feistel structure, i.e., hereinafter, a configuration for realizing the DSM in an extended Feistel structure having the following d, will be described below.

d: any integer satisfying $d \geq 2$

The description is made in the order of section headings as follows:

(4-2. Configuration for Enhancing Resistance to Differential Attacks in Extended Feistel Structure)

(4-3. Configuration for Enhancing Resistance to Linear Attacks in Extended Feistel Structure)

The respective configurations will be sequentially described.

(4-2. Configuration for Enhancing Resistance to Differential Attacks in Extended Feistel Structure)

First, a configuration for enhancing resistance to differential attacks in an extended Feistel structure will be described.

As described above, differential attacks are attacks in which keys applied in respective round functions are analyzed by analyzing multiple pieces of input data (plaintext) having a certain difference ($\Delta X$) and pieces of output data (ciphertext) for the input data. The minimum number of differential active S-boxes included in a differential path that represents connection relationships of differences can be applied as an index for evaluating resistance to differential attacks. A differential path includes differential values in pieces of data excluding pieces of key data in encryption functions. Before/after linear transformation processes, the relationships between input differences and output differences are determined as one-to-one relationships. Although, before/after non-linear transformation processes, the relationships between input differences and output differences are not determined as one-to-one relationships, probabilities of occurrence of output differences for an input difference are calculated. The sum of all probabilities for all outputs is one.

In a Feistel structure having SP-type F-functions, non-linear transformation is performed using only S-boxes. In this case, a differential path having a probability other than zero represents a set of pieces of differential data that are provided as differential values starting with a differential value for plaintext (input) and ending with a differential value for ciphertext (output), and differential values that are provided before/after all S-boxes have probabilities other than zero. An S-box which is included in a differential path having a probability other than zero, and to which a differential value that is not zero is input is referred to as a "differential active S-box". The minimum number among the numbers of active S-boxes in all differential paths having probabilities other than zero is referred to as a "minimum number of differential active S-boxes", and the value of this number is used as a safety index for differential attacks.

Making the minimum number of differential active S-boxes large leads to enhancement of resistance to differential attacks. A technique for constructing a DSM structure for making the minimum number of differential active S-boxes large in an extended Feistel structure having the number of data lines d that is set to any integer satisfying $d \geq 2$ will be described below.

A linear transformation matrix used in a F-function $[F_{s(i), x}]$ included in an extended Feistel structure is denoted by $[M_{s(i), x}]$. In this case, an equation $B_2^D(s(i))$ for calculating the number of branches, in which the operation function of the number of branches: Branch( ) is applied, is defined as follows:

$$B_2^D(s(i)) = \min_j (Branch_n[(M_{s(i),j} \mid M_{s(i),j+1}])) \qquad \text{[Equation 2]}$$

The above-mentioned equation is an equation for calculating the minimum value of the number of branches in an incidence matrix $[M_{s(i), j} | M_{s(i), j+1}]$ of two linear transformation matrices $[M_{s(i), j}, M_{s(i), j+1}]$ that are used in two F-functions $[F_{s(i), j}, F_{s(i), j+1}]$ which are adjacent to each other, and which are input to any data line s(i) constituting the extended Feistel structure.

In any data line s(i) constituting the extended Feistel structure, [j] that corresponds to the number of F-functions, which are input to the data line s(i), from the top stage is set to any j, and data $[W_{s(i), j}]$ on the data line s(i) will be considered.

Input/output data $[W_{s(i), j}]$ and $[W_{s(i), j+2}]$ sandwich input portions of the two F-functions $[F_{s(i), j+1}]$ and $[F_{s(i), j+2}]$, which are input to the data line s(i), for the data line s(i). Regarding the input/output data $[W_{s(i), j}]$ and $[W_{s(i), j+2}]$ on the data line s(i), the following case is considered.

$W_{s(i),j}=0$ $W_{s(i),j+2}=0$

In this case, between respective input differential values $[\Delta X_{s(i), j+1}]$ and $[\Delta X_{s(i), j+2}]$ for the F-functions $[F_{s(i), j+1}]$ and $[F_{s(i), j+2}]$ adjacent to each other from among the F-functions, which are input to the data line s(i), the following relationship holds:

$$hw_n(\Delta X_{s(i),j+1}) + hw_n(\Delta X_{s(i),j+2}) \leq B_2^D(s(i)) \qquad \text{[Equation 3]}$$

Note that, in the above-mentioned relationship, hw denotes hamming weight, and the left-hand side of the above-mentioned relationship represents the number of non-zero elements in input differential data of the F-functions, i.e., the sum of the numbers of active S-boxes. Ensuring this number to be a large value is a condition in which enhancement of resistance to differential attacks can be expected. Accordingly, if other conditions other than the condition are the same, it is concluded that it is preferable that matrices in the respective F-functions constituting the extended Feistel structure be selected so as to make $B_2^D(s(i))$ as large as possible.

In extended Feistel-type cryptography in the prior art, a configuration in which one linear transformation matrix is utilized in linear transformation sections in all F-functions is a general configuration.

However, when the two linear transformation matrices $[M_{s(i),j}]$ and $[M_{s(i),j+1}]$ that are used in the two F-functions $[F_{s(i),j}, F_{s(i),j+1}]$ adjacent to each other, which are input to the data line s(i), are the same matrices, the above-described equation for calculating the number of branches, in which the operation function of the number of branches: Branch( ) is applied, i.e., $B_2^D(s(i))$, becomes two, which is the minimum value. Thus, an effect of enhancement of resistance cannot be expected.

Additionally, even in a case in which different matrices are used, when two matrices are carelessly selected, there is a case in which $B_2^D(s(i))$ becomes two.

$B_2^D(s(i))$, which is defined by the above-described equation for calculating the number of branches, is made to be a much larger number of branches, whereby a localized minimum number of differential active S-boxes is ensured to be large, so that resistance to differential attacks can be enhanced. Accordingly, for example, matrices are selected so as to make $B_2^D(s(i))$ equal to or more than three, whereby resistance to differential attacks can be enhanced.

$B_2^D(s(i))$ is calculated for each of the data lines in the extended Feistel structure. The minimum value from among the calculated values is denoted by $B_2^D$. A method for selecting matrices in the F-functions so as to make $B_2^D$ equal to or more than three will be described.

(4-2-1. Configuration for Selecting Matrices, which is to be Set in F-Functions, that Make Value of Minimum Number of Branches $B_2^D$ Equal to or More than Three)

First, it will be described below that making the minimum number of branches $[B_2^D]$, which is the minimum number among the minimum numbers of branches $[B_2^D(s(i))]$ calculated for all of the data lines in the extended Feistel structure, equal to or more than three can be realized by providing at least two types of matrices.

First, two different matrices $[A_0]$ and $[A_1]$ are prepared, which make the number of branches in an incidence matrix $[A_0|A_1]$ of the two different matrices $[A_0]$ and $[A_1]$ equal to or more than three, i.e., which satisfy as follows:

Branch$_n([A_0|A_1]) \geq 3$

Next, linear transformation matrices of the linear transformation sections of the plurality of F-functions, which are input to the data line s(i) in the extended Feistel structure, are set as follows:

$A_0$ is set as the linear transformation matrix that is set in the linear transformation section of the first F-function $F_{s(i), 1}$.

$A_1$ is set as the linear transformation matrix that is set in the linear transformation section of the second F-function $F_{s(i), 2}$.

$A_0$ is set as the linear transformation matrix that is set in the linear transformation section of the third F-function $F_{s(i), 3}$.

...

In this manner, the two different matrices $[A_0]$ and $[A_1]$ are alternately arranged in this order from the top for the plurality of F-functions, which are input to the data line s(i).

When the linear transformation matrices are set in this manner, the above-described equation for calculating the minimum value of the number of branches in the incidence matrix $[M_{s(i), j}|M_{s(i), j+1}]$ of the two linear transformation matrices $[M_{s(i), j}, M_{s(i), j+1}]$ that are used in the two F-functions $[F_{s(i), j}, F_{s(i), j+1}]$ adjacent to each other, which are input to any data line s(i), is provided as follows:

$$B_2^D(s(i)) = \min_j(Branch_n([M_{s(i),j}|M_{s(i),j+1}])) \geq 3 \quad \text{[Equation 4]}$$

In other words, it is ensured that the minimum number of branches is equal to or more than three.

As a matter of course, when the matrices $[A_0]$ and $[A_1]$ are permuted, the same effect is obtained. Additionally, when the matrices are similarly set for each of the data lines s(i) in the extended Feistel structure, $B_2^D$ can be made equal to or more than three simply by using the two matrices.

Branch$_n([A_0|A_1]) \geq 3$

In this manner, the two different matrices $[A_0]$ and $[A_1]$ satisfying the relationship given above are prepared, and the respective matrices are set so as to be alternately arranged in the F-functions that are input to the respective data lines s(i) in the extended Feistel structure, whereby the value of the minimum number of branches $B_2^D$ can be made equal to or more than three. Enhancement of resistance to differential attacks by using the diffusion-matrix switching mechanism (DSM) can be realized.

An example in which the two different matrices $[A_0]$ and $[A_1]$ are applied has been described above.

Next, an example will be described below, in which different matrices are generalized using any number [k] that is equal to or more than two.

A linear transformation matrix used in an F-function $[F_{s(i),j}]$ included in an extended Feistel structure is denoted by $[M_{s(i),j}]$. In this case, an equation $B_2^D(s(i))$ for calculating the number of branches, in which the operation function of the number of branches: Branch( ) is applied, is defined as follows:

$$B_k^D(s(i)) = \min_j(Branch_n([M_{s(i),j}|M_{s(i),j+1}|M_{s(i),j+2}|\ldots| \quad \text{[Equation 5]}$$

$$M_{s(i),j+k-1}]))$$

The above-mentioned equation is an equation for calculating the minimum value of the number of branches in an incidence matrix $[M_{s(i),j}|M_{s(i),j+1}|\ldots|M_{s(i),j+k-1}]$ of k linear transformation matrices $[M_{s(i), j}, M_{s(i), j+1}, \ldots, M_{s(i), j+k-1}]$ that are used in k F-functions $[F_{s(i), j}, F_{s(i), j+1}, \ldots, F_{s(i), j+k-1}]$ which are adjacent to one another, and which are input to any data line s(i) constituting the extended Feistel structure.

In any data line s(i) constituting the extended Feistel structure, [j] that corresponds to the number of F-functions, which are input to the data line s(i), from the top stage is set to any j, and data $[W_{s(i), j}]$ on the data line s(i) will be considered.

Input/output data $[W_{s(i), j}]$ and $[W_{s(i), j+k}]$ sandwich input portions of the k F-functions $[F_{s(i), j+1}]\ldots[F_{s(i), j+k}]$, which are input to the data line s(i), for the data line s(i). Regarding the input/output data $[W_{s(i),j}]$ and $[W_{s(i),j+k}]$ on the data line s(i), the following case is considered.

$W_{s(i),j}=0$ $W_{s(i),j+k}=0$

In this case, between respective input differential values $[\Delta X_{s(i), j+1}] \ldots [\Delta X_{s(i), j+k}]$ for the k F-functions $[F_{s(i),j+1}] \ldots [F_{s(i),j+k}]$ adjacent to one another from among the F-functions, which are input to the data line s(i), the following relationship is obtained:

$$\sum_{l=j+1}^{j+k} hw_n(\Delta X_{s(i),l}) \geq B_k^D(s(i)) \quad \text{[Equation 6]}$$

In addition, in the above-mentioned relationship, hw denotes hamming weight, and the left-hand side of the above-mentioned relationship represents the number of non-zero elements in input differential data of the F-functions, i.e., the sum of the numbers of active S-boxes. Ensuring this number to be a large value is a condition in which enhancement of resistance to differential attacks can be expected. Accordingly, if other conditions other than the condition are the same, it is concluded that it is preferable that matrices in the respective F-functions constituting the extended Feistel structure be selected so as to make $B_k^D(s(i))$ as large as possible.

However, when even only one pair of same matrices exists in the k linear transformation matrices $[M_{s(i), j}] \ldots [M_{s(i), j+k-1}]$ that are used in the k F-functions $[F_{s(i), j}] \ldots [F_{s(i), j+k-1}]$ adjacent to one another, which are input to the data line s(i), the above-described equation for calculating the number of branches, in which the operation function of the number of branches: Branch( ) is applied, i.e., $B_k^D(s(i))$, becomes two, which is the minimum value. Thus, an effect of enhancement of resistance cannot be expected.

Additionally, even in a case in which different matrices are used as the k linear transformation matrices $[M_{s(i), j}] \ldots [M_{s(i), j+k-1}]$, when matrices are carelessly selected, there is a case in which $B_k^D(s(i))$ becomes two.

$B_k^D(s(i))$, which is defined by the above-described equation for calculating the number of branches, is made to be a much larger number of branches, whereby a localized minimum number of linear active S-boxes is ensured to be large, so that resistance to differential attacks can be enhanced. Accordingly, for example, matrices are selected so as to make $B_k^D(s(i))$ equal to or more than three, whereby resistance to differential attacks can be enhanced.

$B_k^D(s(i))$ is calculated for each of the data lines in the extended Feistel structure. The minimum value from among the calculated values is denoted by $B_k^D$. A method for selecting matrices in the F-functions so as to make $B_k^D$ equal to or more than three will be described.

(4-2-2. Configuration for Selecting Matrices, which is to be Set in F-Functions, that Make Value of Minimum Number of Branches $B_k^D$ Equal to or More than Three)

It will be described below that making the minimum number of branches $[B_k^D]$, which is the minimum number among the minimum numbers of branches $[B_k^D(s(i))]$ calculated for all of the data lines in the extended Feistel structure, equal to or more than three can be realized by providing at least k types of matrices.

First, k different matrices $[A_0], [A_1], [A_2], \ldots [A_{k-1}]$ are prepared, which make the number of branches of an incidence matrix $[A_0|A_1| \ldots |A_{k-1}]$ of the k different matrices $[A_0], [A_1], [A_2], \ldots [A_{k-1}]$ equal to or more than three, i.e., which satisfy as follows:

$\text{Branch}_n([A_0|A_1|\ldots|A_{k-1}]) \leq 3$

Next, linear transformation matrices of the linear transformation sections of the plurality of F-functions, which are input to the data line s(i) in the extended Feistel structure, are set as follows:

$A_0$ is set as the linear transformation matrix that is set in the linear transformation section of the first F-function $F_{s(i), 1}$.

$A_1$ is set as the linear transformation matrix that is set in the linear transformation section of the second F-function $F_{s(i), 2}$.

$A_2$ is set as the linear transformation matrix that is set in the linear transformation section of the third F-function $F_{s(i), 3}$.

. . .

$A_{k-1}$ is set as the linear transformation matrix that is set in the linear transformation section of the k-th F-function $F_{s(i), k}$.

$A_0$ is set as the linear transformation matrix that is set in the linear transformation section of the k+1-th F-function $F_{s(i), k+1}$.

$A_1$ is set as the linear transformation matrix that is set in the linear transformation section of the k+2-th F-function $F_{s(i), k+2}$.

. . .

In this manner, the k different matrices $[A_0], [A_1], [A_2], \ldots [A_{k-1}]$ are repeatedly arranged in this order from the top for the plurality of F-functions, which are input to the data line s(i).

When the linear transformation matrices $[A_0], [A_1], [A_2], \ldots [A_{k-1}]$ are set in this manner, the above-described equation for calculating the minimum value of the number of branches in the incidence matrix $[M_{s(i), j}|M_{s(i), j+1}| \ldots M_{s(i), j+k-1}]$ of the k linear transformation matrices $[M_{s(i), j}, M_{s(i), j+1}, \ldots M_{s(i), j+k-1}]$ that are used in the k F-functions $[F_{s(i), j}, F_{s(i),j+1} \ldots F_{s(i),j+k-1}]$ adjacent to one another, which are input to any data line s(i), is provided as follows:

$$B_k^D(s(i)) = \min_j(\text{Branch}_n([ \quad \text{[Equation 7]}$$
$$M_{s(i),j}|M_{s(i),j+1}|M_{s(i),j+2}| \ldots |M_{s(i),j+k-1}])) \geq 3$$

In other words, it is ensured that the minimum number of branches is equal to or more than three.

As a matter of course, when the matrices $[A_0], [A_1], [A_2], \ldots [A_{k-1}]$ are permuted, the same effect is obtained. Additionally, when the matrices are similarly set for each of the data lines s(i) in the extended Feistel structure, $B_2^D$ can be made equal to or more than three simply by using the k matrices.

$\text{Branch}_n([A_0|A_1|\ldots|A_{k-1}]) \geq 3$

In this manner, the k different matrices $[A_0], [A_1], [A_2], \ldots [A_{k-1}]$ satisfying the relationship given above are prepared, and the respective matrices are set so as to be repeatedly arranged in an order in the F-functions that are input to the respective data lines s(i) in the extended Feistel structure, whereby the value of the minimum number of branches $B_k^D$ can be made equal to or more than three. Enhancement of resistance to differential attacks by using the diffusion-matrix switching mechanism (DSM) can be realized.

Note that, regarding selection of a value of k, when k is at least equal to or more than two, an effect can be expected. The larger the k is, the larger the guaranteed range. Thus, enhancement of resistance can be more expected. However, in contrast, because the minimum number of types of necessary matrices is increased, there is a probability that such k is not suitable for an efficient implementation. Thus, the value of k is a value that should be selected in accordance with a situation at a design stage.

(4-3. Configuration for Enhancing Resistance to Linear Attacks in Extended Feistel Structure)

Next, a configuration for enhancing resistance to linear attacks in an extended Feistel structure will be described.

As previously described, the minimum number of linear active S-boxes included in a linear path that represents connection relationships of linear masks (although it is referred to as a "linear approximation" in most cases, herein, a word "path" is used in order to correspond to difference) can be applied as an index for evaluating resistance to linear attacks. A linear path is a path in which specific linear mask values are designated for all pieces of data excluding pieces of key data in encryption functions. Before/after linear transformation processes, the relationships between input linear mask values and output linear mask values are determined as one-to-one relationships. Although, before/after non-linear transformation processes, the relationships between input linear mask values and output linear mask values are not determined as one-to-one relationships, probabilities of occurrence of output linear masks for an input linear mask are calculated. The sum of all probabilities for all outputs is one.

In a Feistel structure having SP-type F-functions, non-linear transformation is performed only in a portion of processes using S-boxes. Accordingly, in this case, a linear path having a probability other than zero represents a set of pieces of linear-mask-value data that are provided as linear values starting with a linear value for plaintext (input) and ending with a linear value for ciphertext (output), and linear values that are provided before/after all S-boxes are linear values having probabilities other than zero. An S-box which is included in a linear path having a probability other than zero, and to which a linear value that is not zero is input is referred to as a "linear active S-box". The minimum number among the numbers of active S-boxes in all linear paths having probabilities other than zero is referred to as a "minimum number of linear active S-boxes", and the value of this number is used as a safety index for linear attacks.

Making the minimum number of linear active S-boxes large leads to enhancement of resistance to linear attacks. A technique for constructing a DSM structure for making the minimum number of linear active S-boxes large in an extended Feistel structure having the number of data lines d that is set to any integer satisfying d≧2 will be described below.

A linear transformation matrix used in a F-function $[F_{s(i),x}]$ included in an extended Feistel structure is denoted by $[M_{s(i),x}]$. In this case, an equation $B_2^L(s(i))$ for calculating the number of branches, in which the operation function of the number of branches: Branch( ) is applied, is defined as follows:

$$B_2^L(s(i)) = \min_j (Branch_n([{}^tM_{s(i),j}^{-1} | {}^tM_{s(i),j+1}^{-1}])) \quad \text{[Equation 8]}$$

The above-mentioned equation is an equation for calculating the minimum value of the number of branches in an incidence matrix $[{}^tM^{-1}_{s(i),j} | {}^tM^{-1}_{s(i),j+1}]$ of transposed matrices $[{}^tM^{-1}_{s(i),j}]$ and $[{}^tM^{-1}_{s(i),j+1}]$ of inverse matrices of two respective linear transformation matrices $[M_{s(i),j}]$ and $[M_{s(i),j+1}]$ that that are used in two F-functions $[F_{s(i),j},$ $F_{s(i),j+1}]$ which are adjacent to each other, and which are input to any data line s(i) constituting the extended Feistel structure.

In any data line s(i) constituting the extended Feistel structure, [j] that corresponds to the number of F-functions, which are input to the data line s(i), from the top stage is set to any j, and, for a certain j, the followings are defined:
an input to the j-th F-function: $X_{s(i),j}$
a result obtained by exclusive OR (XOR) of an output of the j-th F-function and data on the data line s(i): $W_{s(i),j}$
an input to the j+1-th F-function: $X_{s(i),j+1}$ Linear masks for these respective data pieces are defined as follows:

$\Gamma X_{s(i),j}$ $\Gamma W_{s(i),j}$ $\Gamma X_{s(i),j+1}$

In this case, if at least any one of the linear masks is not zero, the following relationship is satisfied.

$$hw_n(\Gamma X_{s(i),j}) + hw(\Gamma W_{s(i),j}) + hw(\Gamma X_{s(i),j+1}) \geq B_2^L(s(i)) \quad \text{[Equation 9]}$$

In other word, the above-mentioned relationship is satisfied. It means that, the larger the value of the left-hand side of the above-mentioned relationship, the larger the localized number of linear active S-boxes. Accordingly, it is concluded that it is preferable that matrices be selected so as to make $B_2^L(s(i))$ large.

However, when the two linear transformation matrices $[M_{s(i),j}]$ and $[M_{s(i),j+1}]$ that are used in the two F-functions $[F_{s(i),j}, F_{s(i),j+1}]$ adjacent to each other, which are input to the data line s(i), are the same matrices, the above-described equation for calculating the number of branches, i.e., $B_2^L(s(i))$, becomes two, which is the minimum value. Thus, an effect of enhancement of resistance cannot be expected. $B_2^L(s(i))$ is made to be a much larger of branches, whereby a minimum number of linear active S-boxes is ensured to be large, so that resistance to liner attacks can be enhanced. Thus, for example, matrices are selected so as to make $B_2^L(s(i))$ equal to or more than three, whereby resistance to linear attacks can be enhanced.

$B_2^L(s(i))$ is calculated for each of the data lines in the extended Feistel structure. The minimum value from among the calculated values is denoted by $B_2^L$. A method for selecting matrices in the F-functions so as to make $B_2^L$ equal to or more than three will be described.

(4-3-1. Configuration for Selecting Matrices, which is to be Set in F-Functions, that Make Value of Minimum Number $B_2^L$ of Branches Equal to or More than Three)

It will be described below that making the minimum number of branches $[B_2^L]$, which is the minimum number among the minimum numbers of branches $[B_2^L(s(i))]$ calculated for all of the data lines in the extended Feistel structure, equal to or more than three can be realized by providing at least two types of matrices.

First, two different matrices $[A_0]$ and $[A_1]$ are prepared, which make the number of branches in an incidence matrix $[{}^tA_0^{-1} | {}^tA_1^{-1}]$ of the two different matrices $[A_0]$ and $[A_1]$ equal to or more than three, i.e., which satisfy as follows:

$Branch_n([{}^tA_0^{-1} | {}^tA_1^{-1}]) \geq 3$

Next, linear transformation matrices of the linear transformation sections of the plurality of F-functions, which are input to the data line s(i) in the extended Feistel structure, are set as follows:

$A_0$ is set as the linear transformation matrix that is set in the linear transformation section of the first F-function $F_{s(i), 1}$.

$A_1$ is set as the linear transformation matrix that is set in the linear transformation section of the second F-function $F_{s(i), 2}$.

$A_0$ is set as the linear transformation matrix that is set in the linear transformation section of the third F-function $F_{s(i), 3}$.

...

In this manner, the two different matrices $[A_0]$ and $[A_1]$ are alternately arranged in this order from the top for the plurality of F-functions, which are input to the data line $s(i)$.

When the linear transformation matrices are set in this manner, the above-described equation for calculating the minimum value of the number of branches in the incidence matrix $[{}^t M^{-1}_{s(i), j} | {}^t M^{-1}_{s(i), j+1}]$ of the transposed matrices $[{}^t M^{-1}_{s(i), j}]$ and $[{}^t M^{-1}_{s(i), j+1}]$ of the inverse matrices of the two respective linear transformation matrices $[M_{s(i), j}]$ and $[M_{s(i), j+1}]$ that are used in the two F-functions $[F_{s(i), j}, F_{s(i), j+1}]$ adjacent to each other, which are input to any data line $s(i)$, is provided as follows:

$$B_2^L(s(i)) = \min_j(Branch_n([{}^t M^{-1}_{s(i),j} | {}^t M^{-1}_{s(i),j+1}])) \geq 3 \quad \text{[Equation 10]}$$

In other words, it is ensured that the minimum number of branches is equal to or more than three.

As a matter of course, when the matrices $[A_0]$ and $[A_1]$ are permuted, the same effect is obtained. Additionally, when the matrices are similarly set for each of the data lines $s(i)$ in the extended Feistel structure, $B_2^L$ can be made equal to or more than three simply by using the two matrices.

$$Branch_n([{}^t A_0^{-1} | {}^t A_1^{-1}]) \geq 3$$

In this manner, the two different matrices $[A_0]$ and $[A_1]$ satisfying the relationship given above are prepared, and the respective matrices are set so as to be alternately arranged in the F-functions that are input to the respective data lines $s(i)$ in the extended Feistel structure, whereby the value of the minimum number of branches $B_2^L$ can be made equal to or more than three. Enhancement of resistance to linear attacks by using the diffusion-matrix switching mechanism (DSM) can be realized.

[5. Configuration in which DSM is Utilized for Extended Feistel Structure Having Specific Form]

As described above, the DSM technology is applied in the extended Feistel structures having the number of data lines d that is set to any integer satisfying $d \geq 2$, whereby resistance to differential attacks or linear attacks can be enhanced. Specific extended Feistel structures in which a safety index for differential attacks or linear attacks can be ensured at a high level will be described below.

As previously described with reference to FIGS. 5 and 6, the extended Feistel structures having the number of data lines d that is set to any integer satisfying $d \geq 2$ have various configurations, such as a configuration in which inputs from various other data lines can be provided as inputs to one data line, and a configuration in which a plurality of F-functions can be performed in parallel in one round. The extended Feistel structures will be largely classified into two types (a type 1 and a type 2), and a specific extended Feistel structure in which a safety index for differential attacks or linear attacks can be ensured at a high level will be described below for each type.

(5-1. Application of DSM to Extended Feistel Structure of Type 1)

First, application of the DSM to an extended Feistel structure of a type 1 will be described with reference to FIG. 8.

It is supposed that the extended Feistel structure of the type 1 has the following parameters.

Parameters:
(a) The number of divisions for a piece of data: d (where d is equal to or more than three)
(b) The length of a piece of input/output data: dmn bits
(c) The length of pieces of divided data: mn bits
(d) The number of F-functions per round: 1

Figure 8:
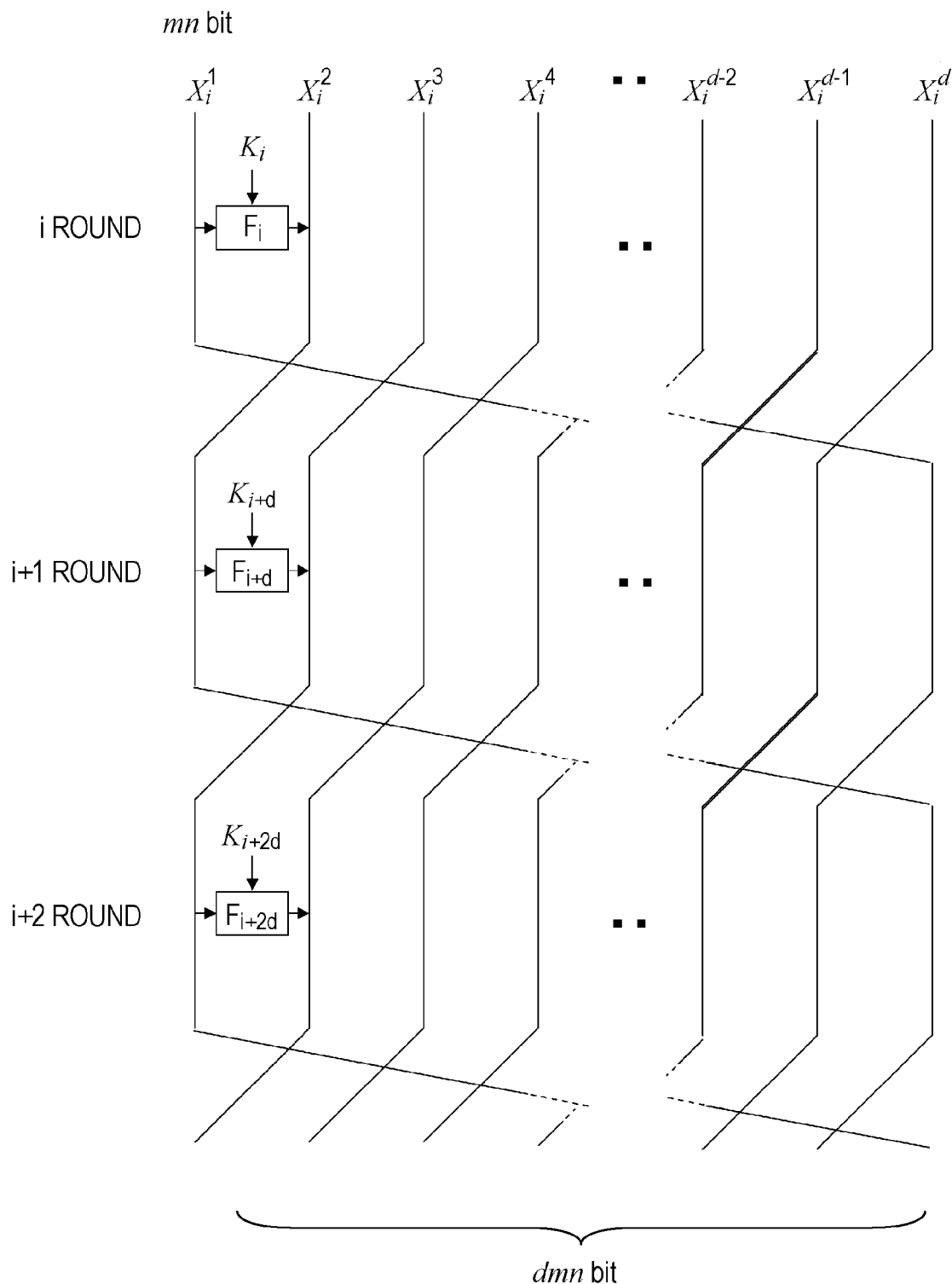
FIG. 8 is a diagram describing application of DSM to an extended Feistel structure or a type 1.

As shown in FIG. 8, an F-function is applied to mn-bit data on a data line provided on the left end shown in FIG. 8 in each round, and the process result of the F-function is output to an immediately adjacent data line and subjected to exclusive-OR. Note that the operators of exclusive-OR are omitted in FIG. 8.

As shown in FIG. 8, a configuration is provided, in which the data line provided on the left end is used to perform data input for the F-functions in each round, and in which the data line provided on the left end is moved to the right end and the other data lines other than the data line are shifted to the left by one in the next round.

A configuration for enhancing resistance to differential attacks and linear attacks by applying the DSM to the extended Feistel structure in which one F-function is performed in each round in this manner will be described.

In (4-2. Configuration for Enhancing Resistance to Differential Attacks in Extended Feistel Structure) that has been previously described, it has been described that $B_2^D(s(i))$ is calculated for each data line in an extended Feistel structure, that the minimum value among the calculated values is defined as $B_2^D$, and that matrices in F-functions are selected so as to make $B_2^D$ equal to or more than three, whereby resistance to differential attacks can be enhanced.

Furthermore, in (4-3. Configuration for Enhancing Resistance to Linear Attacks in Extended Feistel Structure) that has been previously described, it has been described that $B_2^L(s(i))$ is calculated for each data line in an extended Feistel structure, that the minimum value among the calculated values is defined as $B_2^L$, and that matrices in F-functions are selected so as to make $B_2^L$ equal to or more than three, whereby resistance to linear attacks can be enhanced.

In addition to $B_2^D$ and $B_2^L$, furthermore, the minimum number of branches among the number of branches in linear transformation matrices in F-functions included in the extended Feistel structure of the type 1 as shown in FIG. 8 is denoted by $B_1^D$.

In this case, when the number of differential active S-boxes included in p continuous rounds in the extended Feistel structure of the type 1 as shown in FIG. 8 is denoted by ActD(p) and the number of linear active S-boxes is denoted by ActL (p), the following relationships exist:

$$ActD(3d) \geq B_1^D + B_2^D$$

$$ActL(3d) \geq 2B_2^L$$

In the above-mentioned relationships,

ActD(3d) denotes the number of differential active S-boxes included in 3d continuous rounds, and ActL(3d) denotes the number of linear active S-boxes included in 3d continuous rounds.

Proof that these relationships hold will be described below.

As described above, by utilizing matrices that make $B_1^D$, $B_2^D$, and $B_2^L$ large, the number of active S-boxes can be ensured to be large, and, consequently, resistance to differential attacks and linear attacks can be enhanced.

Note that it is known that a theoretical maximum value of $B_1^D$, $B_2^D$, or $B_2^L$ is m+1.

Regarding the above-mentioned relationships, i.e., $$\text{Act}D(3d) \geq B_1^D + B_2^D \text{ and}$$

$$\text{Act}L(3d) \geq 2B_2^L,$$

the minimum number of branches $B_2^D$ or $B_2^L$, which has been previously described, is included in the right-hand sides of the relationships. Making the minimum numbers of branches large contributes to ensuring the number of active S-boxes to be large, and is effective in enhancing resistance to differential attacks and linear attacks. Accordingly, in the configuration of the extended Feistel structure of the type 1 as shown in FIG. 8, a configuration in which the minimum number of branches $B_2^D$ or $B_2^L$, which has been previously described, is made equal to or more than three is effective, and, with the configuration, resistance to differential attacks and linear attacks can be ensured at a level higher than that in the prior art.

(5-2. Application of DSM to Extended Feistel Structure of Type 2)

Next, application of the DSM to an extended Feistel structure of a type 2 will be described with reference to FIG. 9.

It is supposed that the extended Feistel structure of the type 2 has the following parameters.

Parameters:
(a) The number of divisions for a piece of data: d (where d is an even number equal to or more than four)
(b) The length of a piece of input/output data: dmn bits
(c) The length of pieces of divided data: mn bits
(d) The number of F-functions per round: d/2

Figure 9:
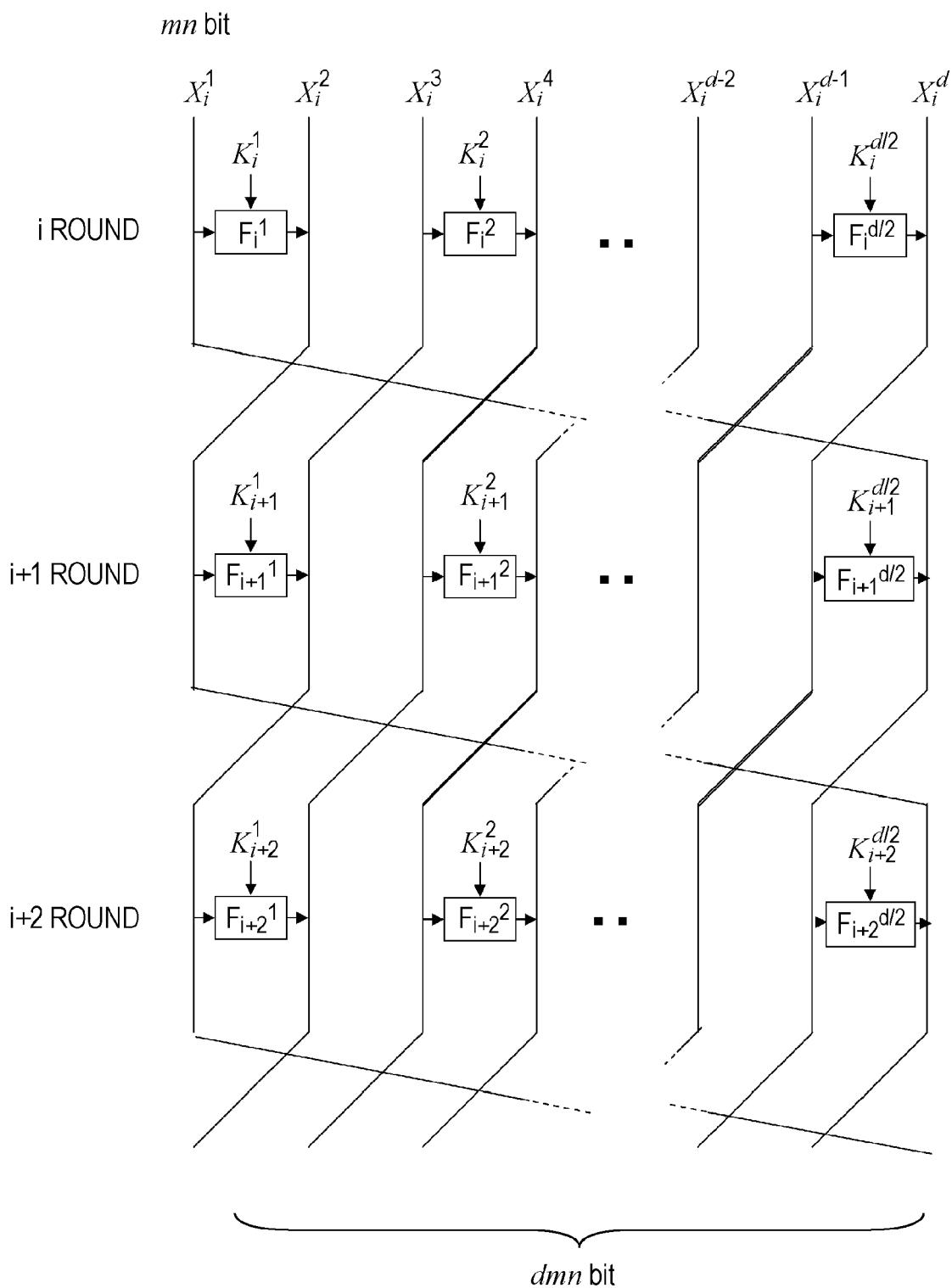
FIG. 9 is a diagram describing application of the DSM to an extended Feistel structure or a type 2.

As shown in FIG. 9, F-functions are applied to mn-bit data lines provided as odd-numbered data lines from the left end in each round, and the process results of the F-functions are output to immediately adjacent data lines and subjected to exclusive-OR. Note that the operators of exclusive-OR are omitted in FIG. 9.

As shown in FIG. 9, a configuration is provided, in which the data line provided on the left end is used to perform data input for the F-functions in each round, and in which the data line provided on the left end is moved to the right end and the other data lines other than the data line are shifted to the left by one in the next round.

A configuration for enhancing resistance to differential attacks and linear attacks by applying the DSM to the extended Feistel structure in which d/2 F-functions are performed in each round in this manner will be described.

In (4-2. Configuration for Enhancing Resistance to Differential Attacks in Extended Feistel Structure) that has been previously described, it has been described that $B_2^D(s(i))$ is calculated for each data line in an extended Feistel structure, that the minimum value among the calculated values is defined as $B_2^D$, and that matrices in F-functions are selected so as to make $B_2^D$ equal to or more than three, whereby resistance to differential attacks can be enhanced.

Furthermore, in (4-3. Configuration for Enhancing Resistance to Linear Attacks in Extended Feistel Structure) that has been previously described, it has been described that $B_2^L(s(i))$ is calculated for each data line in an extended Feistel structure, that the minimum value among the calculated values is defined as $B_2^L$, and that matrices in F-functions are selected so as to make $B_2^L$ equal to or more than three, whereby resistance to linear attacks can be enhanced.

In addition to $B_2^D$ and $B_2^L$, furthermore, the minimum number of branches among the number of branches in linear transformation matrices in F-functions included in the extended Feistel structure of the type 2 as shown in FIG. 9 is denoted by $B_1^D$.

In this case, when the number of differential active S-boxes included in p continuous rounds in the extended Feistel structure of the type 2 as shown in FIG. 9 is denoted by ActD(p) and the number of linear active S-boxes is denoted by ActL (p), the following relationships exist:

$$\text{Act}D(6) \geq B_1^D + B_2^D$$

$$\text{Act}L(6) \geq 2B_2^L$$

In the above-mentioned relationships,

ActD(6) denotes the number of differential active S-boxes included in six continuous rounds, and ActL(6) denotes the number of linear active S-boxes included in six continuous rounds.

Proof that these relationships hold will be described below.

As described above, by utilizing matrices that make $B_1^D$, $B_2^D$, and $B_2^L$ large, the number of active S-boxes can be ensured to be large, and, consequently, resistance to differential attacks and linear attacks can be enhanced.

Note that it is known that a theoretical maximum value of $B_1^D$, $B_2^D$, or $B_2^L$ is m+1.

Regarding the above-mentioned relationships, i.e., $$\text{Act}D(6) \geq B_1^D + B_2^D \text{ and}$$

$$\text{Act}L(6) \geq 2B_2^L,$$

the minimum number of branches $B_2^D$ or $B_2^L$, which has been previously described, is included in the right-hand sides of the relationships. Making the minimum numbers of branches large contributes to ensuring the number of active S-boxes to be large, and is effective in enhancing resistance to differential attacks and linear attacks. Accordingly, in the configuration of the extended Feistel structure of the type 2 as shown in FIG. 9, a configuration in which the minimum number of branches $B_2^D$ or $B_2^L$, which has been previously described, is made equal to or more than three is effective, and, with the configuration, resistance to differential attacks and linear attacks can be ensured at a level higher than that in the prior art.

[6. Proof of Relationships Between Numbers of Active S-Boxes in Extended Feistel Structure of Each Type and Minimum Numbers of Branches Based on Linear Transformation Matrices in F-Functions]

Next, the proof of relationships between the numbers of active S-boxes and the minimum numbers of branches based on linear transformation matrices in F-functions, which have been described in the section headings (5-1. Application of DSM to Extended Feistel Structure of Type 1) and (5-2. Application of DSM to Extended Feistel Structure of Type 2), which are given above, will be described.

(6-1. Proof of Relationships Between Numbers of Active S-Boxes in Extended Feistel Structure of Type 1 and Minimum Numbers of Branches Based on Linear Transformation Matrices in F-Functions)

First, the proof of relationships between the numbers of active S-boxes in the extended Feistel structure of the type 1, which has been previously described with reference to FIG. 8, and the minimum numbers of branches based on linear transformation matrices in F-functions will be described.

In other words, in a case in which the number of differential active S-boxes included in p continuous rounds in the extended Feistel structure of the type 1 is denoted by ActD(p), and in which the number of linear active S-boxes is denoted by ActL(p), the following relationships exist:

$$\text{Act}D(3d) \geq B_1^D + B_2^D$$

$$\text{Act}L(3d) \geq 2B_2^L$$

Proof that these relationships hold will be described below.

Figure 10:
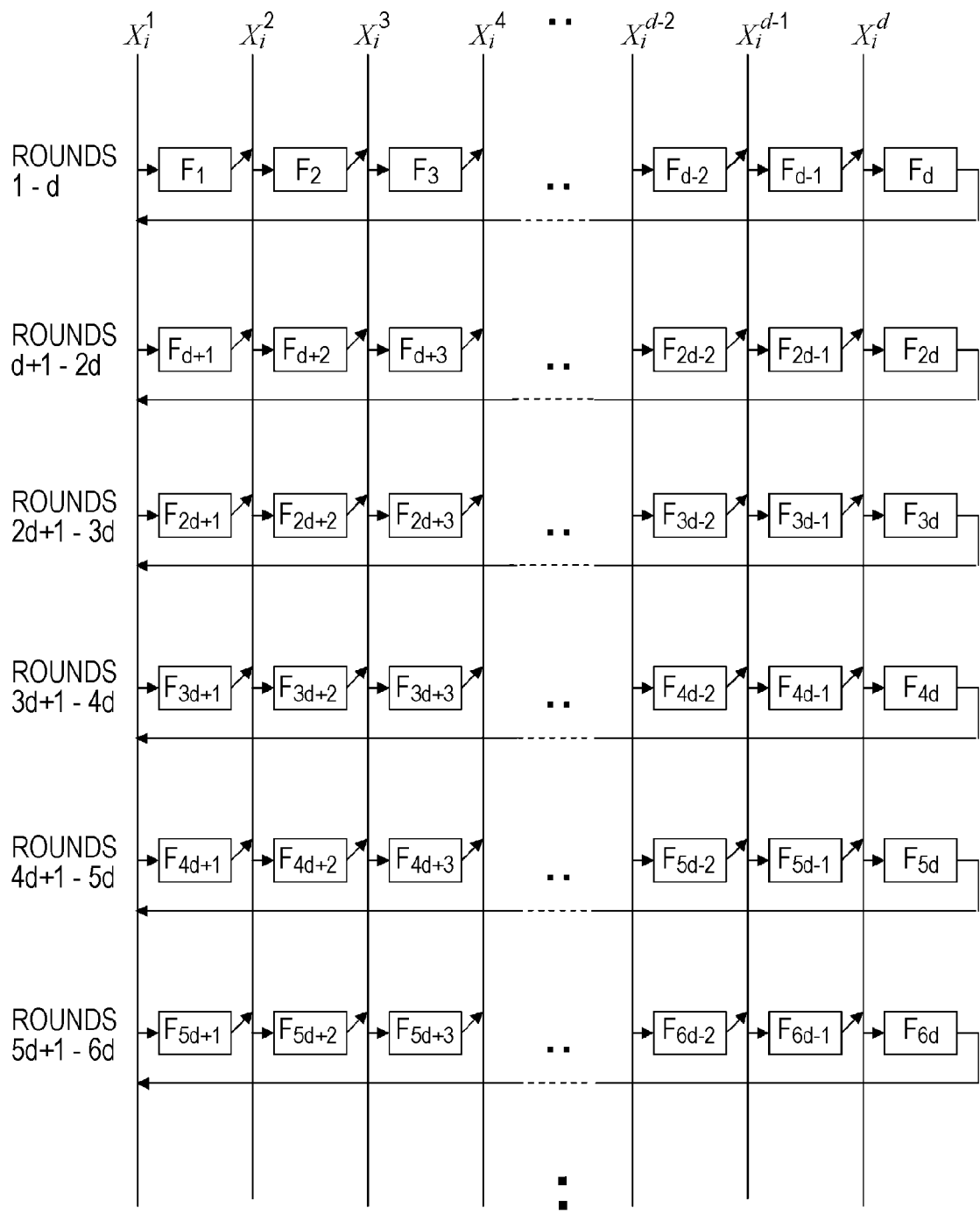
FIG. 10 is a diagram describing application of the DSM to the extended Feistel structure or the type 1.

When the configuration of the extended Feistel structure of the type 1, which has been previously described with reference to FIG. 8, is shown in another form, it can be shown as a configuration shown in FIG. 10. Although the configuration is shown in FIG. 8 in such a manner that respective data lines are permuted on a round-by-round basis so that a data line which is used to perform input to an F-function is placed on the left end, permutation of the data lines on a round-by-round basis is not performed in FIG. 10, and each of the data lines is shown as one line. In FIG. 10, rounds 1 to 6d are shown. Although d rounds (rounds 1 to d, d+1 to 2d, . . . , 5d+1 to 6d) are shown in such a manner that they are arranged in one horizontal line, these rounds are not performed in parallel, and the respective rounds, for example, the rounds 1 to d, are sequentially performed.

Additionally, although exclusive-OR (XOR) operations that are performed at intersections of outputs of F-functions and the respective data lines are omitted in FIG. 10, the exclusive-OR (XOR) operations are performed at the intersections of outputs of F-functions and the respective data lines, and the results are provided as inputs to F-functions of the next round.

In the configuration of the extended Feistel structure of the type 1, it will be proved that the following relationships, which have been previously described in (5-1, Application of DSM to Extended Feistel Structure of Type 1), hold:

$$\text{Act}D(3d) \geq B_1^D + B_2^D$$

$$\text{Act}L(3d) \geq 2B_2^L$$

In the relationships,

ActD(3d) and ActL(3d) denote the number of differential active S-boxes and the number of linear active S-boxes, respectively, included in 3d continuous rounds in the extended Feistel structure of the type 1, which is shown FIG. 8 or FIG. 10.

$B_1^D$ denotes the minimum number of branches among the number of branches in the linear transformation matrices in the F-functions included in the extended Feistel structure of the type 1.

$B_2^D$ and $B_2^L$ denote the minimum number of branches in an incidences matrix of linear transformation matrices, and the minimum number of branches in an incidence matrix of transposed matrices of inverse matrices of the linear transformation matrices, respectively, which have been previously described in (4-2) and (4-3), in continuous F-functions that are input to one data line included in an extended Feistel structure.

$B_1^D$, $B_2^D$, and $B_2^L$ are defined as follows:

$$B_1^D = \min_i(\text{Branch}_n(M_i)) \quad \text{[Equation 11]}$$

$$B_2^D = \min_i(\text{Branch}_n([M_i \mid M_{i+d}]))$$

$$B_2^L = \min_i(\text{Branch}_n([{}^tM_i^{-1} \mid {}^tM_{i+d}^{-1}]))$$

Note that, in the above-mentioned definitions, the following relationship holds:

$$B_1^D \geq B_2^D$$

Additionally, the number of differential active S-boxes included in the k-th F-function in the extended Feistel structure of the type 1, which is shown in FIG. 8 or FIG. 10 is denoted by $D_k$, and the number of linear active S-boxes is denoted by $L_k$.

(Proof 1. Proof of $\text{Act}D(3d) \geq B_1^D + B_2^D$)

First, it will be proved that $\text{Act}D(3d) \geq B_1^D + B_2^D$ holds.

In other words, it will be proved that the number of differential active S-boxes included in 3d continuous rounds in the extended Feistel structure of the type 1, which is shown in FIG. 8 or FIG. 10, is equal to or more than $B_1^D + B_2^D$.

A case is considered, in which a difference (ΔX) obtained using an input that is not zero is provided in the extended Feistel structure of the type 1. In this case, the extended Feistel structure of the type 1 has the following four characteristics:

(Characteristic 1) A differential active S-box that is not zero exists in at least one round from among d continuous rounds.

(Characteristic 2) If $D_k=0$ holds, $D_{k-d+1}=D_k+1$ holds.

(Characteristic 3) If $D_k \neq 0$ holds, $D_{k-d+1}+D_k+D_k+1 \geq B_1^D$ holds.

(Characteristic 4) If $D_k+D_{k+d} \neq 0$ holds, $D_{k-d+1}+D_k+D_{k+d}+D_{k+d+1} \geq B_2^D$ holds.

By utilizing the four characteristics given above, it will be proved that $$\text{Act}D(3d) \geq B_1^D + B_2^D$$

holds, i.e., it will be proved that "the number of differential active S-boxes included in 3d continuous rounds is equal to or more than $B_1^D + B_2^D$".

It is supposed that the i+1-th to the i+3d-th rounds are targets rounds.

Case 1: a case is supposed, in which an active S-box that is not zero exists in the i+d+2-th to i+2d−1-th rounds.

When it is supposed that a round in which an active S-box that is not zero exists is the k-th round, it is indicated that $D_k \neq 0$ holds.

Case 1-1: in addition to Case 1, when $D_{k+d-1} \neq 0$ holds, the followings hold:

in accordance with Characteristic 3, $D_k+D_{k+1}+D_{k-d+1} \geq B_1^D$ in accordance with Characteristic 4, $D_{k+d-1}+D_{k-2d}+D_{k-1}+D_{k+d} \geq B_2^D$ Thus, the following is obtained:

$$\sum_{j=i+1}^{i+3d} D_j \geq B_1^D + B_2^D \quad \text{[Equation 12]}$$

Case 1-2: in addition to Case 1, when $D_{k+1} \neq 0$ holds, the followings hold:

in accordance with Characteristic 3, $D_{k+1}+D_{k+2}+D_{k-d+2} \geq B_1^D$ in accordance with Characteristic 4, $D_k+D_{k-d+1}+D_{k+d}+D_{k+d+1} \geq B_2^D$ Thus, the following is obtained:

$$\sum_{j=i+1}^{i+3d} D_j \geq B_1^D + B_2^D \quad \text{[Equation 13]}$$

Case 1-3: in addition to Case 1, when $D_{k+d-1}=0$ and $D_{k+1}=0$ hold, the followings hold:

in accordance with Characteristic 2, $D_k=D_{k+d} \neq 0$ in accordance with Characteristic 3, $D_k+D_{k+1}+D_{k-d+1} \geq B_1^D$ in accordance with Characteristic 3, $D_{k+d}+D_{k+d+1}+D_{k+1} \geq B_2^D$ Because $D_{k+1}=0$ holds, the following is obtained:

$$\sum_{j=i+1}^{i+3d} D_j \geq 2B_1^D \qquad \text{[Equation 14]}$$

Case 2: a case is supposed, in which no active S-box that is not zero exists in the i+d+2 to i+2d−1 rounds.

In accordance with Characteristic 1, $D_{i+d+1} \neq 0$ or $D_{i+2d} \neq 0$ holds.

Case 2-1: when $D_{i+2d}=0$ holds although $D_{i+d+1} \neq 0$ holds, the followings hold:

in accordance with Characteristic 2, $D_{i+d+1}=D_{i+2d+1} \neq 0$.

in accordance with Characteristic 3, $D_{i+d+1}+D_{i+2d+2}+D_{i+2} \geq B_1^D$ in accordance with Characteristic 3, $D_{i+2d+1}+D_{i+2d+2}+D_{i+d+2} \geq B_1^D$ Because $D_{i+d+2}=0$ holds, the following is obtained:

$$\sum_{j=i+1}^{i+3d} D_j \geq 2B_1^D \qquad \text{[Equation 15]}$$

Case 2-2: when $D_{i+2d} \neq 0$ holds although $D_{i+d+1}=0$ holds, the followings hold:

in accordance with Characteristic 2, $D_{i+2d}=D_{i+d} \neq 0$ in accordance with Characteristic 3, $D_{i+d}+D_{i+d+1}+D_{i+1} \geq B_1^D$ in accordance with Characteristic 3, $D_{i+2d}+D_{i+2d+1}+D_{i+d+1} \geq B_1^D$ Because $D_{i+d+1}=0$ holds, the following is obtained:

$$\sum_{j=i+1}^{i+3d} D_j \geq 2B_1^D \qquad \text{[Equation 16]}$$

Case 2-3: when $D_{i+d+1} \neq 0$ and $D_{i+2d} \neq 0$ hold, the followings hold:

in accordance with Characteristic 3, $D_{i+d+1}+D_{i+d+2}+D_{i+2} \geq B_1^D$

In accordance with Characteristic 3, $D_{i+2d}+D_{i+2d+1}+D_{i+d}+D_{i+1} \geq B_2^D$ Thus, the following is obtained:

$$\sum_{j=i+1}^{i+3d} D_j \geq B_1^D + B_2^D \qquad \text{[Equation 17]}$$

When Case 1 and Case 2 given above are summarized, it is proved that the following holds:

$$\sum_{j=i+1}^{i+3d} D_j \geq B_1^D + B_2^D \qquad \text{[Equation 18]}$$

In other words, the following holds:

$\text{ActD}(3d) \geq B_1^D + B_2^D$

It has been proved that the number of differential active S-boxes included in 3d continuous rounds in the extended Feistel structure of the type 1, which is shown in FIG. 8 or FIG. 10, is equal to or more than $B_1^D + B_2^D$.

(Proof 2. Proof of $\text{ActL}(3d) \geq 2B_2^L$)

Next, it will be proved that $\text{ActL}(3d) \geq 2B_2^L$ holds.

In other words, it will be proved that the number of linear active S-boxes included in 3d continuous rounds in the extended Feistel structure of the type 1, which is shown in FIG. 8 or FIG. 10, is equal to or more than $2B_2^L$.

Note that, as described above, $B_2^L$ is defined as follows:

$$B_2^L = \min_i(\text{Branch}_n([{}^tM_i^{-1} \mid {}^tM_{i+d}^{-1}])) \qquad \text{[Equation 19]}$$

Additionally, the number of linear active S-boxes included in the k-th F-function is denoted by $L_k$.

When a linear mask obtained using an input that is not zero is provided in the extended Feistel structure of the type 1, the extended Feistel structure of the type 1 has the following two characteristics:

(Characteristic 5) A linear active S-box that is not zero exists in at least one round from among d continuous rounds.

(Characteristic 6) $L_k+L_{k+1}+L_{k+d} \geq B_2^L$ or $L_k+L_{k+1}+L_{k+d}=0$ holds. Note that, when $L_k+L_{k+1}+L_{k+d} \leq B_2^L$ holds, two or more terms included in the left-hand side do not become simultaneously zero.

By utilizing the two characteristics given above, it will be proved that $\text{ActL}(3d) \geq 2B_2^L$, holds, i.e., it will be proved that "the number of linear active S-boxes included in 3d continuous rounds is equal to or more than $2B_2^L$".

It is supposed that the i+1-th to the i+3d-th rounds are targets rounds.

Case 1: a case is supposed, in which an active S-box that is not zero exists in the i+d+2-th to i+2d-th rounds.

When it is supposed that a round in which an active S-box that is not zero exists is the k-th round, it is indicated that $L_k \neq 0$ holds.

Case 1-1: in addition to Case 1, when $L_{k+d} \neq 0$ or $L_{k-1} \neq 0$ holds, the followings hold:

in accordance with Characteristic 6, $L_k+L_{k+d}+L_{k+1} \geq B_2^L$ in accordance with Characteristic 6, $L_{k-1}+L_{k-1-d+Lk-d} \geq B_2^L$ Thus, the following is obtained:

$$\sum_{j=i+1}^{i+3d} L_j \geq 2B_2^L \qquad \text{[Equation 20]}$$

Case 1-2: in addition to Case 1, when $L_{k+d}=0$ and $L_{k-1}=0$ hold, the followings hold:

in accordance with Characteristic 6, $L_{k-d+1} \neq 0$ in accordance with Characteristic 6, $L_k+L_{k-1}+L_{k+d-1} \geq B_2^L$ in accordance with Characteristic 6, $L_{k-d+1}+L_{k+1}+L_{k-d+2} \geq B_2^L$ In this case, if $d \geq 4$ holds, the following is obtained.

$$\sum_{j=i+1}^{i+3d} L_j \geq 2B_2^L \quad \text{[Equation 21]}$$

If d=3 holds, it has already been known that $L_{k-1}=0$ holds although $L_{k-1}$ is duplicated.

Thus, similarly, the following is obtained:

$$\sum_{j=i+1}^{i+3d} L_j \geq 2B_2^L \quad \text{[Equation 22]}$$

Case 2: a case is supposed, in which an active S-box that is not zero does not exist in the i+d+2-th to i+2d−1-th rounds. The followings hold:
in accordance with Characteristic 1, $L_{i+d+1} \neq 0$
in accordance with Characteristic 6, $L_{i+d} \neq 0$
in accordance with Characteristic 6, $L_{i+d+1}+L_{i+d+2}+L_{i+2d+1} \geq B_2^L$
in accordance with Characteristic 6, $L_{i+d}+L_{i+d-1}+L_{i+2d-1} \geq B_2^L$
In this case, if d≧4 holds, the following is obtained.

$$\sum_{j=i+1}^{i+3d} L_j \geq 2B_2^L \quad \text{[Equation 23]}$$

If d=3 holds, it has already been known that $L_{i+5}=0$ holds although $L_{i+5}$ is duplicated.

Thus, similarly, the following is obtained:

$$\sum_{j=i+1}^{i+3d} L_j \geq 2B_2^L \quad \text{[Equation 24]}$$

When Case 1 and Case 2 given above are summarized, it is proved that the following holds:

$$\sum_{j=i+1}^{i+3d} L_j \geq 2B_2^L \quad \text{[Equation 25]}$$

In other words, the following holds:

$ActL(3d) \geq 2B_2^L$,

It has been proved that the number of linear active S-boxes included in 3d continuous rounds in the extended Feistel structure of the type 1, which is shown in FIG. 8 or FIG. 10, is equal to or more than $2B_2^L$.

(6-2. Proof of Relationships Between Numbers of Active S-Boxes in Extended Feistel Structure of Type 2 and Minimum Numbers of Branches Based on Linear Transformation Matrices in F-Functions)

Next, the proof of relationships between the numbers of active S-boxes in the extended Feistel structure of the type 2, which has been described with reference to FIG. 9, and the minimum numbers of branches based on linear transformation matrices in F-functions will be described.

In other words, in a case in which the number of differential active S-boxes included in p continuous rounds in the extended Feistel structure of the type 2 is denoted by ActD(p), and in which the number of linear active S-boxes is denoted by ActL(p), the following relationships exist:

$ActD(6) \geq B_1^D + B_2^D$ $ActL(6) \geq 2B_2^L$

It will be proved that these relationships hold.

Figure 11:
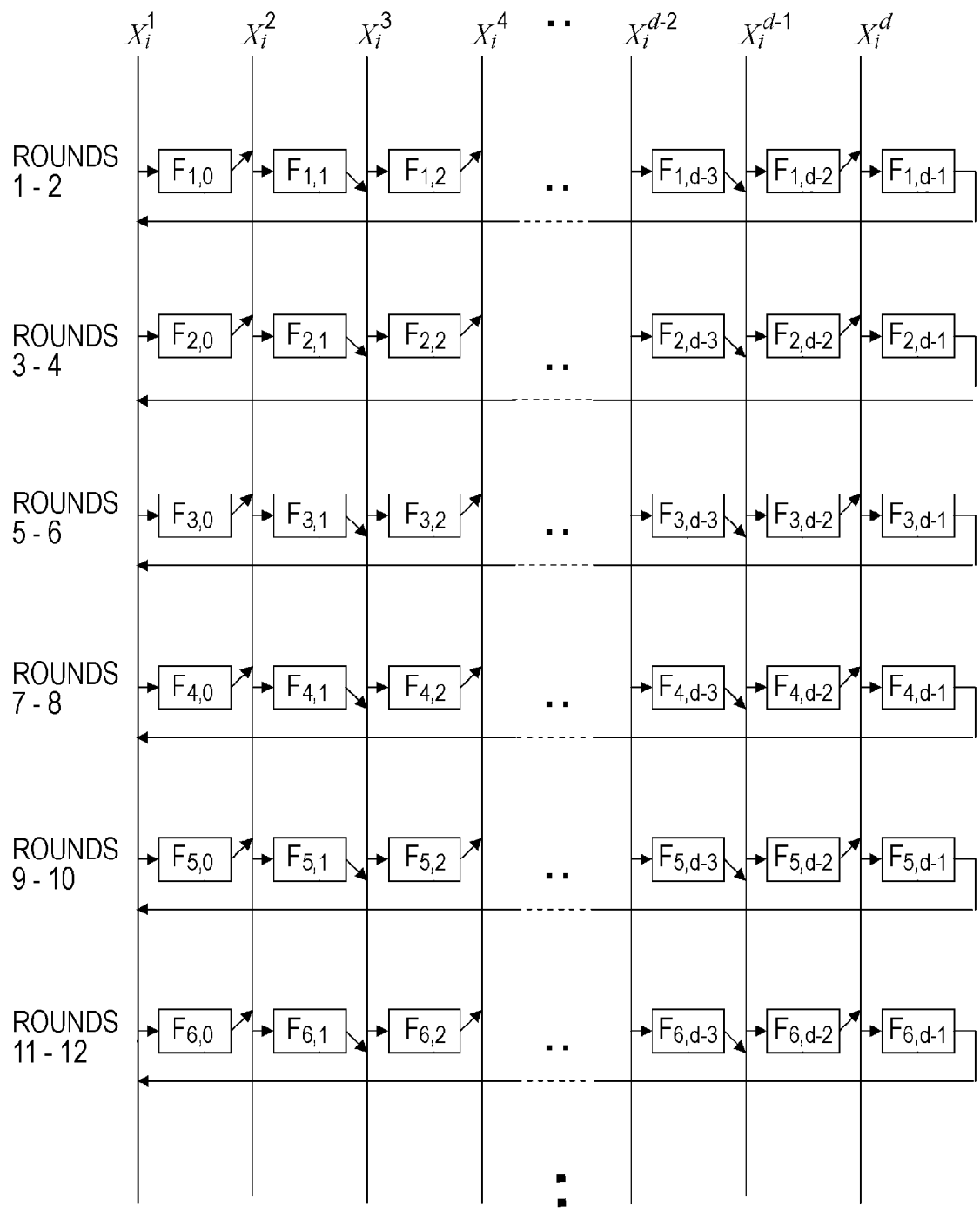
FIG. 11 is a diagram describing application of the DSM to the extended Feistel structure or the type 2.

When the configuration of the extended Feistel structure of the type 2, which has been previously described with reference to FIG. 9, is shown in another form, it can be shown as a configuration shown in FIG. 11. Although the configuration is shown in FIG. 9 in such a manner that respective data lines are permuted on a round-by-round basis, permutation of the data lines is not performed in FIG. 11, and each of the data lines is shown as one line. In FIG. 11, rounds 1 to 12 are shown. F-functions in two rounds (1 to 2, 3 to 4, . . . ) are shown in such a manner that they are arranged in one horizontal line. For example, $F_{1,0}, F_{1,2}, \ldots$, and $F_{1,d-2}$ selected from among F-functions F1,0 to F1,d−1 that are shown in a horizontal line for the rounds 1 to 2 shown in FIG. 11, which are every-other-selected F-functions (output arrows are directed upward), are performed in the first round in parallel. In the next second round, the remaining $F_{1,1}, F_{1,3}, \ldots$, and $F_{1,d-1}$, which are every-other-selected F-functions (output arrows are directed downward), are performed in parallel.

In FIG. 11, numbers used to identify each of the F-functions are newly introduced in order to easily understand the proof, and a position of the F-function is determined using the two numbers.

That is, i of denotes a round number (1=1 and 2 rounds, 2=3 and 4 rounds and y denotes—of an F-function in two rounds. Note that, when j is an even number, which is 0, 2, or 4, the F-function is provided for a preceding round, and that, when j is an odd number, which is 1, 3, or 5, the F-function is provided for the following round. Note that, when a linear transformation matrix included in the F-function $F_{i,j}$ is referred to as $[M_{i,j}]$.

In the configuration of the extended Feistel structure of the type 2, it will be proved that the following relationships, which have been previously described in (5-2, Application of DSM to Extended Feistel Structure of Type 2), hold:

$ActD(6) \geq B_1^D + B_2^D$ $ActL(6) \geq 2B_2^L$

In the relationships,

ActD(6) and ActL(6) denote the number of differential active S-boxes and the number of linear active S-boxes, respectively, included in six continuous rounds in the extended Feistel structure of the type 2, which is shown FIG. 9 or FIG. 11.

$B_1^D$ denotes the minimum number of branches among the number of branches in the linear transformation matrices in the F-functions included in the extended Feistel structure of the type 2.

$B_2^D$ and $B_2^L$ denote the minimum number of branches in an incidences matrix of linear transformation matrices, and the minimum number of branches in an incidence matrix of transposed matrices of inverse matrices of the linear transformation matrices, respectively, which have been previously described in (4-2) and (4-3), in continuous F-functions that are input to one data line included in an extended Feistel structure.

$B_1^D$, $B_2^D$, and $B_2^L$ are defined as follows:

$$B_1^D = \min_{i,j}(Branch_n(M_{i,j}))$$ [Equation 26]

$$B_2^D = \min_{i,j}(Branch_n([M_{i,j} | M_{i+1,j}]))$$

$$B_2^L = \min_{i,j}(Branch_n([{}^tM_{i,j}^{-1} | {}^tM_{i+1,j}^{-1}]))$$

Note that, in the above-mentioned definitions, the following relationship holds:

$B_1^D \geq B_2^D$

Additionally, the number of active S-boxes included in $F_{p,q}$ is denoted by $D_{p,q}$. Note that, in the following description, when a portion denoted by the subscript q has a negative value or a value equal to or more than d, a residue operation (q mode d) is performed using d, thereby correcting the portion so that $0 \leq q < d$ always holds.

(Proof 3. Proof of $ActD(6) \leq B_1^D + B_2^D$)

First, it will be proved that $ActD(6) \geq B_1^D + B_2^D$ holds.

In other words, it will be proved that the number of differential active S-boxes included in six continuous rounds in the extended Feistel structure of the type 2, which is shown in FIG. 9 or FIG. 11, is equal to or more than $B_1^D + B_2^D$.

A case is considered, in which a difference (ΔX) obtained using an input that is not zero is provided in the extended Feistel structure of the type 2. In this case, the extended Feistel structure of the type 2 has the following four characteristics:

(Characteristic 1) A differential active S-box that is not zero exists in $F_{p,q}$ (p=i, q∈{0, ... d−1}) for a certain i.

(Characteristic 2) If $D_{p,q}=0$ holds,
$D_{p-1, q+1} = D_{p, q+1}$ holds (where q is an even number), and
$D_{p, q+1} = D_{p+1, q+1}$ holds (where q is an odd number).

(Characteristic 3) If $D_{p,q} \neq 0$ holds,
$D_{p,q} + D_{p-1, q+1} + D_{p, q+1} \geq B_1^D$ holds (where q is an even number), and
$D_{p,q} + D_{p+1, q} + D_{p-1, q+1} + D_{p+1, q+1} \geq B_1^D$ holds (where q is an odd number).

(Characteristic 4) If $D_{p,q} + D_{p+1, q} \neq 0$ holds,
$D_{p,q} + D_{p+1, q} + D_{p-1, q+1} + D_{p+1, q+1} \geq B_2^D$ holds (where q is an even number), and
$D_{p,q} + D_{p+1, q} + D_{p, q+1} + D_{p+2, q+1} \geq B_2^D$ holds (where q is an odd number).

By utilizing the four characteristics given above, it will be proved that $ActD(6) \geq B_1^D + B_2^D$, holds, i.e., it will be proved that "the total number of differential active S-boxes included in 3d continuous F-functions $F_{p,q}$ satisfying p∈{i, i+1, i+2}, q∈{0, 1, ... d−1} for any integer i that is equal to or more than one is equal to or more than $B_1^D + B_2^D$".

It is supposed that, when an element that is not zero is arbitrarily selected from among $D_{p,q}$ (p=i+1, q∈{0, ... d−1}), it satisfies $D_{j,k} \neq 0$. It is indicated in accordance with the above-mentioned (Characteristic 1) that it always exists.

Case 1: when $D_{j, k-1} \neq 0$ holds, the followings hold:
in accordance with Characteristic 3,
$D_{j,k} + D_{j-1, k+1} + D_{j, k+1} \geq B_1^D$ (where k is an even number)
$D_{j,k} + D_{j, k+1} + D_{j+1, k+1} \geq B_1^D$ (where k is an odd number)
in accordance with Characteristic 4,
$D_{j-1, k-1} + D_{j, k-1} + D_{j-1, k} + D_{j+1, k} \geq B_2^D$ (where k is an even number)
$D_{j, k-1} + D_{j+1, k-1} + D_{j-1, k} + D_{j+1, k} \geq B_2^D$ (where k is an odd number)

Thus, the following holds:

$$\sum_{p=i}^{i+2} \sum_{q=0}^{d-1} D_{p,q} \geq B_1^D + B_2^D$$ [Equation 27]

Case 2: when $D_{j, k+1} \neq 0$ holds, the followings hold:
in accordance with Characteristic 3,
$D_{j, k+1} + D_{j, k+2} + D_{j+1, k+2} \geq B_1^D$ (where k is an even number)
$D_{j, k+1} + D_{j, k+2} + D_{j, k+2} \geq B_1^D$ (where k is an odd number)
in accordance with Characteristic 4,
$D_{j, k} + D_{j+1, k} + D_{j-1, k+1} + D_{j+1, k+1} \geq B_2^D$ (where k is an even number)
$D_{j+1, k} + D_{j, k} + D_{j-1, k+1} + D_{j+1, k+1} \geq B_2^D$ (where k is an odd number)

Thus, the following holds:

$$\sum_{p=i}^{i+2} \sum_{q=0}^{d-1} D_{p,q} \geq B_1^D + B_2^D$$ [Equation 28]

Case 3: when $D_{j, k-1} = 0$ and $D_{j, k+1} = 0$ hold, the followings hold:
in accordance with Characteristic 2, because $D_{j, k-1} = 0$ holds,
$D_{j+1, k} = D_{j, k} \neq 0$ (where k is an even number)
$D_{j-1, k} = D_{j, k} \neq 0$ (where k is an odd number)
in accordance with Characteristic 3,
$D_{j, k} + D_{j-1, k+1} + D_{j, k+1} \geq B_1^D$ (where k is an even number)
$D_{j, k} + D_{j, k+1} + D_{j+1, k+1} \geq B_1^D$ (where k is an odd number)
further in accordance with Characteristic 3,
$D_{j+1, k} + D_{j, k+1} + D_{j+1, k+1} \geq B_1^D$ (where k is an even number)
$D_{j-1, k} + D_{j-1, k+1} + D_{j, k+1} \geq B_1^D$ (where k is an odd number)
Thus, because $D_{j, k+1} = 0$ holds, the following holds:

$$\sum_{p=i}^{i+2} \sum_{q=0}^{d-1} D_{p,q} \geq B_1^D + B_2^D$$ [Equation 29]

When the cases given above are summarized, the following is proved:

$$\sum_{p=i}^{i+2} \sum_{q=0}^{d-1} D_{p,q} \geq B_1^D + B_2^D$$ [Equation 30]

In other words, the following holds:

$ActD(6) \geq B_1^D + B_2^D$

It has been proved that the number of differential active S-boxes included in six continuous rounds in the extended Feistel structure of the type 2, which is shown in FIG. 9 or FIG. 11, is equal to or more than $B_1^D + B_2^D$.

(Proof 4. Proof of $ActL(6) \geq 2B_2^L$)

Next, it will be proved that $ActL(6) \geq 2B_2^L$ holds.

In other words, it will be proved that the number of linear active S-boxes included in six continuous rounds in the extended Feistel structure of the type 2, which is shown in FIG. 9 or FIG. 11, is equal to or more than $2B_2^L$.

Note that, as described above, $B_2^L$ is defined as follows:

$$B_2^L = \min_{i,j}(Branch_n([{}^tM_{i,j}^{-1} \mid {}^tM_{i+1,j}^{-1}]))  \quad \text{[Equation 31]}$$

Additionally, the number of linear active S-boxes included in the $F_{p,q}$-th F-function is denoted by $L_{p,q}$.

When a linear mask obtained using an input that is not zero is provided in the extended Feistel structure of the type 2, the extended Feistel structure of the type 2 has the following two characteristics:

(Characteristic 5) A differential active S-box that is not zero exists in $F_{p,q}$ (p=i, q∈{0, ... d−1}) for a certain i.

(Characteristic 6)

$L_{j,k}+L_{j+1,k}+L_{j,k+1} \geq B_2^L$ or $L_{j,k}+L_{j+1,k}+L_{j,k+1}=0$ holds (where k is an even number), and $L_{j,k}+L_{j+1,k}+L_{j+1,k+1} \geq B_2^L$ or $L_{j,k}+L_{j+1,k}+L_{j+1,k+1}=0$ holds (where k is an odd number).

Note that, when a relationship is represented in a form $L_a+L_b+L_c \, B_2^L$, two or more terms included in the left-hand side do not become simultaneously zero.

By utilizing the two characteristics given above, it will be proved that $ActL(6) \geq 2B_2^L$, holds, i.e., it will be proved that "the number of linear active S-boxes included in 3d F-functions $F_{p,q}$ satisfying p∈{i, i+1, i+2}, q∈{0, 1, ... d−1} for any integer i that is equal to or more than one is equal to or more than $2B_2^L$".

It is supposed that, when an element that is not zero is arbitrarily selected from among $L_{p,q}$ (p=i+1, q∈{0, ... d−1}), it satisfies $L_{j,k} \neq 0$. It is indicated in accordance with Characteristic 5 that such L k always exists.

The followings hold:
in accordance with Characteristic 6,
$L_{j-1,k}+L_{j,k}+L_{j-1,k+1} \geq B_2^L$ (where k is an even nubmer)
$L_{j,k}+L_{j+1,k}+L_{j+1,k+1} \geq B_2^L$ (where k is an odd number)
Case 1: when $L_{j,k} \neq 0$ holds, the followings hold: in accordance with Characteristic 6,
$L_{j,k-1}+L_{j+1,k-1}+L_{j+1,k} \geq B_2^L$ (where k is an even number)
$L_{j-1,k-1}+L_{j,k-1}+L_{j-1,k} \geq B_2^L$ (where k is an odd number)
Thus, in this case, the following holds:

$$\sum_{p=i}^{i+2}\sum_{q=0}^{d-1} L_{p,q} \geq B_2^L \quad \text{[Equation 32]}$$

Case 2: when $L_{j,k-1}=0$ holds, the followings hold:
in accordance with Characteristic 6,
$L_{j-1,k-1} \neq 0$ (where k is an even number)
$L_{j+1,k-1} \neq 0$ (where k is an odd number)
Thus, the followings hold:
$L_{j-1,k-2}+L_{j,k-2}+L_{j-1,k-1} \geq B_2^L$ (where k is an even number)
$L_{j,k-2}+L_{j+1,k-2}+L_{j+1,k-1} \geq B_2^L$ (where k is an odd number)
Because d≧4 holds in this case, in such case, the following holds:

$$\sum_{p=i}^{i+2}\sum_{q=0}^{d-1} L_{p,q} \geq B_2^L \quad \text{[Equation 33]}$$

When Case 1 and Case 2 given above are summarized, it is proved that the following holds:

$$\sum_{p=i}^{i+2}\sum_{q=0}^{d-1} L_{p,q} \geq B_2^L \quad \text{[Equation 34]}$$

In other words, the following holds:

$ActL(6) \geq 2B_2^L$,

It has been proved that the number of linear active S-boxes included in six continuous rounds in the extended Feistel structure of the type 2, which is shown in FIG. 9 or FIG. 11, is equal to or more than $2B_2^L$.

[7. Improved Configuration for Implementation Based on Contrivance of Setting of F-Functions and Process of Utilizing F-Functions]

As described above, in the present invention, at least two or more different matrices are selectively applied to linear transformation processes performed in F-functions in respective rounds, i.e., the so-called diffusion-matrix switching mechanism (DSM) is applied, in the extended Feistel structure having the number of data lines: d that is set to an integer satisfying d≧2, thereby realizing a configuration in which resistance to linear analysis or differential analysis is enhanced.

when a configuration in which operation processes in which a plurality of different matrices are selectively applied are performed in this manner is to be realized as hardware, different F-function processing sections having hardware configurations for performing operations corresponding to the respective matrices are necessary. Particularly, when a plurality of F-functions are to be performed in parallel in one round, a plurality of circuits for the plurality of F-functions for performing parallel processing are necessary.

In other words, the extended Feistel structure of the type 2, which has been previously described with reference to FIG. 9 or FIG. 11, has a configuration in which data transformation processes to which a plurality of F-functions are applied in the same round are performed in parallel. When the processes according to the configuration of the type 2 are to be performed with hardware, it is necessary to implement the number of pieces of F-function hardware that corresponds to the number of F-functions that are performed in parallel in one round. Regarding F-functions that are required to be performed in parallel as mentioned above, a plurality of F-functions having the same configuration need to be provided even when they has the same configuration.

As described above, a cryptographic process configuration of the present invention is a configuration in which a plurality of at least two or more different matrices are selectively applied to linear transformation processes that are performed in F-functions in respective rounds, whereby it is provided as a configuration in which resistance to various types of attacks is enhanced. In other words, it is provided as a configuration provided with the diffusion-matrix switching mechanism (DSM: Diffusion Switching Mechanism).

In order to satisfy the diffusion-matrix switching mechanism (DSM), it is only necessary that a condition is satisfied, for example, in which a plurality of different matrices satisfying a condition in which a minimum number of branches $[B_k^D]$ for all of the data lines is equal to or more than three are set, the minimum number of branches $[B_k^D]$ for all of the data lines being selected from among minimum numbers of branches $[B_k^D(s(i))]$ corresponding to the data lines, each of the minimum numbers of branches $[B_k^D(s(i))]$ corresponding to the data lines being calculated on the basis of linear transformation matrices included in k (where k is an integer equal to or more than two) continuous F-functions that are input to a corresponding data line s(i) in the extended Feistel structure. There is no particular constraint of the F-functions that are performed in parallel in each round.

An example of a configuration in which implementation efficiency is improved while maintaining resistance based on the diffusion-matrix switching mechanism (DSM) in an extended Feistel structure on the basis of these characteristics will be described below.

(7-1. Method for Efficiently Arranging F-Functions in Extended Feistel Structure of Type 2)

First, to begin with, a configuration for efficiently arranging F-functions in the extended Feistel structure of the type 2, which has been described with reference to FIG. 9 or FIG. 11, will be described. As mentioned in the section heading (5-2. Application of DSM to Extended Feistel Structure of Type 2) that has been previously described, the extended Feistel structure of the type 2 has the following parameters.

Parameters:
(a) The number of divisions for a piece of data: d (where d is an even number equal to or more than four)
(b) The length of a piece of input/output data: dmn bits
(c) The length of pieces of divided data: mn bits
(d) The number of F-functions per round: d/2

In other words, as shown in FIG. 9, F-functions are applied to mn-bit data lines provided as odd-numbered data lines from the left end in each round, and the process results of the F-functions are output to immediately adjacent data lines and subjected to exclusive-OR. Note that the operators of exclusive-OR are omitted in FIG. 9.

Figure 12:
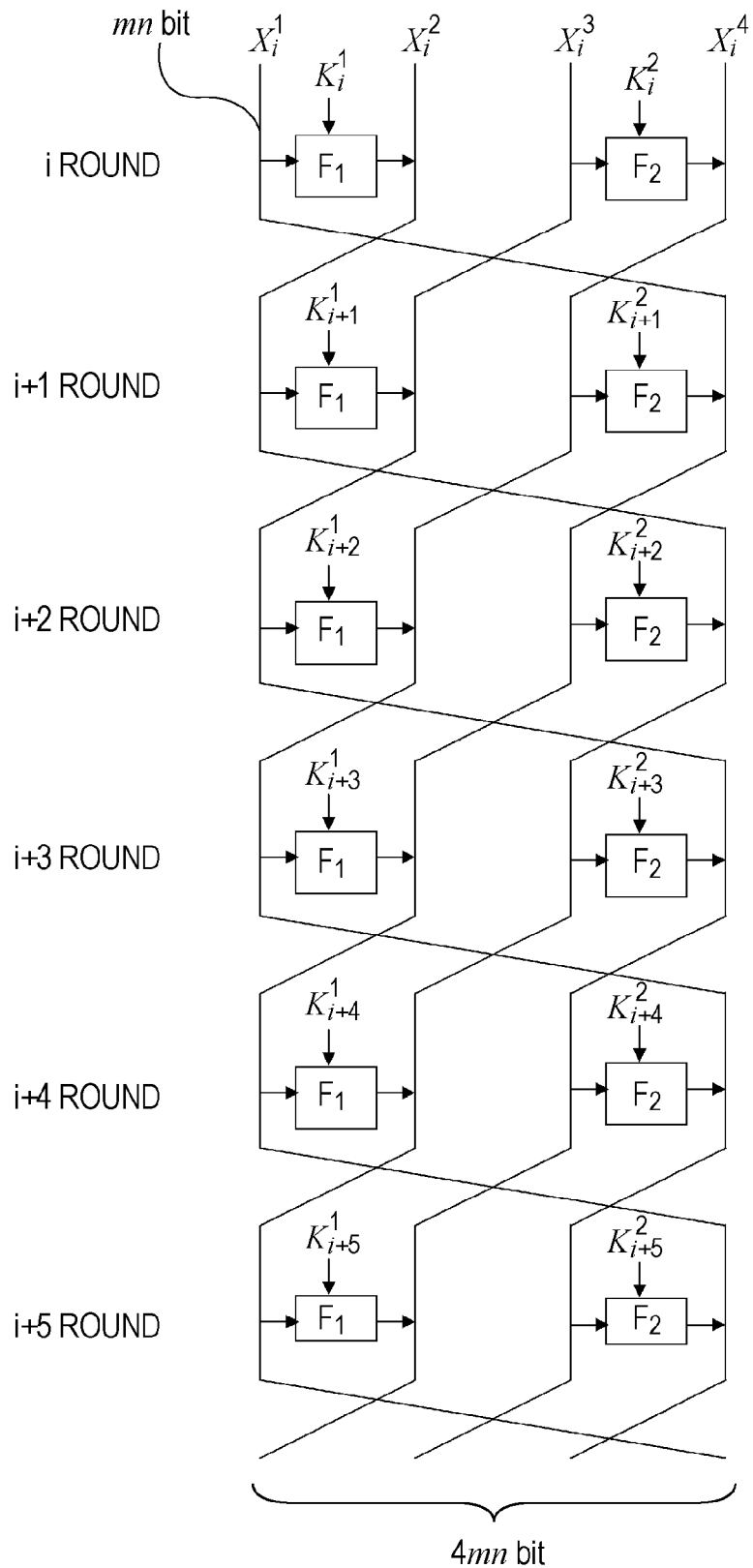
FIG. 12 is a diagram describing a configuration in which implementation efficiency is improved in an extended Feistel structure.

A configuration will be described below, in which implement efficiency for the extended Feistel structure of the type 2 having such a configuration is enhanced. As one example, a case in which the number of data lines (the number of divisions) is set as d=4 will be described with reference to FIG. 12. In FIG. 12, two different F-functions that perform linear transformation using two different linear transformation matrices M1 and M2 are denoted by F1 and F2, respectively.

A Feistel structure shown in FIG. 12 is the extended Feistel structure of the type 2 in which the two F-functions, i.e., the F-functions F1 and F2, are used, and in which d=4 holds. In other words, it has a configuration having the followings:
(a) The number of divisions for a piece of data: four
(b) The length of a piece of input/output data: 4 nm bits
(c) The length of pieces of divided data: mn bits
(d) The number of F-functions per round: 4/2=2

In a case of the configuration shown in FIG. 12, in order to satisfy conditions for the DSM by using the two F-functions, some arrangements can be considered. In other words, in order to satisfy conditions for the DSM, as described above, it is only necessary that a condition is satisfied, for example, in which a plurality of different matrices satisfying a condition in which a minimum number of branches $[B_k^D]$ for all of the data lines is equal to or more than three are set, the minimum number of branches $[B_k^D]$ for all of the data lines being selected from among minimum numbers of branches $[B_k^D(s(i))]$ corresponding to the data lines, each of the minimum numbers of branches $[B_k^D(s(i))]$ corresponding to the data lines being calculated on the basis of linear transformation matrices included in k (where k is an integer equal to or more than two) continuous F-functions that are input to a corresponding data line s(i) in the extended Feistel structure. There is no particular constraint of the F-functions that are performed in parallel in each round.

Accordingly, as manners in which F-functions are set, the following two manners can be used:
(a) Setting a plurality of F-functions that are to be set in one round as the same F-functions
(b) Setting a plurality of F-functions that are to be set in one round as different F-functions Here, as shown in FIG. 12, a configuration is provided. in which two F-functions that exist in one round are selected so that they are a pair of F1 and F2. An advantage of this configuration markedly appears when hardware (H/W) implementation is performed on the basis of processes for one round.

Figure 13:
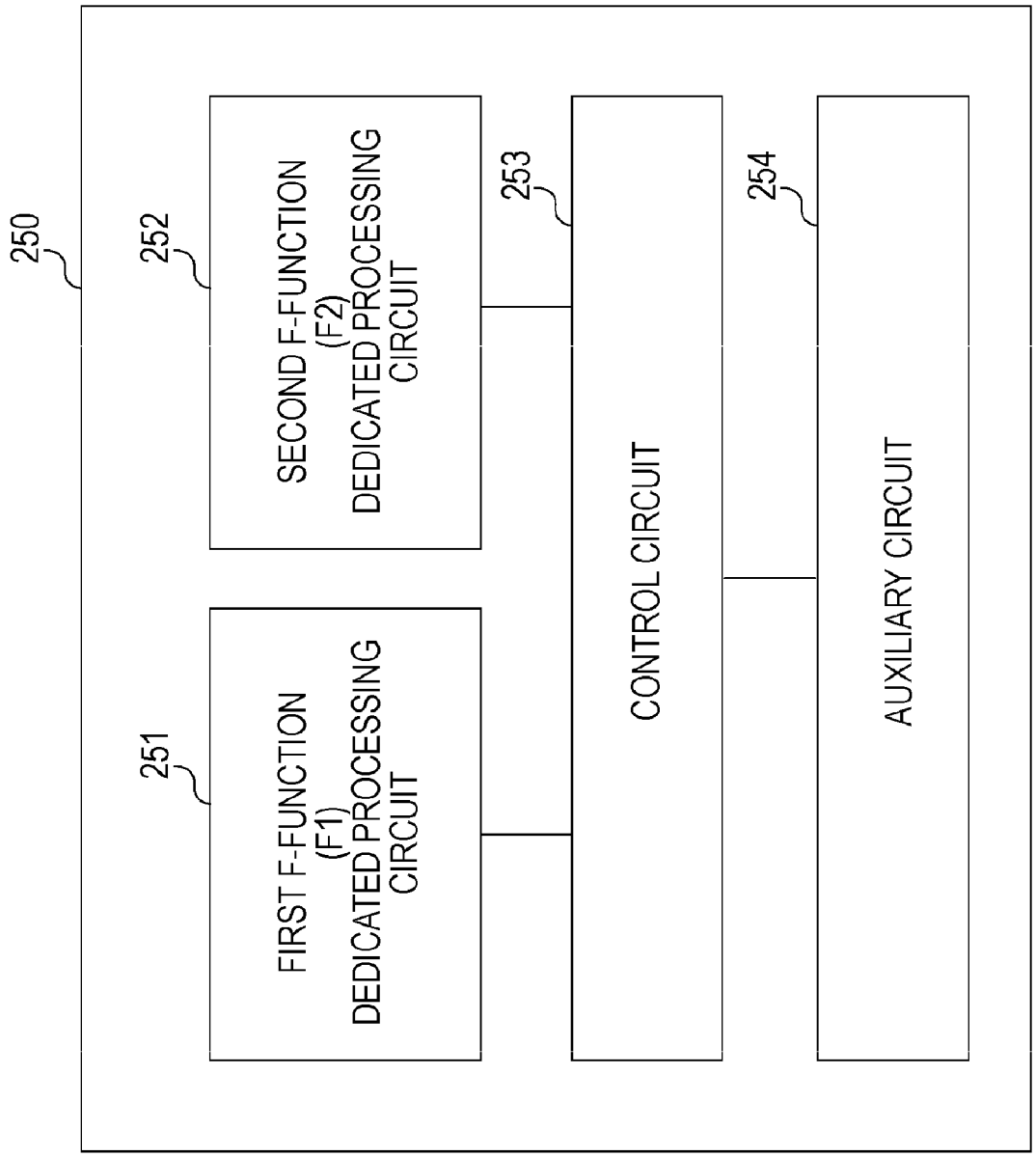
FIG. 13 is a diagram describing an example of a hardware configuration in which implementation efficiency is improved in an extended Feistel structure.

In other words, hardware (H/W) implementation is performed to set hardware having a configuration in which only processes for one round can be performed, i.e., a configuration in which the F-function F1 and the function F2 can be performed in parallel as shown in FIG. 13. FIG. 13 is a block diagram showing a cryptographic processing apparatus 250 having a hardware configuration in which the cryptographic process according to the extended Feistel structure shown in FIG. 12 is performed.

The cryptographic processing apparatus 250 includes a first F-function (F1) dedicated processing circuit 251 that performs the F-function F1, a second F-function (F2) dedicated processing circuit 252 that performs the F-function F2, a control circuit 253, and an auxiliary circuit 254. The first F-function (F1) dedicated processing circuit 251 and the second F-function (F2) dedicated processing circuit 252 are configured so that they can operate in parallel, and data transformation based on the two different F-functions is performed by applying these two circuit in each round.

The control circuit 253 performs control of input/output data for the respective F-function dedicated processing circuits 252 and 252 and the auxiliary circuit 254. The auxiliary circuit 254 performs operation processes other than the F-functions or the like.

With application of this configuration, the first F-function (F1) dedicated processing circuit 251 and the second F-function (F2) dedicated processing circuit 252 are applied only times corresponding to the required number of rounds so that round operations can be performed. The two F-function dedicated circuits are operated in parallel in all rounds, and implementation in which no useless circuit is provided can be performed.

When the number of F-functions that are performed in parallel in each round is two as shown in FIG. 12, all round operations can be performed using hardware implementation shown in FIG. 13 with a setting in which the F-functions are set as different F-functions. In addition, when a configuration in which F-functions that are performed in one round are set as the same F-functions, e.g., a configuration in which F1 and F1 are performed in parallel in the first round and F2 and F2 are performed in the second round, is provided, two pieces of each of an F1 performing circuits and an F2 performing circuit need to be provided as hardware, so that a configuration having circuits whose scale is larger than that of circuits included in the configuration shown in FIG. 13 is required.

As shown in FIG. 12, with a setting in which all of combinations of the F-functions that are performed in respective rounds are set as the pairs of F1 and F2, the hardware shown in FIG. 13 is applied, and F1 and F2 can be always simultaneously performed in each of the rounds. A compact apparatus in which the scale of circuits is reduced without providing any useless circuit is realized.

Although the configuration shown in FIG. 12 corresponds to a case in which the number of data lines is set as d=4, efficient implementation can be performed using a similar setting also in a case in which the number of data lines is set to another number. For example, although four F-functions are set in one round in a case in which the number of data lines is set as d=8, a configuration is provided, in which two pieces of each of the two different F-functions F1 and F2 are set as these four F-functions.

In an implement configuration in this case, two pieces of each of the F-functions F1 and F2 are provided, whereby a configuration in which the four F-functions (F1, F1, F2, F2) can be performed in parallel is provided. With this configuration, all of the four F-functions are performed in parallel in all rounds, and implementation without providing any useless circuit can be performed.

Additionally, when the number of data lines is set as d=16, four pieces of each of F1 and F2 are set as eight F-functions that exist in one round. For further generalization, when the number of data lines is set as d=4x, a configuration in which x pieces of the F-functions F1 and F2 are utilized in each round. In a case in which hardware implementation is performed, if a configuration in which x pieces of each of the F-functions F1 and F2 are set is provided, the numbers of pieces of F1 and F2 that are required in each round are the same. Thus, F1 and F2 can be performed without excess or deficiency, and the implementation efficiency can be improved.

Although the above-described process example is an example in which two different F-functions to which two different linear transformation matrices are applied are set in order to satisfy the diffusion-matrix switching mechanism (DSM), a similar thing can be applied also in a case in which three or more F-functions are set by using three or more linear transformation matrices.

Figure 14:
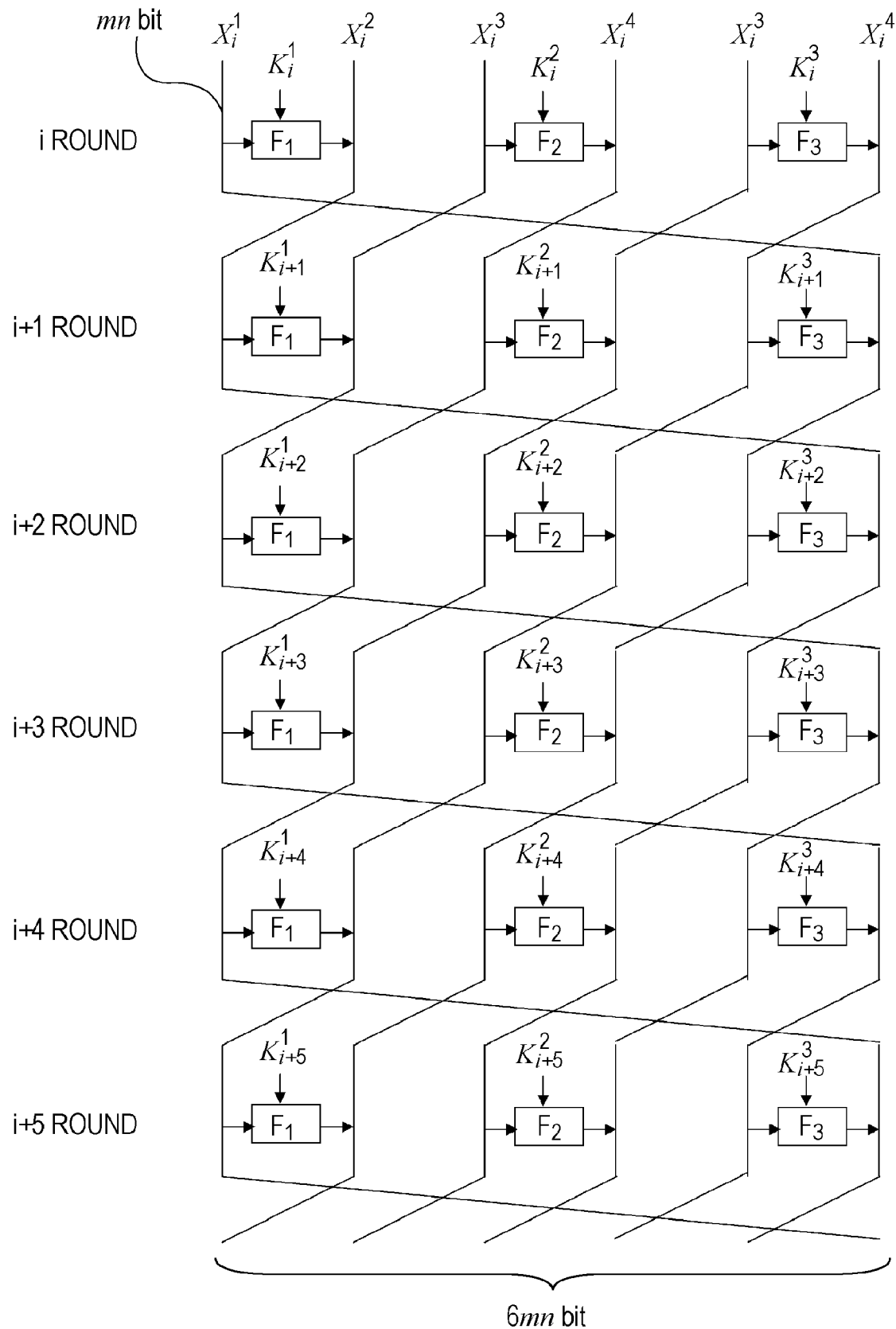
FIG. 14 is a diagram describing an example of an arrangement for efficiently implementing three types of F-functions.

An example of an arrangement for efficiently implementing three types of F-functions is shown in FIG. 14. FIG. 14 is an example of the extended Feistel structure of the type 2 having the number of data lines that is set as d=6. A configuration shown in FIG. 14 is set to a configuration in which one piece of each of three F-functions F1, F2, and F3 that exist in one round is assuredly utilized.

With this configuration, when hardware (H/W) implementation is performed, a configuration in which the F-functions can be performed in parallel in each round can be provided using simple implementation of one piece of each of F1, F2, and F3, and a circuit configuration that does not include useless circuits in terms of H/W is realized.

Furthermore, when the number of data lines is set as d=12, two pieces of each of F1, F2, and F3 are set as six F-functions that exist in one round. Additionally, when the number of data lines is set as d=18, three pieces of each of F1, F2, and F3 are set as nine F-functions that are to be set in one round. In a case in which the above-mentioned cases are generalized, when the number of data lines is set as d=6x, x pieces of each of F1, F2, and F3 are provided as F-functions that are to be set in each round. In other words, a configuration is provided, in which different F-functions are equally utilized.

With a configuration in which the F-functions are set in this manner, the numbers of pieces of F1, F2, and F3 that are required in each round can be set to the same number. When hardware implantation is performed, circuits can be set so as to be utilized without excess or deficiency, so that the implementation efficiency can be improved. In a case in which software is used, because utilizing manners in which tables for obtaining input/output values are utilized are the same in respective rounds, a table can be set in accordance with one utilizing manner without configuring tables for various supposed cases, and be stored in a memory.

When the above-described respective process examples are further generalized, the following can be said:

(1) In a case in which the extended Feistel structure of the type 2 in which a types of F-functions are utilized is configured, when the number of data lines (the number of divisions) is set as d=2ax, where a is an integer equal to or more than two and x is an integer equal to or more than one, a configuration in which x pieces of each of the types of F-functions are equally set as ax F-functions that are to be set in one round is used, so that implementation efficiency can be improved.

Note that, regarding the above-described setting of F-functions, the F-functions that are input in respective data lines are set so that the above-described conditions for DSM are satisfied. With this setting, resistance can be maintained.

(7-2. Commonality of Components in Feistel Structure and Extended Feistel Structure)

As described above, the DSM mechanism is utilized for any of the Feistel structures, the extended Feistel structure of the type 1, and the extended Feistel structure of the type 2, which have been previously described, thereby providing an advantage in that resistance to attacks is enhanced.

In other words, when the Feistel structures are broadly classified into the followings:

(a) A Feistel structure having the number of data lines (the number of divisions) that is set as d=2

(b) An extended Feistel structure having the number of data lines (the number of divisions) that is set to any number satisfying d≧2

Further, the extended Feistel structure can be classified into the followings:

(b1) A type 1 in which one F-function is allowed to be performed in each round (b2) A type 2 in which a plurality of F-functions are allowed to be performed in parallel in each round The Feistel structures can be classified into these three types (a), (b1), and (b2).

Enhancement of resistance is realized with application of the DSM mechanism in any of the three types of Feistel structures.

For application of the DSM mechanism, it is necessary to implement different F-functions that perform at least two or more different linear transformation matrices. With an implement configuration having this plurality of different F-functions, an apparatus that can selectively perform the above-mentioned plurality of different Feistel structures (a), (b1), and (b2) can be realized. Such an apparatus that performs a selection process will be described below.

A plurality of different F-functions that perform linear transformation matrices satisfying the diffusion-matrix switching mechanism (DSM) are determined, and it is supposed that the data size of input/output data of the respective F-functions is mn bits. With application of such F-functions, for example, 2 nm-bit block cipher is performed in a Feistel structure, as shown in FIG. 15, having the number of data lines that is set as d=2.

Figure 15:
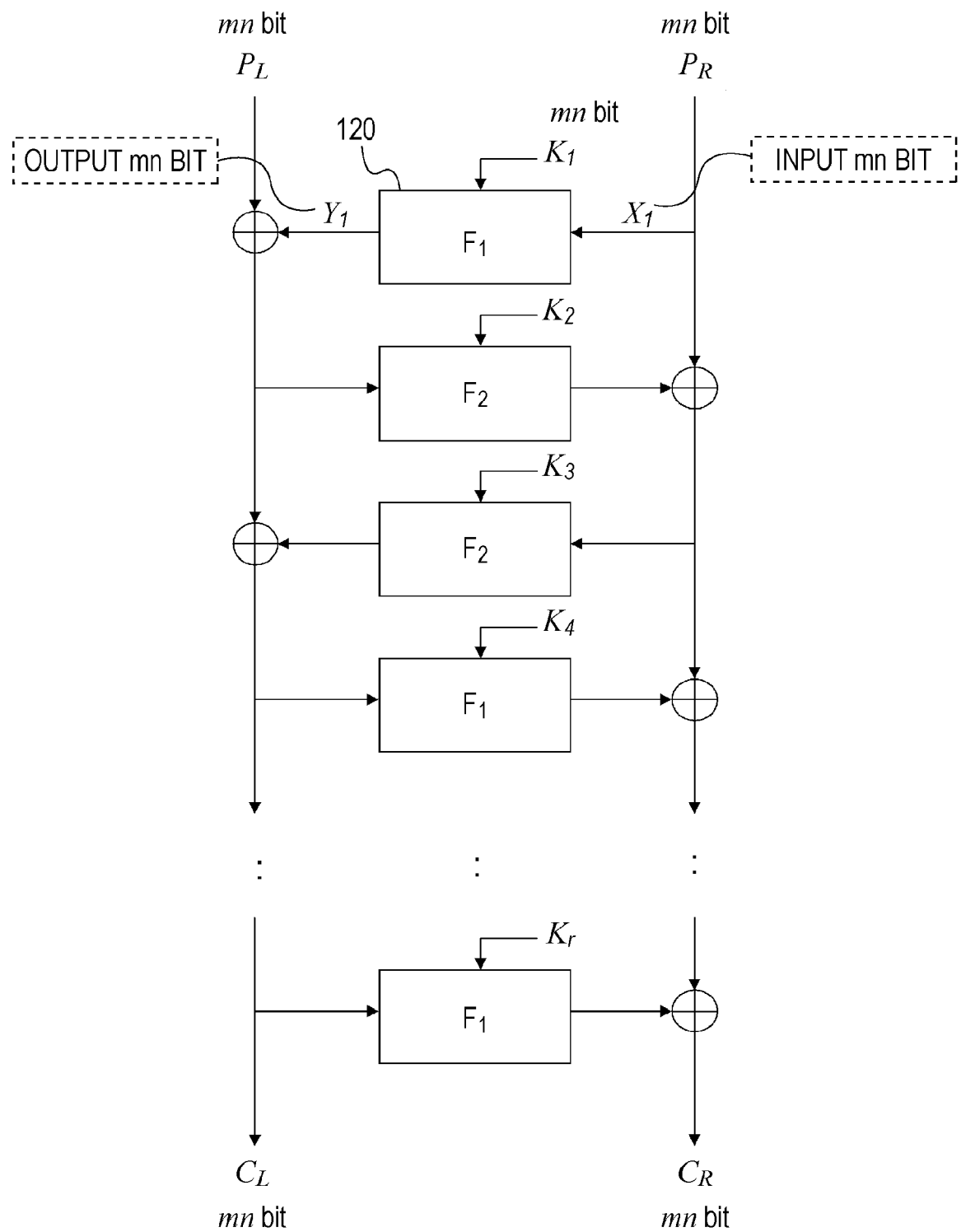
FIG. 15 is a diagram showing a 2 nm-bit block-cipher configuration which is provided as a Feistel structure having the number of data lines that is set as d=2.

The size of input/output data of the respective F-functions F1 and F2 in the Feistel structure having the number of data lines that is set as d=2, which is shown in FIG. 15, is mn bits. The Feistel structure having the number of data lines that is set as d=2 performs a process of transforming 2 nm-bit plaintext into 2 nm-bit ciphertext, or a decryption process that is the reverse of the process, thereby performing 2 nm-bit block cipher.

Additionally, by utilizing the F-functions F1 and F2 whose input/output data size is mn bits, which are shown in FIG. 15, an extended Feistel structure that satisfies the diffusion-matrix switching mechanism (DSM) and that has the number of data lines that is set as d=4 can be configured. A configuration of the extended Feistel structure is shown in FIG. 16.

Figure 16:
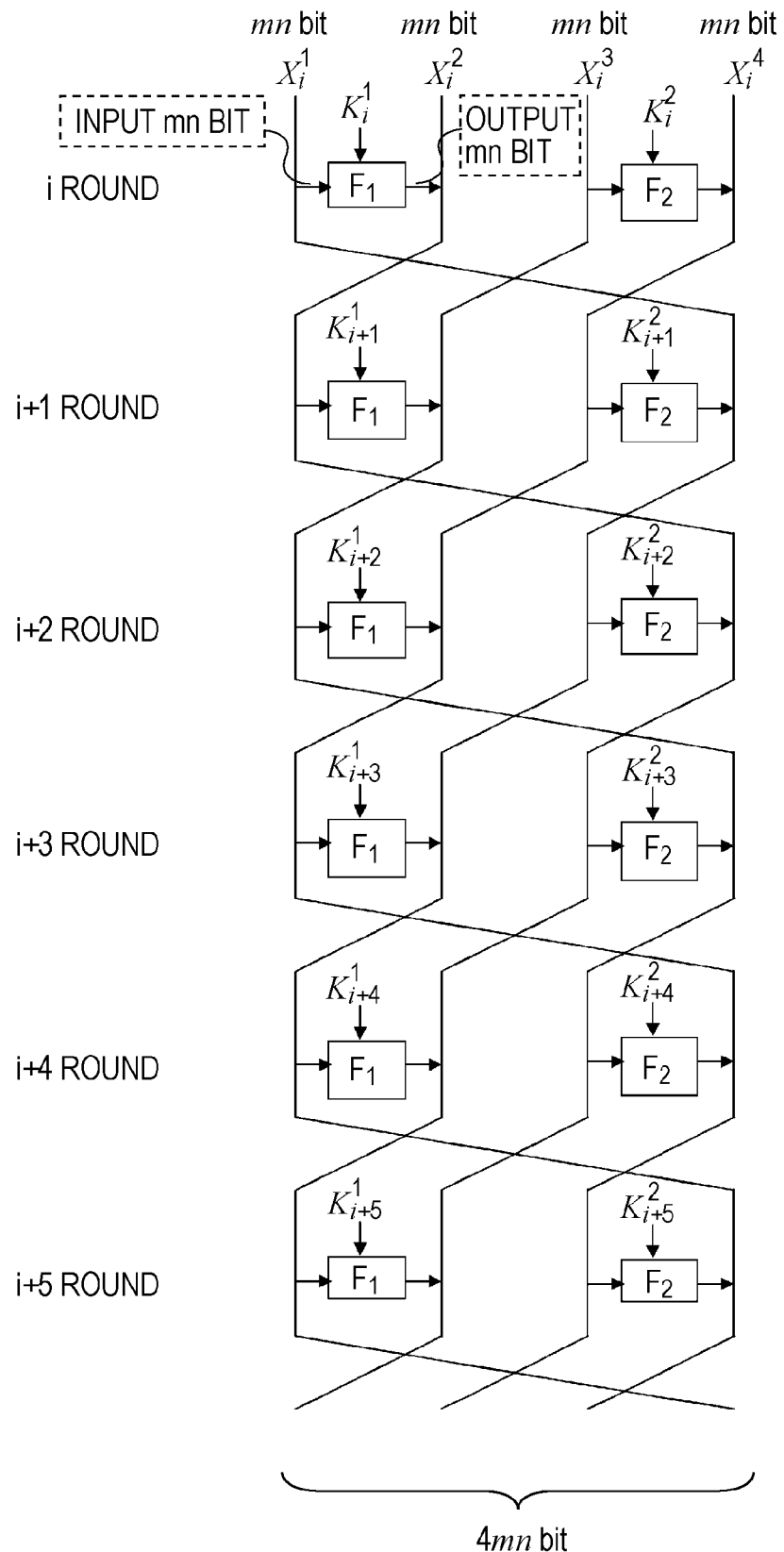
FIG. 16 is a diagram showing an extended Feistel structure which satisfies the diffusion-matrix switching mechanism (DSM), and which has the number of data lines that is set as d=4.

The size of input/output data of respective F-functions F1 and F2 in the Feistel structure having the number of data lines that is set as d=4, which is shown in FIG. 16, is mn bits, and the F-functions F1 and F2 shown in FIG. 15 are applied as they are. The Feistel structure having the number of data lines that is set as d=4 performs a process of transforming 4 nm-bit plaintext into 4 nm-bit ciphertext, or a decryption process that is the reverse of the process, thereby performing 4 nm-bit block cipher.

Furthermore, for generalization, when the number of data lines is set as d=x where x is an integer equal to or more than two, a block-cipher configuration in which an xmn-bit encryption or decryption process is performed can be structured using the same configuration for performing F-functions.

For example, an apparatus capable of selectively performing an input/output 128-bit block-cipher process and a 256-bit block-cipher process in which the DSM mechanism is realized by using only different F-functions F1 and F2 whose input/output bits is 64 bits.

In other words, the two different F-functions F1 and F2 whose input/output bits is 64 bits are implemented as F-functions, and a manner for utilizing the F-functions F1 and F2 is controlled. For example, when a cryptographic process based on the Feistel structure having the number of data lines that is set as d=2 (FIG. 15) is to be performed, a configuration is provided, in which one of the respective F-functions F1 and F2 is performed in each round. In contrast, when a cryptographic process based on the Feistel structure having the number of data lines that is set as d=4 (FIG. 16) is to be performed, a configuration is provided, in which the respective F-functions F1 and F2 are performed in parallel in each round. In this manner, by installing the two types of F-functions, an apparatus capable of selectively performing input/output 128-bit block cipher and 256-bit block cipher is realized. In other words, although the same F-functions are used, the connection method is changed, whereby block cipher having the different numbers of bits can be performed, so that it can be expected that implementation efficiency will be improved by the commonality of circuits and/or codes or the like in both S/W and H/W.

Figure 17:
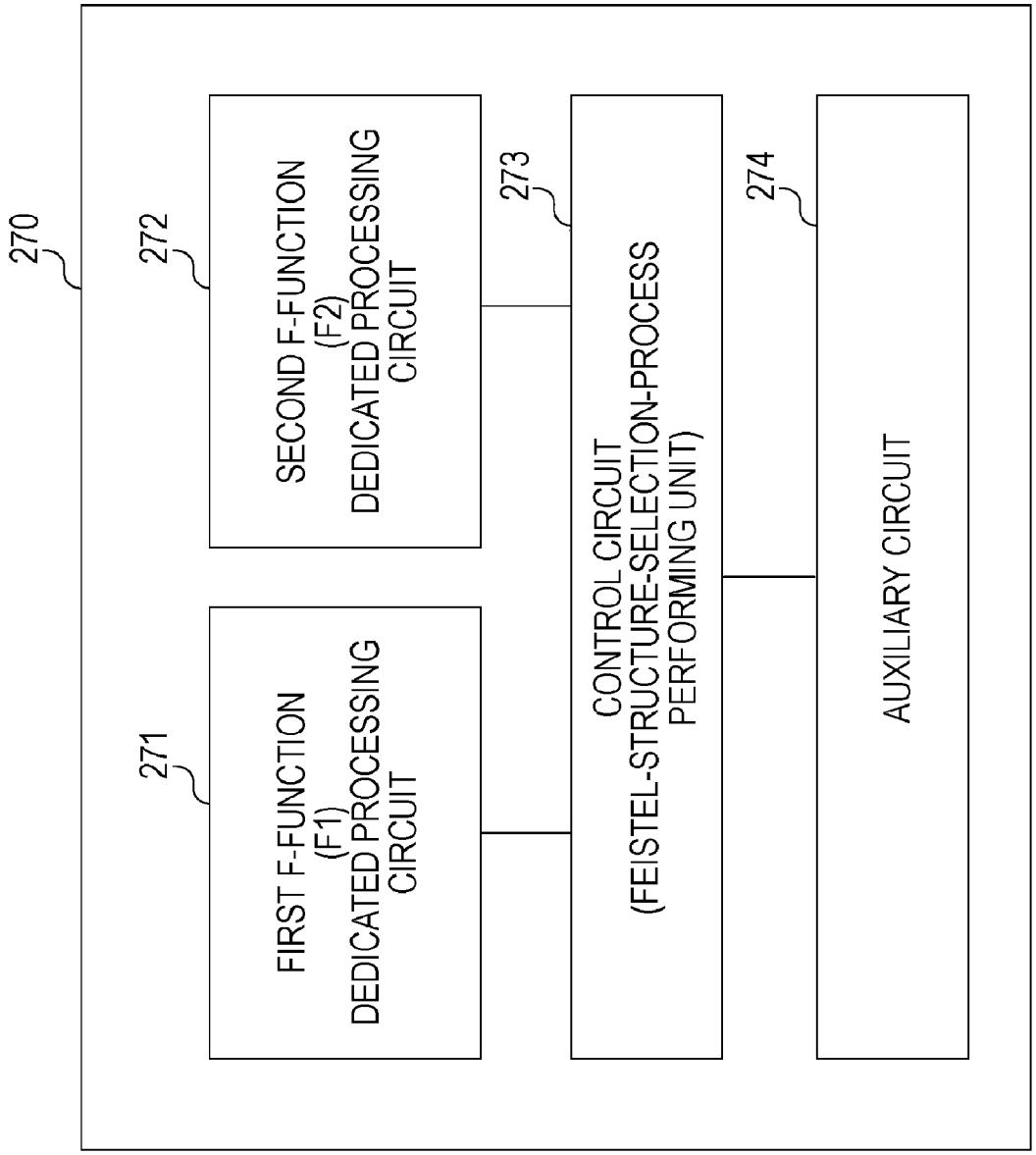
FIG. 17 is a diagram describing a circuit sharing configuration in which block cipher using different numbers of bits can be performed.

An example of a configuration of a cryptographic processing apparatus having such a configuration is shown in FIG. 17. A cryptographic processing apparatus 270 that is shown in FIG. 17 includes a first F-function (F1) dedicated processing circuit 271 that performs the F-function F1, a second F-function (F2) dedicated processing circuit 272 that performs the F-function F2, a control circuit 273, and an auxiliary circuit 274. The first F-function (F1) dedicated processing circuit 271 and the second F-function (F2) dedicated processing circuit 272 are configured so that they can operate in parallel. The control circuit 273 performs control of input/output data for the respective processing units, and performs a process of selecting a Feistel structure. The auxiliary circuit 274 performs operation processes other than the F-functions or the like.

The control circuit 273 performs the process of selecting a Feistel structure, i.e., selects any one of the following structures to perform a cryptographic process based on the structure:

(a) A Feistel structure having the number of data lines (the number of divisions) that is set as d=2

(b1) An extended Feistel structure of a type 1 which has the number of data lines (the number of divisions) that is set as any number satisfying d≧2, and in which one F-function is allowed to be performed in each round (b2) An extended Feistel structure of a type 2 which has the number of data lines (the number of divisions) that is set as any number satisfying d≧2, and in which a plurality of F-functions is allowed to be performed in parallel in each round Note that, setting information is input, for example, from the outside. Alternatively, a configuration may be provided, in which a processing mode to be performed is selected in accordance with the bit length of data that is to be subjected to an encryption or decryption process. The control circuit 273 performs control of changing a sequence of application of the respective F-function dedicated circuits in accordance with the selection, and control of performing round functions according to the respective Feistel structures.

With application of this configuration, the first F-function (F1) dedicated processing circuit 251 and the second F-function (F2) dedicated processing circuit 252 are applied so that cryptographic processes to which various Feistel structures are applied can be performed. Cryptographic processes supporting various bits, in which bits to be processed in an encryption process or a decryption process are different, can be performed.

Figure 18:
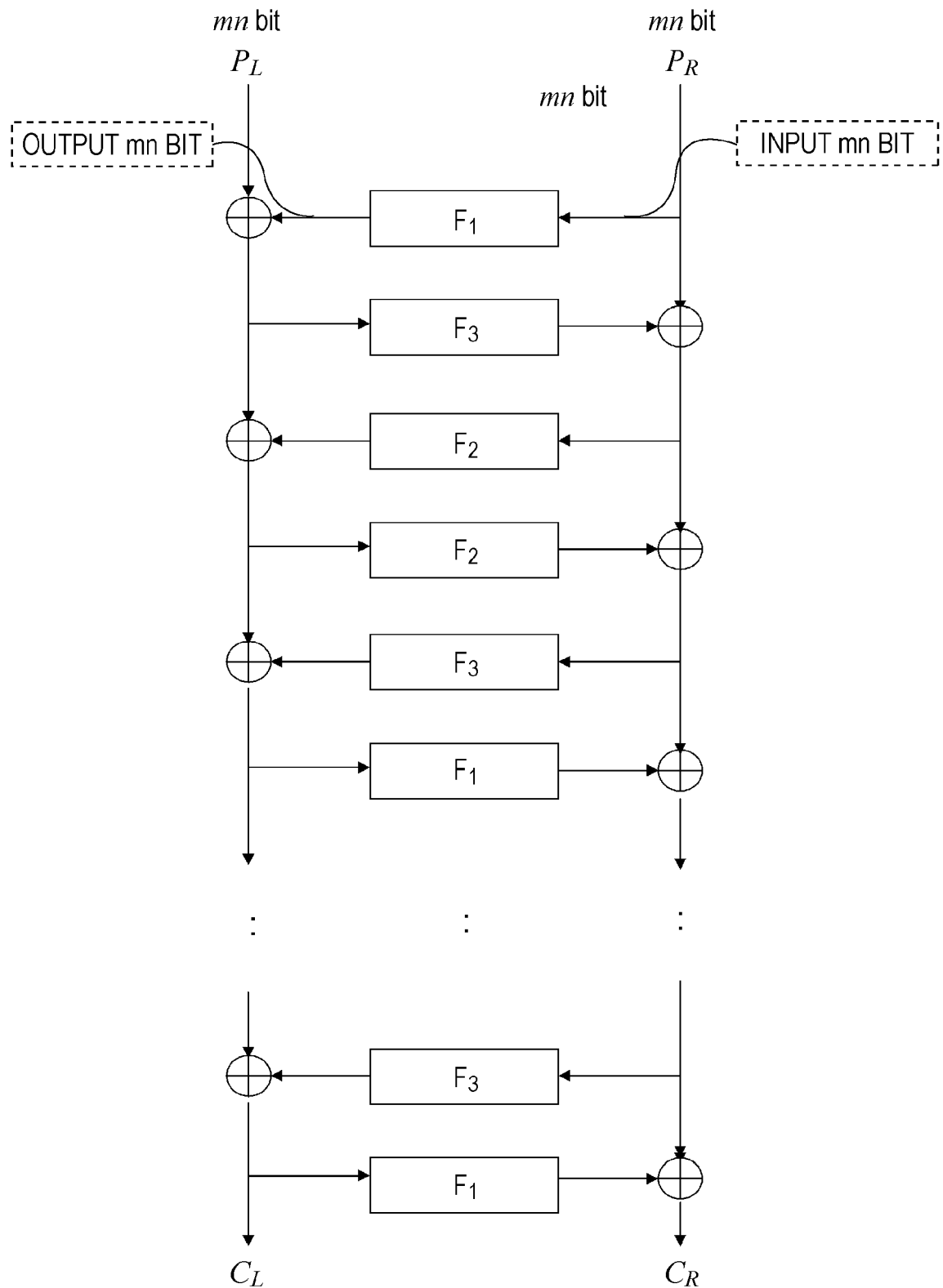
FIG. 18 is a diagram describing a Feistel structure to which F-functions, i.e., three types of F-functions F1, F2, and F3, are applied, and which has the number of data lines that is set as d=2.

Additionally, although an example in which two F-functions are used is shown in FIG. 17, the configuration is not limited to that provided in the example in which two F-functions are used, and a similar result can be expected also with a configuration in which any number of F-functions are used. For example, the extended Feistel structure that has been previously described with reference to FIG. 14 is configured as an extended Feistel structure which satisfies the diffusion-matrix switching mechanism (DSM), and which has the number of data lines d=6 with application of the three different F-functions F1, F2, and F3. A cryptographic process configuration having a Feistel structure having the number of data lines that is set as d=2, which is shown in FIG. 18, can be constructed with application of the same three types of F-functions, i.e., the F-functions F1, F2, and F3. Also in the configuration in which the number of data lines is set as d=2, the respective matrices F1, F2, and F3 are arranged with a setting in which they satisfy the DSM mechanism.

Figure 19:
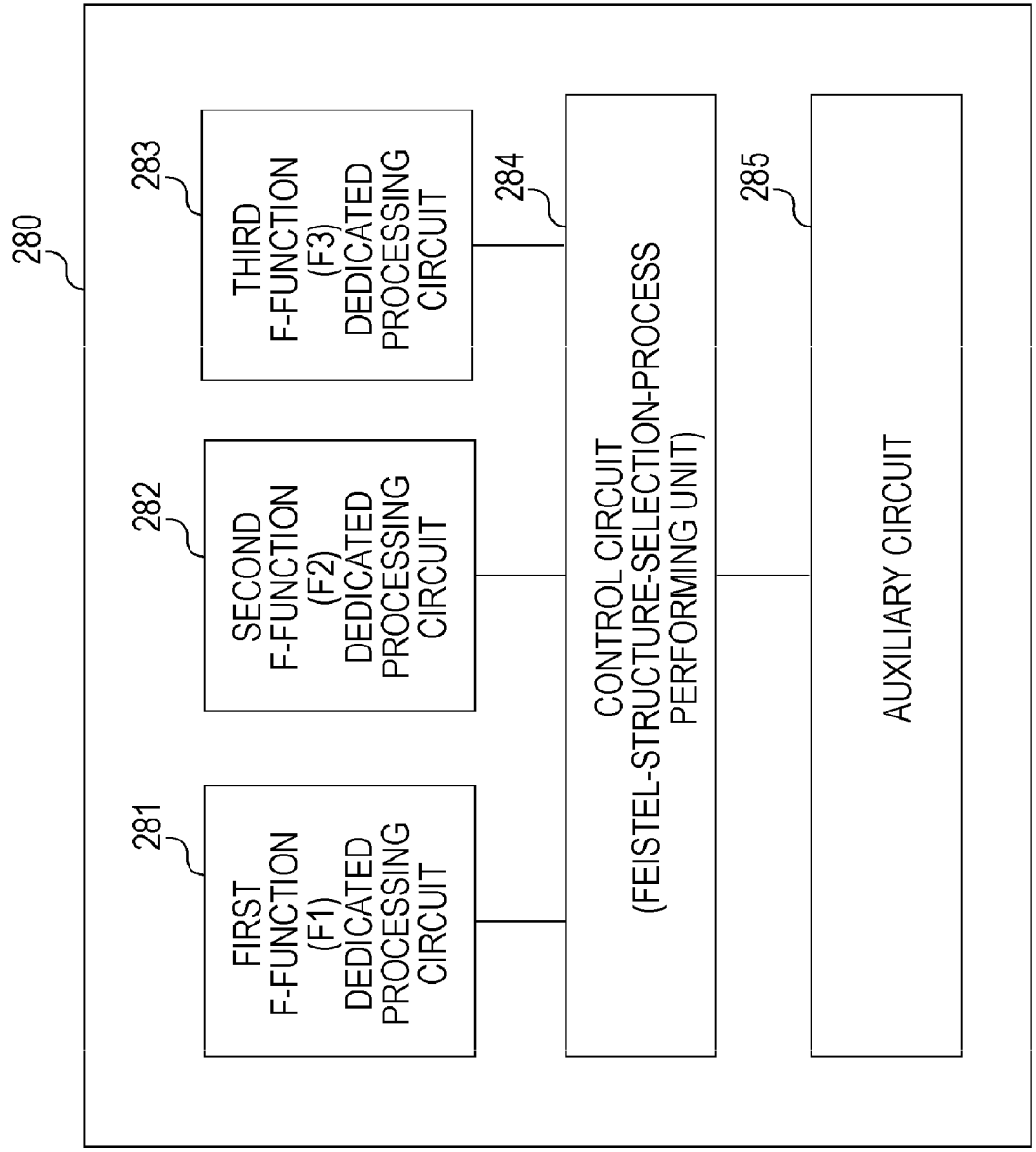
FIG. 19 is a diagram describing an example of a configuration of a cryptographic processing apparatus that performs the three types of F-functions F1, F2, and F3.

An example of a configuration of a cryptographic processing apparatus that performs the three types of F-functions, i.e., F1, F2, and F3, is shown in FIG. 19. A cryptographic processing apparatus 280 that is shown in FIG. 19 includes a first F-function (F1) dedicated processing circuit 281 that performs the F-function F1, a second F-function (F2) dedicated processing circuit 282 that performs the F-function F2, a third F-function (F3) dedicated processing circuit 283 that performs the F-function F3, a control circuit 274, and an auxiliary circuit 275. The first F-function (F1) dedicated processing circuit 281, the second F-function (F2) dedicated processing circuit 282, and the third F-function (F3) dedicated processing circuit 283 are configured so that they can operate in parallel. The control circuit 284 performs control of input/output data for the respective processing units, and performs a process of selecting a Feistel structure. The auxiliary circuit 285 performs operation processes other than the F-functions or the like.

The control circuit 284 performs the process of selecting a Feistel structure, i.e., selects any one of the following structures to perform a cryptographic process based on the structure:

(a) A Feistel structure having the number of data lines (the number of divisions) that is set as d=2

(b1) An extended Feistel structure of a type 1 which has the number of data lines (the number of divisions) that is set as any number satisfying d≧2, and in which one F-function is allowed to be performed in each round (b2) An extended Feistel structure of a type 2 which has the number of data lines (the number of divisions) that is set as any number satisfying d≧2, and in which a plurality of F-functions is allowed to be performed in parallel in each round Note that, setting information is input, for example, from the outside. The control circuit 284 performs control of changing a sequence of application of the respective F-function dedicated circuits in accordance with the setting, and control of performing round functions according to the respective Feistel structures.

With application of this configuration, the first F-function (F1) dedicated processing circuit 281 to the third F-function (F3) dedicated processing circuit 283 are applied so that cryptographic processes to which various Feistel structures are applied can be performed. Cryptographic processes supporting various bits, in which bits to be processed in an encryption process or a decryption process are different, can be performed. Note that a configuration having four or more F-function performing sections can be provided.

As described above, a plurality of different F-functions that perform linear transformation matrices satisfying the diffusion-matrix switching mechanism (DSM) are determined, and the respective F-functions are implemented. A sequence of processes to which the F-functions are applied is changed, thereby realizing a configuration in which a cryptographic process based on any one of the following structures is selectively performed:

(a) A Feistel structure having the number of data lines (the number of divisions) that is set as d=2

(b1) An extended Feistel structure of a type 1 which has the number of data lines (the number of divisions) that is set as any number satisfying d≧2, and in which one F-function is allowed to be performed in each round (b2) An extended Feistel structure of a type 2 which has the number of data lines (the number of divisions) that is set as any number satisfying d≧2, and in which a plurality of F-functions is allowed to be performed in parallel in each round An apparatus capable of changing the number of bits to be processed in an encryption process or a decryption process.

For example, cryptographic processes with a high resistance can be performed using a process configuration in which a (a is an integer equal to or more than two) types of F-functions are configured, in which cryptographic processes based on the above-mentioned three types of Feistel structures are performed, and in which the diffusion-matrix switching mechanism (DSM) is satisfied.

[8. Summary of Cryptographic Processes and Cryptographic Algorithm Constructing Processes of Present Invention]

Finally, the cryptographic processes and cryptographic algorithm constructing processes of the present invention, which have been described above, will be described together.

As described with reference to FIGS. 1 and 2, the cryptographic processing apparatus of the present invention has the cryptographic processing section that performs a Feistel-type common-key block-cipher process of repeating an SP-type F-function, which performs a data transformation process including a non-linear transformation process and a linear transformation process, in a plurality of rounds. Furthermore, as described with reference to FIG. 5 and the followings, the cryptographic processing section is configured to perform a cryptographic process to which an extended Feistel structure having a number of data lines: d that is set to an integer satisfying d≧2 is applied, and configured to selectively apply a plurality of at least two or more different matrices to linear transformation processes that are performed in F-functions in respective rounds.

The plurality of at least two or more different matrices are set so as to realize the diffusion-matrix switching mechanism (DSM: Diffusion Switching Mechanism), and the cryptographic process in which resistance to differential attacks or linear attacks is enhanced is realized by using the DSM. In order to realize enhancement of resistance by using the DSM, selection and arrangement of matrices are performed in accordance with specific conditions.

In other words, a plurality of different matrices satisfying a condition in which a minimum number of branches for all of the data lines is equal to or more than a predetermined value are set as the plurality of matrices that are applied to the linear transformation processes which are performed in the F-functions, the minimum number of branches for all of the data lines being selected from among minimum numbers of branches corresponding to the data lines, each of the minimum numbers of branches corresponding to the data lines being based on linear transformation matrices included in F-functions that are input to a corresponding data line in the extended Feistel structure. The plurality of different matrices are repeatedly arranged in the F-functions that are input to the respective data lines in the extended Feistel structure.

More specifically, the plurality of different matrices that are utilized in the cryptographic processing section are a plurality of different matrices satisfying a condition in which a minimum number of branches $[B_k^D]$ is equal to or more than three, the minimum number of branches $[B_k^D]$ for all of the data lines being selected from among minimum numbers of branches $[B_k^D(s(i))]$ corresponding to the data lines, each of the minimum numbers of branches $[B_k^D(s(i))]$ corresponding to the data lines being calculated on the basis of linear transformation matrices included in k (where k is an integer equal to or more than two) continuous F-functions that are input to a corresponding data line s(i) in the extended Feistel structure.

Alternatively, the plurality of different matrices that are utilized in the cryptographic processing section are a plurality of different matrices satisfying a condition in which a minimum number of branches $[B_2^L]$ for all of the data lines is equal to or more than three, the minimum number of branches $[B_2^L]$ for all of the data lines being selected from among minimum numbers of branches $[B_2^L(s(i))]$ corresponding to the data lines, each of the minimum numbers of branches $[B_2^L(s(i))]$ corresponding to the data lines being calculated on the basis of linear transformation matrices included in two continuous F-functions that are input to a corresponding data line s(i) in the extended Feistel structure.

When the plurality of different matrices are denoted by n (where n is an integer equal to or more than two) different matrices, i.e., $M_0, M_1, \ldots M_{n-1}$, the encryption processing section of the encryption processing apparatus of the present invention is configured so that the different matrices $M_0, M_1, \ldots M_{n-1}$ are repeatedly arranged in an order in the F-functions that are input to the respective data lines in the extended Feistel structure. As an example of a specific extended Feistel structure, for example, the extended Feistel structure of the type 1 that performs only one F-function in one round, which has been described with reference to FIGS. 8 and 10, and the extended Feistel structure that performs a plurality of F-functions in parallel in one round are provided.

Note that the present invention includes the cryptographic processing apparatus and method that perform the cryptographic process to which the above-described extended Feistel structure are applied, and a computer program that performs the cryptographic process, and further includes an information processing apparatus and method that constructs a cryptographic processing algorithm for performing the cryptographic process to which the above-described extended Feistel structure are applied, and a computer program.

An information processing apparatus, such as a general PC, can be applied as the information processing apparatus that constructs a cryptographic processing algorithm, and the information processing apparatus has a control unit that can perform the following processing steps. In other words, the steps are:

a matrix-determining step of, in a cryptographic-processing-algorithm configuration to which an extended Feistel structure having a number of data lines: d that is set to an integer satisfying d≧2 is applied, determining a plurality of at least two or more different matrices that are to be applied to linear transformation processes which are performed in F-functions in respective rounds; and a matrix-setting step of repeatedly arranging the plurality of different matrices, which are determined in the matrix-determining step, in the F-functions that are input in the respective data lines in the extended Feistel structure.

The matrix-determining step is performed as a step of performing a process of determining, as the plurality of two or more different matrices, as matrices to be applied, a plurality of different matrices satisfying a condition in which a minimum number of branches for all of the data lines is equal to or more than a predetermined value, the minimum number of branches for all of the data lines being selected from among minimum numbers of branches corresponding to the data lines, each of the minimum numbers of branches corresponding to the data lines being based on linear transformation matrices included in F-functions that are input to a corresponding data line in the extended Feistel structure.

The diffusion-matrix switching mechanism (DSM: Diffusion Switching Mechanism) is realized in the cryptographic process to which the extended Feistel structure that is set using such a processing algorithm is applied, whereby the cryptographic process in which resistance to differential attacks or linear attacks is enhanced is realized.

[9. Example of Configuration of Cryptographic Processing Apparatus]

Finally, FIG. 20 shows an example of a configuration of an IC module 300 serving as the cryptographic processing apparatus that performs the cryptographic process according to the above-described embodiment. The above-described process can be performed in, for example, PCs, IC cards, readers/writers, or various other information processing apparatuses. The IC module 300 shown in FIG. 20 can be configured in such various devices.

A CPU (Central processing Unit) 301 shown in FIG. 20 is a processor which performs control of start or end of the cryptographic process, which performs control of transmission and reception of data, which performs control of data transfer among respective constituent units, and which executes other various types of programs. A memory 302 includes a ROM (Read-Only-Memory) that stores a program executed by the CPU 301 or fixed data such as operation parameters, a RAM (Random Access Memory) used as a storage area or work area for a program executed in a process performed by the CPU 301 and parameters that appropriately change in processing of the program, and so forth. The memory 302 can be also used as a storage area for key data necessary for the cryptographic process, a transformation table (permutation table) applied to the cryptographic process, data applied to transformation matrices, or the like. Note that it is preferable that the data storage area is configured as a memory having a tamper resistant structure.

A cryptographic processing unit 303 performs, for example, a cryptographic process and decryption process according to the above-described extended-Feistel-type common-key block-cipher processing algorithm. Note that, here, an example in which the cryptographic processing means is provided as a separate module is shown. However, a configuration may be provided, in which, instead of providing such an independent cryptographic processing module, for example, a cryptographic processing program is stored in the ROM, and in which the CPU 301 reads and executes the program stored in the ROM.

A random-number generator 304 performs a process of generating random numbers necessary for generation of keys which are necessary for the cryptographic process or the like.

A transmitting/receiving unit 305 is a data communication processing unit that performs data communication with outside. For example, the transmitting/receiving unit 705 performs data communication with an IC module such as a reader/writer, and performs output of ciphertext generated in the IC module, input of data from an external device such as a reader/writer, etc.

The IC module 300 performs, for example, the extended-Feistel-type cryptographic process in which the number of data lines d is set to an integer satisfying d≧2 in accordance with the above-described embodiment. Different linear transformation matrices are set as linear transformation matrices in F-functions in an extended Feistel structure in a manner according to the above-described embodiment, whereby the diffusion-matrix switching mechanism (DSM: Diffusion Switching Mechanism) is realized, so that resistance to differential attacks or linear attacks can be enhanced.

The present invention has been described in detail with reference to the specific embodiment. However, it is obvious that a person skilled in the art could make modifications or alternatives to the embodiment without departing from the scope of the present invention. In other words, the present invention has been disclosed in a form of illustration, and should not be restrictively construed. The section of CLAIMS should be referred in order to determine the scope of the present invention.

The series of processes described in the specification can be performed by hardware or software, or a combination configuration of both hardware and software. In a case in which the processes are performed by software, a program in which a sequence of processes is recorded can be installed into a memory provided in a computer incorporated in dedicated hardware, and can be executed. Alternatively, the program can be installed into a general-purpose computer capable of performing various processes, and can be executed.

For example, the program can be recorded in advance on a hard disk or ROM (Read Only Memory) serving as a recording medium. Alternatively, the program can be stored (recorded) temporarily or permanently on a removable recording medium such as a flexible disc, a CD-ROM (Compact Disc Read Only Memory), an MO (Magneto optical) disc, a DVD (Digital Versatile Disc), a magnetic disc, or a semiconductor memory. Such a removable recording medium can be provided as so-called packaged software.

Note that the program can be installed from a removable recording medium as described above into a computer. In addition, the program can be transferred wirelessly from a download site to a computer, or be transferred by wire to a computer via a network such as a LAN (Local Area Network) or the Internet, and the computer can receive the program transferred in such a manner and install it into a built-in recording medium such as a hard disk.

Note that various processes described in the specification may be performed sequentially in the order described, or may also be performed in parallel or individually in accordance with processing capabilities of an apparatus that performs the processes or on an as needed basis. In addition, a "system" mentioned in the specification is configured as a logical set of a plurality of apparatuses, and is not limited to a system in which the apparatuses having respective configurations are contained in the same casing.

INDUSTRIAL APPLICABILITY

As described above, according to a configuration in an embodiment of the present invention, in a Feistel-type common-key block-cipher process in which SPN-type F-functions including non-linear transformation sections and linear transformation sections are repeatedly performed in a plurality of rounds, round-function sections to which a plurality of different linear transformation matrices are applied are set in a Feistel structure obtained by expanding a Feistel structure having two data lines, i.e., in a Feistel structure having any number of data lines that is equal to or more than two, such as three or four, thereby realizing the diffusion-matrix switching mechanism (DSM), so that a common-key block-cipher algorithm can be constructed and a cryptographic process can be performed with a high resistance to linear analysis and differential analysis.

According to a configuration in an embodiment of the present invention, a configuration is provided, in which a cryptographic process to which an extended Feistel structure having a number of data lines: d that is set to an integer satisfying $d \geq 2$ is applied is performed, and the configuration is provided as a configuration in which a plurality of at least two or more different matrices are selectively applied to linear transformation processes performed in F-functions in respective rounds. A plurality of different matrices satisfying a condition in which a minimum number of branches for all of the data lines is equal to or more than a predetermined value are set as the plurality of two or more different matrices, the minimum number of branches for all of the data lines being selected from among minimum numbers of branches corresponding to the data lines, each of the minimum numbers of branches corresponding to the data lines being based on linear transformation matrices included in F-functions that are input to a corresponding data line in the extended Feistel structure, thereby realizing the diffusion-matrix switching mechanism (DSM), so that a common-key block-cipher algorithm can be constructed and a cryptographic process can be performed with a high resistance to linear analysis and differential analysis.

Furthermore, according to a configuration in an embodiment of the present invention, a configuration is provided, in which a ($a \geq 2$) types of F-functions perform different linear transformation processes using a plurality of different matrices, in which an extended Feistel structure ($x \geq 1$) that utilizes the F-functions and that has the number of data lines: d that is set as $d=2ax$, and in which a cryptographic process to which the extended Feistel structure is applied is performed. The configuration is provided a configuration in which equally x pieces of each of the types (the a types) of F-functions are performed in one round, whereby a compact cryptographic processing apparatus in which no useless circuit is provided is realized.

Furthermore, according to a configuration in an embodiment of the present invention, a plurality of F-function performing units are configured to perform different linear transformation processes using a plurality of different matrices, and a configuration is provided, in which a sequence of utilizing the plurality of F-function performing units is changed in accordance with a setting, whereby a cryptographic processing apparatus is realized, which can selectively perform any of cryptographic processes (a), (b1), and (b2), i.e., (a) a cryptographic process using a Feistel structure having the number of data lines d that is set as $d=2$, (b1) a cryptographic process which uses an extended Feistel structure having the number of data lines d that is set to any number satisfying $d \geq 2$, and in which only one F-function is allowed to be performed in each round, or (b2) a cryptographic process which uses an extended Feistel structure having the number of data lines d that is set to any number satisfying $d \geq 2$, and in which a plurality of F-functions are allowed to be performed in parallel in each round.

The invention claimed is:

1. A cryptographic processing apparatus comprising:
a processor;
a memory storing instructions executable by the processor to:
    perform a Feistel-type common-key block-cipher process of repeating an SP-type F-function in a plurality of rounds, the SP-type F-function performing a data transformation process including a non-linear transformation process and a linear transformation process, and
    perform a cryptographic process to which an extended Feistel structure is applied, where the extended Feistel structure has a number of data lines d that are set to an integer satisfying $d \geq 3$, and selectively apply a plurality of different matrices to the linear transformation processes that are performed in the SP-type F-functions in the plurality of rounds,
    the plurality of different matrices being a plurality of different matrices satisfying a condition in which a minimum number of branches for all of the data lines is equal to or more than a predetermined value, the minimum number of branches for all of the data lines being selected from among minimum numbers of branches corresponding to the data lines, each of the minimum numbers of branches corresponding to the data lines being based on linear transformation matrices included in the SP-type F-functions that are input to a corresponding data line in the extended Feistel structure,
    and wherein the plurality of different matrices are repeatedly arranged in the SP-type F-functions that are input to the respective data lines in the extended Feistel structure.

2. The cryptographic processing apparatus according to claim 1, wherein:
the plurality of different matrices are a plurality of different matrices satisfying a condition in which a minimum number of branches $[B_k^D]$ for all of the data lines is equal to or more than three, the minimum number of branches $[B_k^D]$ for all of the data lines being selected from among minimum numbers of branches $[B_k^D(s(i))]$ corresponding to the data lines, each of the minimum numbers of branches $[B_k^D(s(i))]$ corresponding to the data lines being calculated on the basis of linear transformation matrices included in k, where k is an integer equal to or more than two continuous F-functions that are input to a corresponding data line s(i) in the extended Feistel structure.

3. The cryptographic processing apparatus according to claim 1, wherein:

the plurality of different matrices are a plurality of different matrices satisfying a condition in which a minimum number of branches $[B_2^D]$ for all of the data lines is equal to or more than three, the minimum number of branches $[B_2^D]$ for all of the data lines being selected from among minimum numbers of branches $[B_2^D(s(i))]$ corresponding to the data lines, each of the minimum numbers of branches $[B_2^D(s(i))]$ corresponding to the data lines being calculated on the basis of linear transformation matrices included in two continuous SP-type F-functions that are input to a corresponding data line s(i) in the extended Feistel structure.

4. The cryptographic processing apparatus according to claim 1, wherein:

the plurality of different matrices are a plurality of different matrices satisfying a condition in which a minimum number of branches $[B_2^L]$ for all of the data lines is equal to or more than three, the minimum number of branches $[B_2^L]$ for all of the data lines being selected from among minimum numbers of branches $[B_2^L(s(i))]$ corresponding to the data lines, each of the minimum numbers of branches $[B_2^L(s(i))]$ corresponding to the data lines being calculated on the basis of linear transformation matrices included in two continuous SP-type F-functions that are input to a corresponding data line s(i) in the extended Feistel structure.

5. The cryptographic processing apparatus according to claim 1, wherein:

when the plurality of different matrices are denoted by $n_i$ where n is an integer equal to or more than two different matrices, $M_O, M_1, \ldots M_{n-1}$ are repeatedly arranged in an order in the SP-type F-functions that are input to the respective data lines in the extended Feistel structure.

6. The cryptographic processing apparatus according to any of claims 1 to 5, wherein the instructions are further executable by the processor to:

perform a cryptographic process to which an extended Feistel structure that performs only one F-function in one round is applied.

7. The cryptographic processing apparatus according to any of claims 1 to 5, wherein the instructions are further executable by the processor to:

perform a cryptographic process to which an extended Feistel structure that performs a plurality of F-functions in parallel in one round is applied.

8. The cryptographic processing apparatus according to any of claims 1 to 5, wherein the instructions are further executable by the processor to:

perform, when a is any integer satisfying $a \geq 2$ and x is any integer satisfying $x \geq 1$, a cryptographic process to which an extended Feistel structure that utilizes a types of F-functions and that has the number of data lines: d which is set as d=2ax is applied, the a types of F-functions performing different linear transformation processes using the plurality of different matrices, and perform equally x pieces of each of the a types of F-functions in one round.

9. The cryptographic processing apparatus according to claim 8, wherein the instructions are further executable by the processor to:

perform ax F-functions which are performed in parallel in one round; and perform data input/output control.

10. The cryptographic processing apparatus according to any of claims 1 to 5, wherein the instructions are further executable by the processor to:

perform different linear transformation processes using the plurality of different matrices; and change a sequence of utilizing the different linear transformation processes in accordance with a setting, and selectively perform any of cryptographic processes (a), (b1), and (b2), wherein:

(a) a cryptographic process using a Feistel structure having the number of data lines d that is set as $d \geq 3$, (b1) a cryptographic process which uses an extended Feistel structure having the number of data lines d that is set to any number satisfying $d \geq 3$, and in which only one F-function is allowed to be performed in each round, or (b2) a cryptographic process which uses an extended Feistel structure having the number of data lines d that is set to any number satisfying $d \geq 3$, and in which a plurality of F-functions are allowed to be performed in parallel in each round.

11. The cryptographic processing apparatus according to claim 10, wherein the instructions are further executable by the processor to:

select a processing mode to be performed in accordance with a bit length of data that is to be subjected to an encryption or decryption process.

12. A cryptographic processing method for performing a cryptographic process in a cryptographic processing apparatus, the method comprising:

performing a Feistel-type common-key block-cipher process of repeating an SP-type F-function in a plurality of rounds, the SP-type F-function performing a data transformation process including a non-linear transformation process and a linear transformation process; and performing a cryptographic process to which an extended Feistel structure is applied, where the extended Feistel structure has a number of data lines d that are set to an integer satisfying $d \geq 3$, and includes performing operations in which a plurality of different matrices are selectively applied to the linear transformation processes that are performed in the SP-type F-functions in the plurality of rounds, wherein the plurality of different matrices are a plurality of different matrices satisfying a condition in which a minimum number of branches for all of the data lines is equal to or more than a predetermined value, the minimum number of branches for all of the data lines being selected from among minimum numbers of branches corresponding to the data lines, each of the minimum numbers of branches corresponding to the data lines being based on linear transformation matrices included in the SP-type F-functions that are input to a corresponding data line in the extended Feistel structure, and performing linear transformation operations based on the plurality of different matrices in the SP-type F-functions that are input to the respective data lines in the extended Feistel structure.

13. The cryptographic processing method according to claim 12, wherein:

the plurality of different matrices are a plurality of different matrices satisfying a condition in which a minimum number of branches $[B_k^D]$ for all of the data lines is equal to or more than three, the minimum number of branches $[B_k^D]$ for all of the data lines being selected from among minimum numbers of branches $[B_k^D(s(i))]$ corresponding to the data lines, each of the minimum numbers of branches $[B_k^D(s(i))]$ corresponding to the data lines being calculated on the basis of linear transformation matrices included in k, where k is an integer equal to or more than two, continuous F-functions that are input to a corresponding data line s(i) in the extended Feistel structure.

14. The cryptographic processing method according to claim 12, wherein:
the plurality of different matrices are a plurality of different matrices satisfying a condition in which a minimum number of branches $[B_2^D]$ for all of the data lines is equal to or more than three, the minimum number of branches $[B_2^D]$ for all of the data lines being selected from among minimum numbers of branches $[B_2^D(s(i))]$ corresponding to the data lines, each of the minimum numbers of branches $[B_2^D(s(i))]$ corresponding to the data lines being calculated on the basis of linear transformation matrices included in two continuous SP-type F-functions that are input to a corresponding data line s(i) in the extended Feistel structure.

15. The cryptographic processing method according to claim 12, wherein:
the plurality of different matrices are a plurality of different matrices satisfying a condition in which a minimum number of branches $[B_2^L]$ for all of the data lines is equal to or more than three, the minimum number of branches $[B_2^L]$ for all of the data lines being selected from among minimum numbers of branches $[B_2^L(s(i))]$ corresponding to the data lines, each of the minimum numbers of branches $[B_2^L(s(i))]$ corresponding to the data lines being calculated on the basis of linear transformation matrices included in two continuous SP-type F-functions that are input to a corresponding data line s(i) in the extended Feistel structure.

16. The cryptographic processing method according to claim 12, wherein:
when the plurality of different matrices are denoted by n, where n is an integer equal to or more than two, different matrices,
$M_O, M_1, \ldots M_{n-1}$,
repeatedly performing the different matrices $M_0, M_1, \ldots M_{n-1}$ in an order in the SP-type F-functions that are input to the respective data lines in the extended Feistel structure.

17. The cryptographic processing method according to any of claims 12 to 16, further comprising:
performing a cryptographic process to which an extended Feistel structure that performs only one F-function in one round is applied.

18. The cryptographic processing method according to any of claims 12 to 16, further comprising:
performing a cryptographic process to which an extended Feistel structure that performs a plurality of F-functions in parallel in one round is applied.

19. The cryptographic processing method according to any of claims 12 to 16, further comprising:
performing, when a is any integer satisfying a≧2 and x is any integer satisfying x≧1, a cryptographic process to which an extended Feistel structure that utilizes a types of F-functions and that has the number of data lines: d which is set as d=2ax is applied, the a types of F-functions performing different linear transformation processes using the plurality of different matrices, and
performing equally x pieces of each of the a types of F-functions in one round.

20. The cryptographic processing method according to claim 19, further comprising:
performing a cryptographic process, in which ax F-functions are performed in parallel in one round, in accordance with performing data input/output control.

21. The cryptographic processing method according to any of claims 12 to 16, further comprising:
performing different linear transformation processes using the plurality of different matrices, and
changing a sequence of utilizing the different linear transformation processes in accordance with a setting, and
selectively performing any of cryptographic processes (a), (b1), and (b2), wherein:
(a) a cryptographic process using a Feistel structure having the number of data lines d that is set as d≧3,
(b1) a cryptographic process which uses an extended Feistel structure having the number of data lines d that is set to any number satisfying d≧3, and in which only one F-function is allowed to be performed in each round, or
(b2) a cryptographic process which uses an extended Feistel structure having the number of data lines d that is set to any number satisfying d≧3, and in which a plurality of F-functions are allowed to be performed in parallel in each round.

22. The cryptographic processing method according to claim 21, further comprising: selecting a processing mode to be performed in accordance with a bit length of data that is to be subjected to an encryption or decryption process.

23. A cryptographic-processing-algorithm constructing method for constructing a cryptographic processing algorithm in an information processing apparatus, the method comprising:
determining, in a cryptographic-processing-algorithm configuration to which an extended Feistel structure is applied, where the extended Feistel structure has a number of data lines d that are set to an integer satisfying d≧3, a plurality of different matrices that are to be applied to linear transformation processes performed in F-functions in respective rounds; and
repeatedly arranging the plurality of different matrices, which are determined in the determining step, in the F-functions that are input to the respective data lines in the extended Feistel structure,
wherein the determining the plurality of different matrices that are to be applied further comprises performing a process of determining a plurality of different matrices satisfying a condition in which a minimum number of branches for all of the data lines is equal to or more than a predetermined value, the minimum number of branches for all of the data lines being selected from among minimum numbers of branches corresponding to the data lines, each of the minimum numbers of branches corresponding to the data lines being based on linear transformation matrices included in the F-functions that are input to a corresponding data line in the extended Feistel structure.

24. A non-transitory computer-readable medium comprising a computer program that causes a cryptographic processing apparatus to perform a cryptographic process, the process comprising:
performing a Feistel-type common-key block-cipher process of repeating an SP-type F-function in a plurality of rounds, the SP-type F-function performing a data transformation process including a non-linear transformation process and a linear transformation process, performing a cryptographic process to which an extended Feistel structure is applied, where the extended Feistel structure has a number of data lines d that are set to an integer satisfying $d \geq 3$, and performing operations in which a plurality of different matrices are selectively applied to the linear transformation processes that are performed in the SP-type F-functions in the plurality of rounds, wherein the plurality of different matrices are a plurality of different matrices satisfying a condition in which a minimum number of branches for all of the data lines is equal to or more than a predetermined value, the minimum number of branches for all of the data lines being selected from among minimum numbers of branches corresponding to the data lines, each of the minimum numbers of branches corresponding to the data lines being based on linear transformation matrices included in the SP-type F-functions that are input to a corresponding data line in the extended Feistel structure, and performing linear transformation operations based on the plurality of different matrices in the SP-type F-functions that are input to the respective data lines in the extended Feistel structure.

25. A non-transitory computer-readable medium comprising a computer program that causes an information processing apparatus to construct a cryptographic processing algorithm, the algorithm comprising:

determining, in a cryptographic-processing-algorithm configuration to which an extended Feistel structure is applied, where the extended Feistel structure has a number of data lines d that are set to an integer satisfying $d \geq 3$, a plurality of different matrices that are to be applied to linear transformation processes performed in F-functions in respective rounds; and repeatedly arranging the plurality of different matrices, which are determined in the determining step, in the F-functions that are input to the respective data lines in the extended Feistel structure, wherein the determining the plurality of different matrices that are to be applied further comprises determining a plurality of different matrices satisfying a condition in which a minimum number of branches for all of the data lines is equal to or more than a predetermined value, the minimum number of branches for all of the data lines being selected from among minimum numbers of branches corresponding to the data lines, each of the minimum numbers of branches corresponding to the data lines being based on linear transformation matrices included in the F-functions that are input to a corresponding data line in the extended Feistel structure.

* * * * *